United States Patent
Essig, Jr. et al.

(10) Patent No.: US 7,382,332 B2
(45) Date of Patent: **\*Jun. 3, 2008**

(54) MODULAR INFLATABLE MULTIFUNCTION FIELD-DEPLOYABLE APPARATUS AND METHODS OF MANUFACTURE

(76) Inventors: John Raymond Essig, Jr., P.O. Box 3333, Fairfax, VA (US) 22038-3333; James Michael Essig, 3500 Burrows Ave., Fairfax, VA (US) 22030

( \* ) Notice: Subject to any disclaimer, the term of this patent is extended or adjusted under 35 U.S.C. 154(b) by 0 days.

This patent is subject to a terminal disclaimer.

(21) Appl. No.: 10/729,145

(22) Filed: Dec. 4, 2003

(65) Prior Publication Data

US 2004/0207566 A1 Oct. 21, 2004

Related U.S. Application Data

(63) Continuation-in-part of application No. 10/156,814, filed on May 30, 2002, now Pat. No. 6,897,832.

(60) Provisional application No. 60/403,815, filed on Dec. 4, 2002, provisional application No. 60/294,440, filed on May 30, 2001.

(51) Int. Cl.
*H01Q 15/20* (2006.01)
*H01Q 1/34* (2006.01)
*H01Q 1/12* (2006.01)

(52) U.S. Cl. .................. 343/915; 343/709; 343/878

(58) Field of Classification Search ........... 343/832, 343/878, 912, 915, 709; 342/8, 10
See application file for complete search history.

(56) References Cited

U.S. PATENT DOCUMENTS 2,977,596 A 3/1961 Justice (Continued)

FOREIGN PATENT DOCUMENTS

CH 671 832 9/1989

(Continued)

OTHER PUBLICATIONS

G. Grossman et al., Inflatable Concentrators for Solar Propulsion and Dynamic Space Power, J. Solar Energy Engineering, vol. 112, 1990, pp. 229-236.

(Continued)

*Primary Examiner*—Shih-Chao Chen
(74) *Attorney, Agent, or Firm*—Harold L. Novick; Lee C. Heiman; The Nath Law Group

(57) ABSTRACT

An modular, inflatable, multifunction, multipurpose, parabolic reflector apparatus having a plurality of manufactured parabolic mirrors made from a pressure-deformable reflective covering of an inflatable ring for focusing electromagnetic energy from radio frequency radiation (RF) through the ultraviolet radiation (UV) and solar energy for (1) heating and cooking, for (2) electrical power generation, for (3) enhancing the transmission and reception of radio signals, for (4) enhancing vision in low-light environments, and for (5) projection of optical signals or images. The device also has non-electromagnetic uses, such as the collection of water. A first main embodiment utilizes two reflective membranes. A second main embodiment utilizes a reflective membrane and a transparent membrane. Portability is enhanced by complete collapsing of the inflatable device.

94 Claims, 49 Drawing Sheets

U.S. PATENT DOCUMENTS

| | | | |
|---|---|---|---|
| 3,005,987 A | 10/1961 | Mack et al. | |
| 3,056,131 A | 9/1962 | McCreary | |
| 3,221,333 A | 11/1965 | Brown | |
| 3,326,624 A | 6/1967 | Maydell et al. | |
| 3,373,069 A | 3/1968 | Gillespie, Jr. | 156/285 |
| 3,413,645 A | 11/1968 | Koehler | |
| 3,471,860 A | 10/1969 | Amburgey | |
| 3,599,218 A | 8/1971 | Williamson et al. | 343/840 |
| 3,730,120 A | 5/1973 | Dobell | 114/5 R |
| 4,281,644 A | 8/1981 | Chiles | 126/451 |
| 4,352,112 A | 9/1982 | Leonhardt et al. | |
| 4,446,854 A | 5/1984 | Clevett et al. | 126/451 |
| 4,552,126 A | 11/1985 | Boyd | 126/451 |
| 4,585,317 A | 4/1986 | Hodges et al. | 350/628 |
| 4,672,389 A | 6/1987 | Ulry | |
| 4,741,609 A | 5/1988 | Sallis | |
| 4,744,112 A | 5/1988 | Keesling, Jr. | 4/585 |
| 4,755,819 A | 7/1988 | Bernasconi et al. | |
| 4,868,578 A | 9/1989 | Bruinsma et al. | 343/882 |
| 4,979,494 A | 12/1990 | Andersen et al. | 126/451 |
| 5,101,823 A | 4/1992 | Smith | 128/369 |
| 5,276,600 A | 1/1994 | Takase et al. | |
| 5,404,868 A | 4/1995 | Sankrithi | 126/604 |
| 5,486,984 A | 1/1996 | Miller | |
| 5,515,067 A | 5/1996 | Rits | 343/912 |
| 5,617,843 A | 4/1997 | Erwin | 126/681 |
| 5,760,739 A | 6/1998 | Pauli | 342/359 |
| 5,836,667 A | 11/1998 | Baker et al. | |
| 5,893,360 A | 4/1999 | Stoumen et al. | |
| 5,920,294 A * | 7/1999 | Allen | 343/912 |
| 5,947,581 A | 9/1999 | Schrimmer et al. | |
| 5,967,652 A | 10/1999 | Ramer et al. | |
| 6,102,555 A | 8/2000 | Mizoguchi | |
| 6,106,135 A | 8/2000 | Zingale et al. | |
| 6,150,995 A | 11/2000 | Gilger | |
| 6,219,009 B1 * | 4/2001 | Shipley et al. | 343/915 |
| 6,238,077 B1 | 5/2001 | Ramer et al. | |
| 6,417,818 B2 * | 7/2002 | Shipley et al. | 343/915 |
| 6,771,229 B2 | 8/2004 | Thornburgh | |

FOREIGN PATENT DOCUMENTS

| | | |
|---|---|---|
| DE | 11 19 707 | 12/1961 |
| DE | 29 35 341 | 6/1980 |
| DE | 34 39 150 | 5/1986 |
| DE | 40 09 754 | 1/1991 |
| DE | 44 41 201 | 4/1995 |
| DE | 4441201 A1 | 6/1995 |
| DE | 199 23 141 | 11/2000 |
| EP | 0 025 834 | 4/1981 |
| FR | 1 048 681 | 12/1953 |
| FR | 1048681 | 12/1953 |
| FR | 2 446 451 | 8/1980 |
| FR | 2 567 995 | 1/1986 |
| FR | 2 787 867 | 6/2000 |
| GB | 758090 | 9/1956 |
| GB | 2 054 188 | 2/1981 |
| JP | 59-097205 | 6/1984 |
| JP | 60 049128 | 3/1985 |
| SU | 1 343 208 | 10/1987 |
| SU | 1 766 845 | 10/1992 |

OTHER PUBLICATIONS

Michael A. Dornheim, Inflatable Structures Taking to Flight. Aviation Week & Space Technology, Jan. 25, 1999, pp. 60-62, downloaded from www.lgarde.com.

R.E. Freeland et al., Inflatable Deployable Space Structures Technology Summary. International Aeronautics Federation, 1998, 16 pages.

Wayne A. Wong, Operation of a Thin-film Inflatable Concentrator System Demonstrated in a Solar Thermal Vacuum Environment, 3rd AIAA Gossamer Spacecraft Forum, Apr. 2002, 3 pgs.

Inflatable Structures in Space Will Help Study Universe. NASA/JPL News Release, Aug. 20, 2000, 3 pages.

Carol M. Tolbert, Inflatable Concentrators. www.grc.nasa.gov/WWW/tmsb/concentrators/doc/inflatable.html (last updated Aug. 1, 2002), 3 pages.

Mitchell Thomas, Inflatable Space Structures. Downloaded from www.lgarde.com on Feb. 27, 2003, 4 pages.

El-Kassaby M M: "New Solar Cooker of Parabolic Square Dish: Design and Simulation" Renewable Energy, Pergamon Press, Oxford, GB, vol. 1, No. 1, Jan. 1991 (Jan. 1991), pp. 59-65, XP000204646.

* cited by examiner

MODULAR INFLATABLE MULTIFUNCTION FIELD-DEPLOYABLE APPARATUS AND METHODS OF MANUFACTURE

CROSS-REFERENCE TO RELATED APPLICATIONS

This application is a continuation-in-part of U.S. patent application Ser. No. 10/156,814, filed 30 May 2002 (now U.S. Pat. No. 6,897,832 issued 24 May 2005), which is related to U.S. Provisional Patent Application Ser. No. 60/294,440 filed May 30, 2001. This application relates to co-pending PCT Patent Application Serial No. PCT/US02/16918 as filed May 30, 2002, as amended Nov. 27, 2002 under PCT Article 19, and as amended Dec. 30, 2002 under PCT Article 34. The entire specification (including Description, Drawing, and Claims) contained within each of these related applications (e.g., U.S. patent application Ser. No. 10/156,814; U.S. Provisional Patent Application Ser. No. 60/294,440; and PCT Patent Application Serial No. PCT/US02/16918), both as filed and as amended (where applicable), is hereby incorporated herein by reference.

BACKGROUND OF THE INVENTION

1. Field of the Invention

The present invention relates most broadly to multifunction field-deployable tools or apparatus, which are principally configured for use as highly portable solar cooking, heating, and/or energizing apparatus, but which typically may also be reconfigured and/or redeployed by the user in the field to serve (i.e., provide a means for performing) numerous other life-enhancing or life-sustaining functions. More specifically, the present invention relates to inflatable (or otherwise collapsible), multifunction, solar energy concentrating devices, which are typically (but not necessarily) specially configured and/or re-configurable to also effectively and reliably perform one or more other functions selected from a broad range of focused electromagnetic, non-focused electromagnetic, and/or non-electromagnetic functions, thereby rendering the invention highly amenable to a broad scope of practical applications within a wide range of terrestrial and/or non-terrestrial (e.g., marine, airborne, space-based) environments.

2. Related Art a. Description

The related art of interest describes various electromagnetic energy harnessing devices including several apparatus for concentrating solar energy, but none discloses the present invention. Accordingly, there remains a need for an economical field-deployable apparatus, which, in addition to being able to concentrate solar energy for heating, cooking, and/or energizing, also provides a means for performing various other life-enhancing or life-sustaining functions, and which is fully collapsible (e.g., deflatable) to greatly facilitate portage and storage. A review of the related art reveals its many limitations and disadvantages and, thus, clearly shows that this need for a highly portable, multifunction, field-deployable apparatus remains unfulfilled, thereby underscoring the value of the present invention, which fully and uniquely meets this need.

In particular, U.S. Pat. No. 3,326,624 issued on Jun. 20, 1967, to Wladimir von Maydell et al. describes an inflatable paraboloid mirror capable of being formed into a permanently rigid structure in outer space to collect solar energy for space stations and flying bodies. The mirror has a valved annular ring, radial segmental covers or strip springs, radial heating wires, and a valved double walled mirror formed with polyester foam coated with a reflector material. The ring and mirror have internal rigid spacers. However, this apparatus is not well suited for use as a field-deployable tool because it cannot be collapsed and re-deployed after its initial deployment, it is not multifunctional, it does not provide a means for supporting and orienting the apparatus to facilitate use in a terrestrial environment, it does not provide a means for protecting the user against accidental exposure to concentrated electromagnetic radiation, and both its mechanical structure and its means of deployment are generally too complex to allow the device to be economically produced for wide use by the general public.

Other related art exhibiting many of these limitations and disadvantages include:

U.S. Pat. No. 5,920,294 issued on Jul. 6, 1999, to Bibb B. Allen describes a space antenna having an interior tensioned multiple cord attachment in a balloon which uses Mylar® for electromagnetic and solar energy applications in a first embodiment. A second embodiment utilizes an exterior tensioned cord attachment to a spacecraft of an antenna reflector of a gold-plated molybdenum or graphite wire mesh inside an inflated toroidal support balloon which uses Mylar® for electromagnetic and solar energy applications. Note that the mechanical attachments (tensioned cord-ties) used to deploy the reflector are generally too complex and also too great in number to permit economical construction of a device intended for general use by the public. Also, no means is provided for supporting and orienting the apparatus in a terrestrial environment.

U.S. Pat. No. 4,352,112 issued on Sep. 28, 1982, to Fritz Leonhardt et al. describes a large reflector having an inner face of either a polished aluminum sheet or a plastic sheet backed by individual membrane segments of a rigid foam backing having a curved concave surface and an opening in its center. Two membranes formed as concave or convex reflectors are used to reflect and concentrate solar rays to a heat absorber, heat exchanger and the like. Note that this patent is primarily a means for producing parabolic reflectors from flat planar sheets of material, and shows various rigid means for supporting and operating such reflective membranes. Further, it does not represent a portable device.

U.S. Pat. No. 2,977,596 issued on Mar. 28, 1961, to Harold D. Justice describes an inflatable circular antenna saucer on a transmitter or receiver base. Note that the rigid support frame of the apparatus is not significantly collapsible for portage and storage, and the reflector structure contains unnecessary internal webbing, which is not economical to produce.

U.S. Pat. No. 3,005,987 issued on Oct. 24, 1961, to Kent M. Mack et al. describes an inflatable antenna assembly comprising a radome covering an inflatable elliptical tubular membrane support having structural lacing and two concave flexible non-conducting sheets, wherein one sheet is coated with vaporized aluminum. Note that the apparatus is not significantly collapsible for portage and storage, the reflector structure contains tensioning cords, which are unnecessary for use as a solar concentrator, and the radome generally inhibits or prohibits use as a broad-spectrum solar energy concentrator.

U.S. Pat. No. 3,056,131 issued on Sep. 25, 1962, to Ralph L. McCreary describes an inflatable reflector for electromagnetic radiation comprising two concave thin sheets of flexible plastic material, wherein at least one sheet has a parabolic shape. Note that the rigid support frame of the apparatus is not significantly collapsible for portage and storage. Also, no means is provided for adjustably supporting and orienting the apparatus in a terrestrial environment.

U.S. Pat. No. 3,221,333 issued on Nov. 30, 1965, to Desmond M. Brown describes an inflatable radio antenna comprising an oblate bag aerial including a pair of spaced parallel insulating planar surfaces connected to a medial portion and having two antenna elements mounted parallel to form a capacitive plate antenna. Note that this apparatus is primarily a means for producing a capacitive aerial antenna. It does not have a means for concentrating solar energy, such as a parabolic reflector, nor any means for performing any other functions except its primary (sole) use as a capacitive aerial antenna.

U.S. Pat. No. 3,413,645 issued on Nov. 26, 1968, to Richard J. Koehler describes an elongated inflatable parabolic radar antenna toroid assembly providing a small wave energy aperture in one plane and a larger wave energy aperture in a perpendicular plane. Note that this apparatus is not significantly collapsible for portage and storage, and that the reflector's support structure generally inhibits or prohibits use as a broad-spectrum solar energy concentrator.

U.S. Pat. No. 3,471,860 issued on Oct. 7, 1969, to Floyd D. Amburgey describes a reflector antenna having a variable or flexible surface, the geometrical shape of which may be changed by air pressure or a partial vacuum behind the flexible membrane for the purpose of obtaining the best reception from this antenna type. Note that this patent is primarily a means for producing an adjustable-focal-length parabolic reflector from flat planar sheets of material. It does not represent a significantly collapsible portable device.

U.S. Pat. No. 4,672,389 issued on Jun. 9, 1987, to David N. Ulry describes an inflatable reflector apparatus and a method of manufacture. A super-ambient pressure is maintained within the envelope, which is maintained by a compression frame member. Note that the rigid support frame of the apparatus is not significantly collapsible for portage and storage, and the transparent membrane of the super-ambient reflector structure limits efficiency when used as a solar energy concentrator.

U.S. Pat. No. 4,741,609 issued on May 3, 1988, to Daniel V. Sallis describes a stretched membrane heliostat having a membrane mounted on a circular frame, there being a double-walled portion of the membrane that extends in a circle near the periphery of the membrane to form a bladder that is inflatable to tension the membrane. Note that the rigid support frame of the apparatus is not significantly collapsible for portage and storage.

U.S. Pat. No. 4,755,819 issued on Jul. 5, 1988, to Marco C. Bernasconi et al. describes a parabolically-shaped reflector antenna intended for space vehicle applications. The device is inflated by a gas in space to form an antenna reflector and an antenna radome stabilized by a rigidizing torus. The covering material is a resin-impregnated fabric which when heated by the sun polymerizes to render the reflector antenna stable and requires no gas pressure to keep its shape. Note that this apparatus is not significantly collapsible for portage and storage, it is too complex to yield a sufficiently economical field-deployable tool for use by the general public, and the radome generally inhibits or prohibits use as a broad-spectrum solar energy concentrator.

U.S. Pat. No. 5,276,600 issued on Jan. 4, 1994, to Takase Mitsuo et al. describes a planar reflector composed of a base and a flexible polymeric plastic substrate having a highly reflective silver layer formed thereon and overlaid on the base with an adhesive layer interposed between the two layers. Note that this patent is primarily a means for producing reflectors having a small radius of curvature from multi-layer planar sheets of material. It does not represent a functional collapsible reflector apparatus.

U.S. Pat. No. 5,893,360 issued on Apr. 13, 1999, to O'Malley O. Stoumen et al. describes an inflatable solar oven comprising two sheets of flexible material sealed at their edges. The top sheet is clear and the bottom sheet has a reflective layer. Note that this apparatus exhibits an extremely clumsy or cumbersome method of cooking, and the functionality of the device is easily impaired by vapors, which, after being emitted from the items being heated or cooked within the device, may condense on the transparent membrane of the device, thereby diffusing the impinging solar radiation, thus preventing effective concentration. Further, the device is not multifunctional.

U.S. Pat. No. 6,150,995 issued on Nov. 21, 2000, to L. Dwight Gilger describes a combined photovoltaic array and a deployable perimeter truss RF reflector. Note that this structure is highly complex in light of its two simple functions, and it is generally not suitable for use as a terrestrial field-deployable tool.

U.S. Pat. No. 6,219,009 issued on Apr. 17, 2001, to John Shipley et al. describes a tensioned cord and tie attachment of a collapsible antenna reflector to an inflatable radial truss support structure. Note, again, that the mechanical attachments (tensioned cord-ties) used to deploy the reflector are generally too complex to permit economical construction of a device intended for general use by the public. Also, no means is provided for supporting and orienting the apparatus in a terrestrial environment.

U.K. Patent Application No. 758,090 published on Sep. 26, 1956, for Charles T. Suchy et al. describes an inflatable balloon having arranged within a radio aerial. Note that this apparatus does not have a concentrating reflector.

France Patent Application No. 1.048.681 published on Dec. 23, 1953, for Adnan Tarcici describes a reflector for concentrating solar energy for cooking when camping. Note that this apparatus is not significantly collapsible for portage and storage.

Japan Patent Application No. 59-97205 published on Jun. 5, 1984, for Yasuo Nagazumi describes a parabolic antenna having an airtight chamber filled with nitrogen and demarcated with a radiating aluminum casing and a heat-insulating mirror. Note that this apparatus is not significantly collapsible for portage and storage and is not suitable for concentrating solar energy.

b. Summary of Disadvantages of Prior Art

In short, the disadvantages of prior art generally include, among others, one or more of the following limitations:

(a) the device or apparatus generally is not multifunctional in nature, i.e., it is generally limited to either a single function or perhaps two or more closely related functions;

(b) the apparatus is not suitably or sufficiently collapsible to permit easy transport to and from the field, or allow convenient storage when not in use;

(c) the apparatus is not easily reusable or re-deployable, i.e., the apparatus cannot be collapsed after its initial deployment to facilitate portage to an alternate location or to compactly store for future use;

(d) the apparatus has no lightweight collapsible means for supporting and orienting the apparatus to facilitate use in a terrestrial environment, and/or it does not employ other features to facilitate use by persons having limited experience or knowledge, such as simple well-known inflation valves;

(e) the apparatus has no means for protecting the user from accidental exposure to highly concentrated electromagnetic radiation, thereby posing a safety hazard;

(f) the apparatus exhibits limited efficiency when concentrating broad-spectrum solar radiation as a result of having one or more intervening layers in its optical path, such as a transparent membrane or radome;

(g) the apparatus exhibits unnecessary structural complexity, thereby rendering the apparatus uneconomical to produce for wide use by the general public; and/or (h) the apparatus is generally not suitably robust or sufficiently durable for rapid deployment into the field, such as by air drop, nor does the apparatus provide a means for easily repairing the device in the field using integral rapid-repair materials in the event of damage.

In contrast, each of these disadvantages or limitations of prior art are overcome by the present invention.

SUMMARY OF THE INVENTION a. General Description

The present invention is a modular, inflatable, multifunction, field-deployable apparatus, which primarily provides an economical means for concentrating solar energy for heating, cooking, and/or energizing, but which also typically provides various means for performing other life-enhancing or life-sustaining functions, and which is generally fully collapsible (e.g., deflatable) to greatly facilitate portage and storage. Briefly, the modular, inflatable, multifunction, field-deployable apparatus of the present invention typically has as its primary functional module a basic inflatable, multifunction, parabolic reflector apparatus, such as disclosed in our previous (cross-referenced) applications. The present invention typically further includes one or more optional, preferably removably attached, accessory modules and/or elements, such as an inflatable (or otherwise collapsible) means for supporting and orienting the basic inflatable reflector apparatus, an inflatable (or otherwise collapsible) means for protecting the user from accidental exposure to highly concentrated electromagnetic (e.g., solar) radiation at or near the focal point of the basic reflector apparatus, an inflatable (or otherwise collapsible) means for supporting materials or accessory elements in proximity to the focal point, and an inflatable (or otherwise collapsible) protective cover.

Regarding functionality, briefly note that both the basic inflatable reflector apparatus of the basic invention and, thus, the modular field-deployable apparatus of the present invention are primarily configured for use as highly portable solar cooking, heating, and/or energizing apparatus. However, both the basic reflector apparatus and the modular field-deployable apparatus are typically (but not necessarily) specially configured to also effectively and reliably perform, either alone or in concert with various optional accessory elements, one or more other functions selected from a broad range of focused electromagnetic, non-focused electromagnetic, and non-electromagnetic functions. Hence, both the basic reflector apparatus and the modular field-deployable apparatus can serve as highly portable multifunction tools, each of which is highly amenable to a broad scope of practical applications; however, the modular apparatus of the present invention offers greater versatility, safety, and ease of use.

In greater detail, the present invention is generally functionally optimized (as is the basic invention) for concentrating, focusing, and/or beaming radiant electromagnetic energy and is effective over a wide range of the electromagnetic spectrum from radio frequency (RF) radiation through ultraviolet (UV) radiation including broad-spectrum solar energy. However, as indicated above, the present invention (and the basic invention) can also effectively and reliably perform numerous other functions not related to concentrating, focusing, and beaming radiant electromagnetic energy. Focused electromagnetic applications of the present invention typically include 1) concentrating broad-spectrum (e.g., solar) radiation for heating, cooking, sterilizing, distilling, processing materials, generating electrical power, and/or the like, (2) manipulating radio and/or microwave frequency radiation for enhancing the transmission and reception of radio signals and/or other electromagnetic communications, and/or (3) manipulating visible-spectrum radiation for enhancing vision in low-light environments, projecting optical signals or images, and/or other optical purposes, such as using the apparatus as a convex mirror to extend the user's field of vision for surveillance and/or safely. Non-focused electromagnetic applications typically include 1) use as an emergency thermal blanket, shelter, incubator, greenhouse, and/or the like, (2) use as an electromagnetic energy shield, and/or (3) use as an electrostatic insulator. Non-electromagnetic applications typically include (1) the collection, storage, and/or processing of water or other substantially fluidic materials, (2) use as a shelter to protect persons, equipment, materials, and/or other items from inclement weather and/or other environmental elements, (3) use as a soft or compliant support such as a bed, cradle, inflatable cast (for immobilizing a broken limb), and the like, (4) use as a water flotation device or water boat, (5) use as a portable fermentor apparatus for producing fuels, medicines, beverages, and/or other materials, (6) use as an inflatable wind turbine for producing electrical and/or mechanical power, and/or (7) use as a directional sound amplification device. The invention contemplates numerous other uses as discussed hereinbelow and as readily apparent to a user of the apparatus. However, it is emphasized that any particular embodiment or manifestation of the present invention need not perform all such functions, i.e., a particular embodiment can be configured to perform a limited number or subset of these functions without departing from the nature of the invention. Further, as will be shown below, it should be noted that although the basic reflector apparatus is generally the primary functional module of the modular field-deployable apparatus, the present invention (i.e., the modular field-deployable apparatus) can optionally be reconfigured without a basic reflector apparatus by the user in the field (or by the factory) to perform various non-focused electromagnetic and/or non-electromagnetic functions, for example, use as a water flotation device or use as part of a wind turbine apparatus, without departing from the nature of the invention.

Regarding physical construction, first note that each of the modular structures of the present invention are generally optimized to minimize weight, non-deployed volume, and production cost, while simultaneously maximizing operational performance, versatility, and safety. To achieve such optimization, the primary modules of the present invention are typically made from one or more lightweight inflatable structures (such as an inflatable ring), thin flexible (e.g., pressure-deployable) membranes, and/or other easily collapsible, lightweight structures. An excellent example of such structural optimization is the basic inflatable reflector apparatus in a preferred first main embodiment configuration, wherein two pressure-deformable (i.e., pressure-deployable) membranes, at least one of which is reflective, are utilized in conjunction with the inner portion of an inflatable support ring to form a highly efficient central reflector chamber, which generally can be inflated to either sub-ambient pressure (as required for most applications) or super-ambient pressure to deploy the reflective membrane(s). Note that by using the inner portion of the support ring to form an integral part of the highly efficient sub-ambient-pressurizable reflector chamber, the first embodiment of the basic reflector apparatus can be produced very economically from a minimum number or parts while maximizing weight-specific power output.

As another example, a second main embodiment of the basic reflector apparatus utilizes at least one reflective membrane and at least one transparent membrane to form a central reflector chamber, which generally can be inflated only to super-ambient pressure to deploy the reflective membrane. Although generally less efficient than the first embodiment when used for concentrating broad-spectrum electromagnetic energy, the primary structure of the second embodiment of the basic reflector apparatus can be made extremely economically from as few as two sheets of material. Additionally, both embodiments of the basic reflector apparatus generally employ one or more reflective membranes which are pre-formed substantially into the shape of a paraboloid to enhance safety, facilitate operation, and reduce structural loading of the membranes on the support ring. (It is noted that a "pre-formed" pressure-deformable membrane is a membrane which is fabricated to substantially embody or possess its pressure-deformed shape, i.e., its deployed surface contour, prior to the application of significant differential pressure across the membrane.) As noted above, the other modules of the present invention are also typically constructed from similar lightweight inflatable structures and/or pressure-deployable membranes to achieve such structural optimization; however, it should be further noted that particular modules (or components thereof) are also sized to substantially match, where possible, other modules and/or components of the present invention, both to further reduce fabrication cost by minimizing the number of different elements required to construct the modular apparatus, and to allow similarly sized modules to be easily interchanged to increase versatility of the modular apparatus and/or to facilitate rapid substitution of one or more modules in the event of damage.

To enable the various modules of the present invention to operate as a unit, each module typically includes one or more attachment means for connecting to other modules of the apparatus, for attaching accessory elements, and/or for securing and stabilizing the apparatus to promote safe operation. Additionally, each inflatable and/or pressure-deployable module of the apparatus requires at least one inflation means or pressure-adjusting means such as, for example, a simple well-known plug valve, a manual or automatic pump, a gas canister, and/or the like.

To increase performance, to further enhance safety, to facilitate use, to reduce production cost, and/or to enable the modular field-deployable apparatus to perform additional functions, the present invention contemplates that numerous alternate configurations, optional features, and/or accessory elements typically can be substituted for, incorporated into, and/or used in concert with the various modules of the present invention.

Regarding alternate configurations, note, for example, that the use of non-pre-formed (i.e., planar) elastic reflective membranes is contemplated to enable the basic reflector apparatus to have a variable focal length. Further, the use of pre-formed, non-parabolic reflective membranes (e.g., reflective membranes having surfaces which are spherical, undulating, a series of conic sections, faceted, and/or the like) is contemplated to limit the maximum degree of concentration to further enhance safety. In addition, the invention also contemplates various novel methods of manufacture for the various modules. More specifically, various fabrication processes, such as those disclosed in our previous (cross-referenced) applications, may be employed to economically produce the present invention primarily from multiple, thin, flexible (e.g., pressure-deformable) membranes.

Regarding optional features and/or accessory elements, note that such elements can be either integrally incorporated within or removably attached to the various modules of the present invention. Also note that the various modules of the apparatus may be integrated, such as to permit simultaneous inflation of the integrated, interconnected modules.

Specific portable apparatus are shown hereinbelow which greatly facilitate or enable a wide range of useful applications. However, the invention contemplates that many other portable apparatus may be provided for various purposes by judiciously combining one or more of the modules of the modular field-deployable apparatus (or alternate configurations thereof) with any of the numerous optional features and/or accessory elements of the present and/or basic invention, i.e., the invention is not limited to the specific examples shown and/or described herein.

Ultimately, the present invention serves as a highly portable, field-deployable, multi-function, multi-purpose apparatus or tool, which can quickly and economically provide in the field (or other partially or significantly infrastructure-deprived environment) at least one life-enhancing or life-sustaining function or utility. More specifically, the invention can perform many of the life-sustaining functions and/or utilities routinely provided by much more massive, semi-portable apparatus and/or substantially fixed elements of infrastructure that are typically found within highly infrastructure-rich environments. Consequently, the highly portable multifunction apparatus of the present invention can rapidly, effectively, and economically replace and/or supplement, either temporarily or permanently, many of these life-sustaining apparatus and/or elements of infrastructure, examples of which include various domestic (i.e., household) appliances and/or other housewares; research, commercial, industrial, recreational, and/or military equipment; municipal power, water, and/or communication utilities; basic shelter from inclement whether or other environmental elements; and/or the like. Accordingly, the present invention is ideally and uniquely suited to facilitate a broad range of activities including, for example, remote field work, emergency response, disaster relief, outdoor recreation (such as camping, backpacking, picnicking, boating, and/or the like), education, and/or other activities in terrestrial and/or non-terrestrial (e.g., marine, airborne, space-based) environments.

b. Typical Advantages Over Prior Art

Hence, the modular inflatable multifunction apparatus comprising the present invention is generally superior to the related art in at least seven very significant respects.

First, the present invention is superior to the related art as a result of its highly multifunctional, multipurpose nature. It is noted that the preferred and alternate embodiments of the present invention have numerous electromagnetic and non-electromagnetic utilities. In contrast, all related art is significantly more limited with respect to utilities and applications thereof. In greater detail, it is emphasized that none of the prior art makes any references to, or accommodations for, performing non-electromagnetic functions, such as water collection and storage, which is but one of many critically important aspects of the present invention when the apparatus is deployed in the field as a multifunctional survival tool. In addition, the modular nature of the present invention allows the various modules of the apparatus to be used simultaneously for similar and/or radically different functions; however, prior art contains no such provision.

Second, the present invention is superior to the related art as a result of its extremely lightweight and compactly foldable construction, which greatly facilitates portage and storage. As an example, note that a pocket-sized version of the basic inflatable reflector apparatus having a mass of approximately 100 grams and measuring only 8.5 cm by 12.0 cm by 1.0 cm when fully collapsed can be inflated to yield a fully deployed device having a 120 cm diameter primary reflector providing 1000 watts of highly concentrated broad-spectrum radiant energy when utilized terrestrially as a solar energy concentrating device. It is noted that such a device can thus provide an unprecedented mass-specific power output approximating 10000 watts per kilogram, depending on the specific thickness and material of construction (e.g., a 13-micron-thick nylon/polyethylene co-extruded membrane), and a non-deployed, compactly folded, volume-specific power output (i.e., non-deployed power density) approximating 10 megawatts per cubic meter. As a result, a single cargo air lifter can, for example, airdrop in a single load a sufficient quantity of the apparatuses to capture and concentrate well over 100 megawatts of solar energy. Although a modular apparatus incorporating several inflatable accessory modules generally has a lower weight-specific and volume-specific power output than the basic inflatable reflector apparatus, it should be noted that such inflatable accessory modules of the modular apparatus optionally can be constructed from one or more modified basic reflector apparatuses such that the modified modular apparatus can be reconfigured as a plurality of basic inflatable reflector apparatuses, which substantially achieve the same high weight-specific and volume-specific power output of the primary basic inflatable reflector apparatus.

Third, the present invention is superior to the related art as a result of its precisely pre-formed reflective membranes and other optional features, which greatly increase the operational safety of the device. More specifically, the use of pre-formed parabolic reflective membranes (instead of planar membranes as generally used in related art) allows the device to have (and can limit the device to) relatively short and substantially fixed focal lengths, thereby enabling the user to maintain greater control over the location of any potentially dangerous, high concentrations of radiant energy. In addition, pre-formed, non-parabolic reflective membranes may be used to limit the maximum degree of energy concentration to lower and, thus, safer levels. Further, the use of optional integral safety cages, safety covers, and/or other safety features significantly reduces the risk of accidental exposure to high concentrations of electromagnetic radiation. Again, such features and their associated benefits are not contemplated by prior art.

Fourth, the present invention is superior to the related art in that it is easier to deploy (e.g., inflate) and operate. Note that by using pre-formed reflective membranes, such reflective membranes can be fully deployed using significantly less differential pressure across the membranes, thereby facilitating proper inflation. In addition, various optional elements may be incorporated into the device, which further enhance ease-of-use during deployment and/or operation. For example, such elements include (1) various novel means for supporting and/or orienting the device, (2) various novel apparatus for holding materials or accessory elements in proximity to the focal point, and (3) the use of simple, well-known inflation valves, which greatly facilitate deployment, even by persons having limited education or prior experience with solar concentrating apparatus. In contrast, except for the occasional use of well-known focal point supports, prior art neither contemplates nor anticipates such elements or the benefits thereof.

Fifth, the present invention, when employing a first embodiment configuration of the basic reflector apparatus, is more efficient in that it eliminates all loss-inducing intervening layers as contained within the optical paths of all closely related prior art, i.e., art employing pressure-deformable reflective membranes supported by an inflatable ring. Note that by employing a sub-ambient pressure reflector chamber, as is used in the first embodiment of the basic reflector apparatus, sunlight or other electromagnetic radiation can travel, unobstructed, from the energy source to the reflector and then to the target. Accordingly, the first embodiment of the basic reflector apparatus causes no (i.e., zero) losses of radiant electromagnetic energy as such energy travels to and from the reflector. In contrast, most related art requires sunlight or other electromagnetic radiation to pass through the transparent membrane of a super-ambient reflector chamber on its way to and from the reflector, thereby resulting in a plurality of losses. The remaining prior art, although utilizing a sub-ambient pressure reflector chamber, also requires the electromagnetic energy to pass through at least one intervening layer, such as a radome, again resulting in a plurality of losses. In general, these losses include the reflection, absorption, and diffusion of electromagnetic radiation by the intervening layer as the radiation travels to and from the reflector. Ultimately, the intervening layers of prior art are typically responsible for reducing the efficiency of such devices by as much as twenty percent, or more, depending upon the wavelength of the impinging radiation and the transmission characteristics of the material or materials comprising the intervening layer.

Sixth, the present invention (most notably its basic reflector apparatus) is superior to the related art as a result of its extremely simple, highly integrated structure, which has been specially configured to facilitate high-speed mass-production, thereby making the device very economical to produce. Note that the designs specified in the related art do not demonstrate the high degree of integration and resulting simplicity of construction to the extent specified herein for the present invention. Also note that the relative simplicity of the present invention is due, in part, to the fact that the reflective membrane of its basic reflector apparatus can be deformed into a substantially parabolic surface utilizing only the surrounding ambient (e.g., atmospheric) pressure and simple, manually-operated, integral valves. In contrast, all related art relies on complex mechanical arrangements, complex electrostatic systems, or complex pressure adjusting systems to deform the reflective membrane into a substantially parabolic surface.

Seventh, the present invention is superior to prior art as a result of possessing a superior degree of robustness, especially when deployed into the field via airdrop or other potentially high-acceleration-inducing delivery methods. Note that such robustness of design is a result of the nearly exclusive use of thin flexible membranes (instead of rigid structures) to produce the apparatus. Further, in the event of damage, the apparatus is also superior to prior art in that it exhibits superior maintainability, which is achieved by incorporating an integral means for rapidly repairing the apparatus in the field. In contrast, the related art provides no such means for conveniently maintaining the apparatus in the field.

It should be noted that each of the above aspects of the present invention, taken separately, represents a significant improvement over prior art. However, in combination, these superior aspects of the present invention represent an enormous improvement over prior art, the significance of which should not be underestimated. More specifically, as a result of possessing all of the noted improvements over prior art, the present invention can effectively serve as a highly multifunctional, highly portable, generally safe-to-operate, easy-to-use, high-performance, and highly economical tool—a tool which has the ability to significantly enhance one's ability to enjoy and/or survive a variety of difficult or demanding physical environments, which, for a variety of reasons, have few if any of the typical life-sustaining facilities or elements of infrastructure upon which much of humanity is presently highly dependent. In particular, the apparatus offers greatest benefits to persons who are suddenly and unexpectedly forced to dwell in regions of the world in which basic food preparation facilities, potable water systems, or other critical elements of the local infrastructure have been either destroyed or otherwise rendered inoperable, whether as a result of war, natural disaster, or other crisis. Under such circumstances, it should be noted that the efficacy with which emergency supplies and temporary infrastructure can be reestablished within the disaster area directly affects the quality of life and, more importantly, the survival rate of the persons located in the affected region. Ultimately, to alleviate as much general hardship as possible, but also to minimize the mortality rate, substitute temporary-use facilities need to be reestablished throughout the affected region in sufficient quantities, and with a minimum of time, effort, and expense. Due to its low cost, ease-of-use, and high degree of portability, the multifunction device disclosed herein is ideally and uniquely suited to facilitate such emergency or disaster relief efforts. As a result, the instant invention provides a highly effective method for meeting this unending global need—an aspect of the invention that is neither contemplated nor anticipated by prior art.

The present invention can also be of great benefit to individuals living, working, or traveling in underdeveloped or neglected parts of the world. For the outdoorsman or explorer, the modular field-deployable apparatus can serve as an invaluable multifunctional survival tool. In addition, as noted above, the apparatus can offer many benefits to persons who choose to participate in a variety of outdoor recreational activities for which portable food preparation facilities and/or other functions of the present invention are either needed or desired. Further, it should be noted that the highly economical apparatus is ideally suited for use as an instructional aide for teaching students or other interested parties about solar energy. Considering the world's dwindling supply of fossil fuels and other conventional fuels—especially in conjunction with the present ever-increasing global demand for energy—worldwide education about solar energy is becoming increasingly necessary to protect the environment, sustain the global economy, and ensure a reasonable quality of life for all creatures inhabiting the Earth. Once again, these additional purposes and benefits are neither contemplated nor anticipated by prior art.

As one reads subsequent sections of this document, it will become quite clear that the modular field-deployable apparatus is also superior to the related art in a variety of other ways including, among other items, various novel methods of manufacturing, deploying, and using the modular apparatus.

c. Specific Objects and Advantages of the Invention:

Accordingly, it is a principal object of the present invention to provide a highly portable (e.g., inflatable or otherwise collapsible), multifunction, multipurpose, field-deployable apparatus and fabrication methods thereof, which is generally optimized for use as a substantially parabolic reflector to focus electromagnetic energy from radio frequency radiation (RF) through ultraviolet radiation (UV) including solar radiation (or a predetermined subset thereof), but which typically can also be used for numerous other electromagnetic and/or non-electromagnetic utilities. Regarding the multi-functional nature of this invention, specific (but optional) objects of the present invention are:

(a) to provide a highly portable multifunction apparatus for concentrating broad-spectrum (e.g., solar) radiation for cooking, heating, sterilizing, distilling, material processing, and/or for other purposes requiring or benefiting from the application of radiant heat, which may optionally utilize various accoutrements specially configured for absorbing concentrated solar radiation including, for example, a solar oven or autoclave having a high-emissivity (generally blackened) energy-absorbing external surface;

(b) to provide a portable multifunction apparatus for generating electrical power utilizing turboelectric, thermoelectric, and/or photoelectric devices;

(c) to provide a portable multifunction apparatus, which can be utilized to concentrate light radiating from a relatively dim source, such as a street lamp, to operate (and/or recharge) an otherwise inoperable, low-power, photovoltaic device, such as a handheld calculator;

(d) to provide a portable multifunction apparatus, which can be used for enhancing or enabling radio, microwave, and/or satellite communications (including use of one or more apparatus as a relay station), and/or for enabling radio-telescopy;

(e) to provide a portable multifunction apparatus for enhancing vision in darkened environments by concentrating visible light radiating from a dim source, such as a crescent moon, onto an object to be viewed;

(f) to provide a portable multifunction apparatus for enhancing vision in darkened environments by projecting light from non-collimated sources, such as a candle, into dark environments;

(g) to provide a highly portable multifunction apparatus for enabling or enhancing optical signal communications, such as when used with a non-collimated light source held at the focal point to form a signal beacon, and optionally further including colored, textured, polarized, and/or image-containing transparent and/or reflective membrane(s) to enhance signaling and/or to provide artistic lighting or imaging;

(h) to provide a portable multifunction apparatus employing a waveguide system to capture and deliver pan-chromatic visible light (or other useful spectral range of radiation) to interior, subterranean, and/or underwater environments to enhance vision and/or to operate equipment such as an optical image projector;

(i) to provide a portable multifunction apparatus, which can serve as a multi-layer emergency thermal blanket, electrostatic insulator, and/or electromagnetic energy shield to protect a person or object, but which also allows a person or object to hide from an infrared (IR) camera or otherwise be shielded from an electromagnetic imaging or detection device;

(j) to provide a portable multifunction apparatus, which can serve as a soft, compliant support for persons or objects, including use as a bed, cradle, seat, inflatable cast (for immobilizing a broken limb), or the like;

(k) to provide a portable multifunction apparatus, which can be used as a water flotation device, boat, or snow sled;

(l) to provide a portable multifunction apparatus, which can be used to capture, store, process, and/or distribute water, other liquids, and/or certain solid materials, for which various optional accoutrements (such as catchment rings, gutters, funnels, filters, tubes, valves, pumps, and the like) can be either integrally or removably incorporated into the apparatus;

(m) to provide a portable multifunction apparatus incorporating a high-emissivity surface, such as a matte black surface, which can be used to collect water at night by radiative condensation processes;

(n) to provide a portable multifunction apparatus, which can be used as a fermentor, which in conjunction with the distillation function noted above, allows the apparatus to produce high grade spirits for fuel, medicinal, and other purposes;

(o) to provide a portable multifunction apparatus for the directional amplification of sound;

(p) to provide a portable multifunction apparatus optionally incorporating one or more pressure-deformable, planar, reflective membranes to allow the device to have a variable focal length;

(q) to provide a portable multifunction apparatus, which can be used as a thermal shelter, incubator, hydroponic growing chamber, greenhouse, frost shield, and/or general shelter from inclement weather or other environmental elements (e.g., mosquitoes, other biting insects, dust, debris, sunlight, etc.);

(r) to provide a portable multifunction apparatus, which can be used as a dehydrator, dryer, curing chamber, and/or sealed or vented work chamber;

(s) to provide a portable multifunction apparatus, which can be used as an optionally camouflaged wildlife viewing/hunting blind, animal cage, terrarium, aquarium, and/or aquatic growth chamber;

(t) to provide a portable multifunction apparatus, which can be used as a wind turbine to produce electrical and/or mechanical power; and/or (u) to provide a portable multifunction apparatus optionally incorporating one or more one-way valves to facilitate or enable use of the apparatus as a fluid pump.

A second main object of the invention is to provide a multifunction apparatus which optionally is extremely lightweight, fully collapsible, and compactly foldable so as to greatly facilitate portage and storage, thereby providing a high performance apparatus which is ideally suited to camping, backpacking, picnicking, boating, emergency use, disaster relief, and/or other situations (terrestrial or space-based) for which high mass-specific and/or high volume-specific performance is critical. Regarding portage and storage, specific (but optional) objects of this invention are:

(a) to provide a multifunctional apparatus having a primary structure comprised entirely of thin and/or very thin, high-strength membranes to minimize weight;

(b) to provide a multi-functional apparatus, which is inflatable (i.e., rigidizable and/or otherwise deployable) by using pressurized gas which generally need not (but may) be carried with the device;

(c) to provide a multifunctional apparatus, which is fully collapsible and compactly foldable when not in use to minimize volume;

(d) to provide a multifunctional apparatus which, due to its extremely low weight and stored (non-deployed) volume, yields very high mass-specific and volume-specific performance approximating 10000 watts per kilogram and 10 megawatts per cubic meter, respectively, when used terrestrially as a broad-spectrum solar concentrator; and/or (e) to provide a multifunctional device having extremely lightweight and compact inflation valves, for example, valves made from membranous material and including an interlocking tongue-and-groove (i.e., Ziploc®-type), clamped or tied, or self-sealing type closure mechanism.

A third main object of the invention is to provide a multifunctional apparatus, which optionally is safer to operate, transport, and/or store. Regarding safety, specific (but optional) objects of this invention are:

(a) to provide a portable multifunctional apparatus having an integral safety cage (preferably inflatable or otherwise fully collapsible), which forms a physical barrier around the focal point, thereby preventing accidental exposure to potentially dangerous concentrations of electromagnetic radiation;

(b) to provide a portable multifunctional apparatus having an integral safety cover to block radiation from striking the reflective membrane(s) when the device is not in use, thereby preventing the formation of and, thus, the risk of accidental exposure to potentially dangerous concentrations of electromagnetic radiation at or near the focal point;

(c) to provide a portable multifunctional apparatus having an integral reflector wrinkling mechanism for distorting the reflective membranes when not fully deployed (pressurized), thereby once again substantially preventing the formation of any unintentional, potentially dangerous concentrations of electromagnetic energy;

(d) to provide a portable multifunctional apparatus having one or more pre-formed parabolic reflective membranes, which limit the device to substantially fixed, short focal lengths, thereby enhancing safety by giving the operator greater control of the location of the highly concentrated energy at the focal point;

(e) to provide a portable multifunctional apparatus having one or more pre-formed, non-parabolic reflective membranes to limit the maximum degree of energy concentration to lower and, thus, safer levels;

(f) to provide a portable multifunctional apparatus having one or more means for off-axis light attenuation such as, for example, an off-axis light attenuation grating for attenuating power when the device is positioned off-axis, and/or a darkened transparent film for attenuating reflected light when viewing from a position substantially off-axis;

(g) to provide a portable multifunctional apparatus having one or more means for blocking and/or redirecting energy in proximity to the focal point so as to provide a quick power shutoff means and/or to capture and redirect stray electromagnetic rays (which also can improve performance); and/or (h) to provide a portable multifunctional apparatus having redundant inflatable (or otherwise collapsible) support structures (e.g., independent pressure envelopes) to mitigate the risk of catastrophic collapse or other failure.

A fourth main object of the invention is to provide a portable multifunctional apparatus that optionally is easier to deploy and/or operate. Regarding ease of use, specific (but optional) objects of this invention are:

(a) to provide an apparatus having various integral securing and storage features such as handles, apertured tabs, ties, weighting and storage pouches (especially those which are lightweight, compact, and can be made from extensions of the membranes out of which the apparatus is composed);

(b) to provide an apparatus having various integral accessory hardware attachment devices such as devises, clips, brackets, sockets, hook-and-loop patches, and other common fastening mechanisms (especially those which are collapsible to facilitate portage and storage);

(c) to provide an apparatus having various lightweight, portable mechanisms for supporting and orienting the device including, for example, an inflatable adjustable dipody support, a stack of inflatable tapered support/leveling rings, and/or an inflatable (or otherwise collapsible) spherical mounting element with a separate, optionally inflatable (floating), support ring;

(d) to provide an apparatus having lightweight, portable mechanisms for holding various items and/or accoutrements at or near the focal point including, for example, a collapsible, multipurpose rotisserie/kettle support, a collapsible multi-leg focal point support, and/or an inflatable focal point support;

(e) to provide an apparatus having one or more pre-formed, pressure-deformable reflective membranes, which can be fully deployed using significantly lower differential pressures across the membranes than devices employing planar reflective membranes, thus facilitating proper inflation;

(f) to provide an apparatus having integral or removably attached orientating and alignment features, such as a visual alignment guide, inclinometer, level, and/or magnetic compass, to facilitate alignment with an electromagnetic source and/or target, and/or for orienting the device for other purposes;

(g) to provide an apparatus having a light/heat intensity controller such as a louver or iris mechanism which is manually or automatically controlled;

(h) to provide an apparatus having various integrally or separately attached electronic and/or mechanical elements (to facilitate various applications) including but not limited to photovoltaic cells, electrical batteries, electric pumps, fans, drivers, timers, thermostats, controllers, and/or other useful devices; and/or (i) to provide an apparatus having a lightweight means for automated sun tracking.

A fifth main object of the invention is to provide a portable multifunctional apparatus, which optionally is more efficient, wherein two pressure deformable membranes are utilized to form a sub-ambient concave—concave reflector chamber configuration, thereby eliminating the plurality of losses inherent in devices having one or more intervening layers in the optical path, such as a transparent membrane of a super-ambient reflector chamber, through which light must pass at least once on its way to or from the focal point.

A sixth main object of the invention is to provide a portable multifunctional apparatus, which optionally is highly economical by virtue of its extremely simple, highly integrated construction, and which can thus be made universally available for both routine use as well as educational purposes. Regarding economy, specific (but optional) objects of this invention are:

(a) to provide a basic reflector apparatus (first and/or second main embodiment) made from a plurality of (generally four or more) sheets of thin, high-strength, high-elastic-modulus (preferably), commercially available material(s), plus the necessary valves, using a substantially flat pattern fabrication method that greatly simplifies manufacturing, tooling, and processing, thereby reducing fabrication cost;

(b) to provide a basic reflector apparatus (second embodiment), which can be fabricated from as few as two thin sheets of high-strength, commercially available material(s), plus the necessary valves, using simple, well-established manufacturing processes; and/or (c) to provide a modular field-deployable apparatus, wherein one or more of its modules (or components thereof) are sized to substantially match (i.e., have the same size as) other modules (or components thereof), so as to reduce fabrication cost by minimizing the number of different elements that need to be produced (but also to enhance versatility and facilitate repair).

A seventh main object of the invention is to provide a portable multifunctional apparatus that is optionally highly drop tolerant, otherwise damage tolerant, and easy to repair in the event of damage. Regarding damage tolerance and reparability, specific (but optional) objects of this invention are:

(a) to provide an apparatus having one or more redundant reflector chambers such that if one reflector chamber is damaged, the device is still operable;

(b) to provide an apparatus constructed primarily of highly flexible materials (optionally including multi-layered and/or fiber-reinforced composite materials which are puncture-resistant, tear-resistant, and/or abrasion resistant) such that the apparatus can be dropped intentionally (e.g., air dropped), dropped unintentionally (i.e., accidentally), and/or otherwise be subjected to harsh operating conditions yet sustain no appreciable damage; and/or (c) to provide an apparatus having integral quick-repair materials (e.g., self-adhesive patches and the like).

An eighth main object of the invention is to provide a portable multifunctional apparatus that is highly environmentally friendly by virtue of the fact that the apparatus generally requires no fuel to operate. Instead, the instant invention typically relies solely on radiating solar energy when used for heating, cooking, and the like, thereby minimizing air, water, and ground pollution. This is in stark contrast to other common portable cooking and heating equipment, which generally rely on the combustion of hydrocarbon fuels and, thus, inherently cause pollution through both combustion processes and unintentional fuel releases (e.g., spills, leaks, vapor releases, and the like).

It is a further object of the invention to provide improved elements and arrangements thereof for the purposes described which is inexpensive, dependable, and fully effective in accomplishing its intended purposes.

These and other objects of the present invention will become readily apparent upon further review of the following specification and drawing. However, it is once again emphasized that any particular embodiment or manifestation of the present invention need not perform all such functions or otherwise meet all such objects of the present invention as noted herein, thus prompting the use of the term "optional" and/or "optionally" when referring to the various objects of the invention in several of the preceding paragraphs. Specifically, any particular embodiment of the present invention can be configured to perform and/or meet only a limited number (or subset) of these functions and/or objects without departing from the basic nature of the invention.

DETAILED DESCRIPTION

Figure 1A:
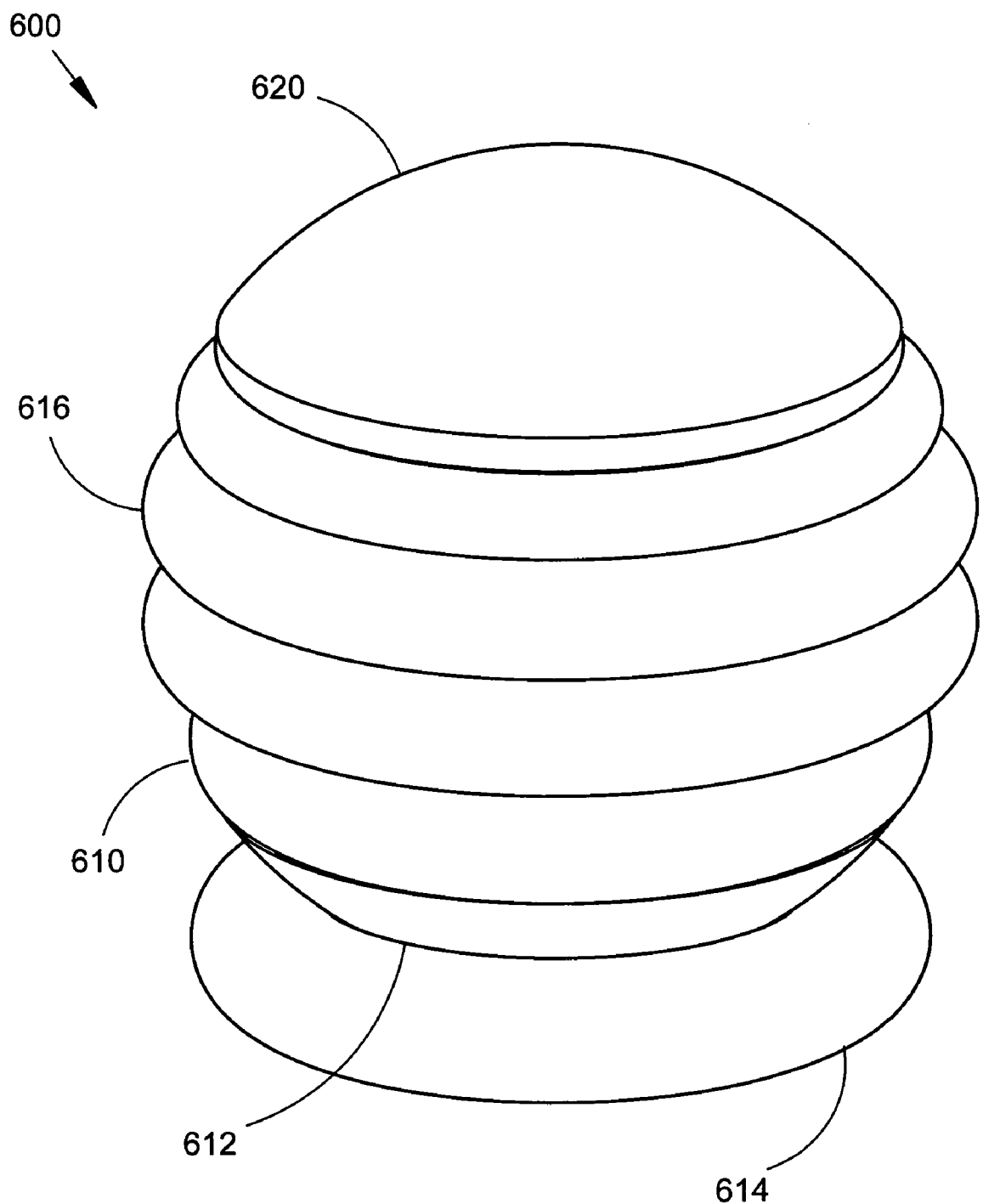
FIGS. 1A–C are, respectively, a schematic perspective view, a schematic side elevation cross-sectional view, and an exploded cross-sectional view of a typical modular, inflatable, multi-function, field-deployable apparatus.
Figure 1B:
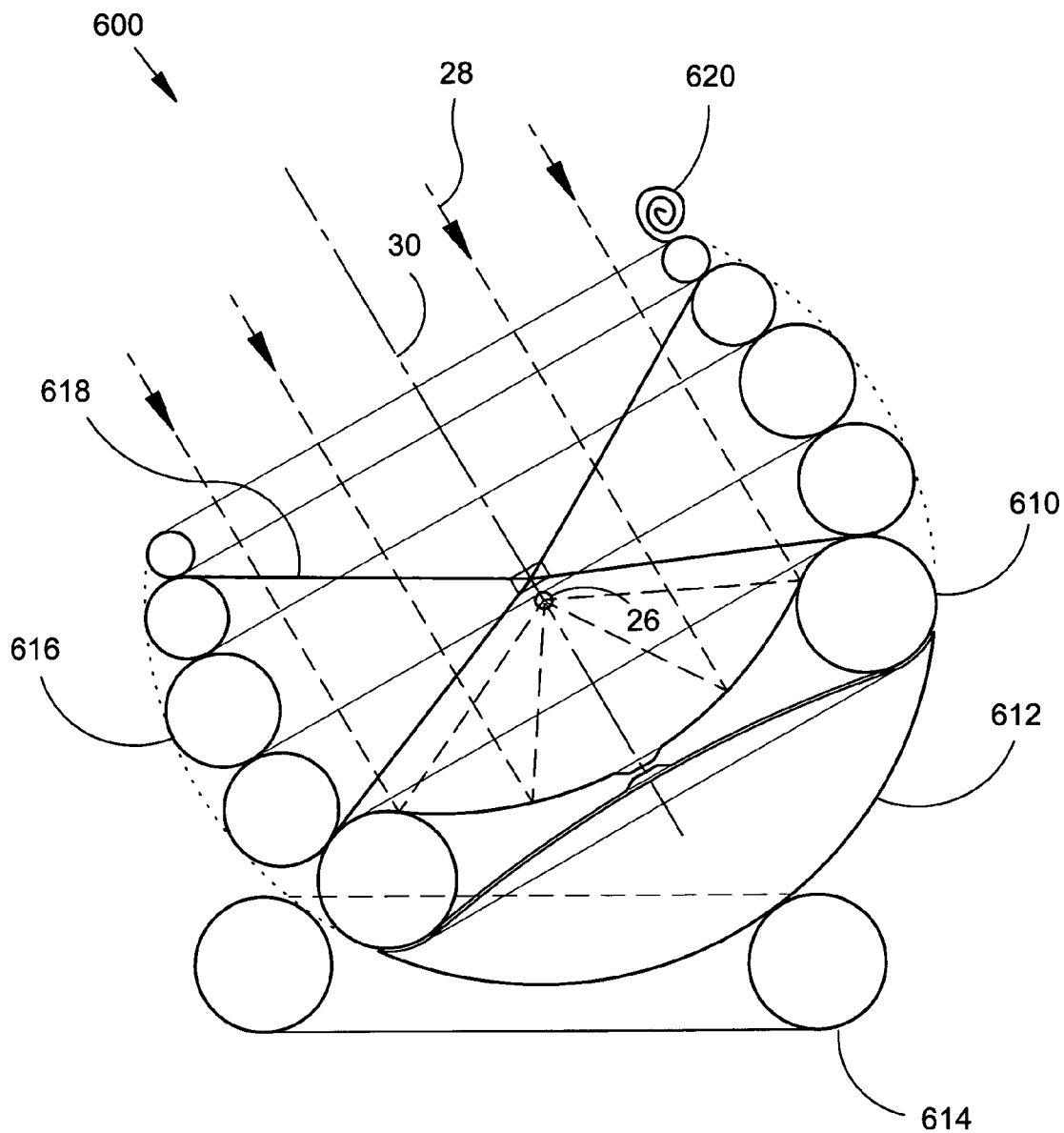
Figure 1C:
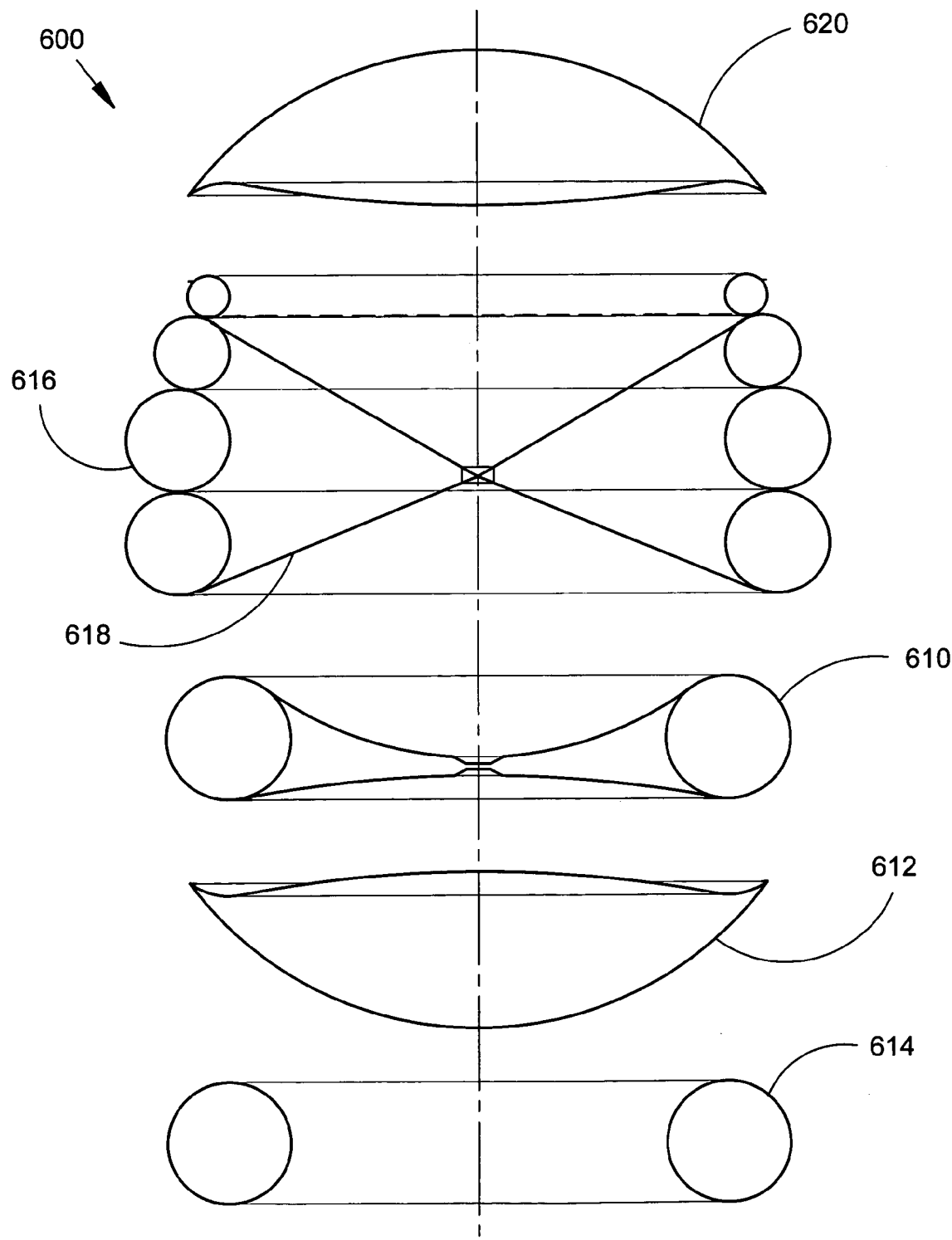

FIGS. 1A–C: Modular Inflatable Multifunction Apparatus

FIG. 1A depicts a typical modular, inflatable, multifunction, field-deployable apparatus 600 comprising as its primary functional element a basic inflatable multifunction reflector apparatus 610 in a preferred first embodiment configuration, which is supported on its lower side by a removably attached inflatable spherical support 612 movably couched within a separate inflatable toroidal ring 614, and which supports on its upper side a removably attached inflatable safety shield 616 or cage that further supports a removably attached cable-stayed support for holding various materials and/or accessory elements in proximity to the focal point of the basic reflector apparatus 610.

In addition to the safety shield, two other safety means are provided for protecting the user from accidental exposure to potentially dangerous, high concentrations of electromagnetic energy at or near the focal point. First, a removably attached inflatable protective safety cover 620 is shown attached to the upper potion of the safety cage in a deployed (inflated) condition. The protective safety cover can be quickly deployed to either attenuate the amount of electromagnetic energy striking the reflector when the apparatus is being used, or to fully block such electromagnetic radiation when the apparatus is not in use. Second, a protective safety net or mesh (not shown) is attached to the upper portion of the safety shield to restrict non-deliberate physical access to the focal point. Note that the safety net also can be used to provide a convenient support for a partially or fully deployed safety cover, and to structurally stabilize or reinforce the upper end of the safety shield.

Additionally, safety is further enhanced by a plurality of stabilizing cables or lines (not shown), which connect the movable upper portion of the modular apparatus to the surface (e.g., ground) upon which the lower support ring 614 of the apparatus 600 is resting.

Regarding physical construction, briefly note that each module of the apparatus typically is principally constructed from one or more thin flexible (e.g., pressure-deformable) membranes, one or more lightweight inflatable structures, and/or other flexible structural elements, such as cables, lines, nets, and the like. In addition, each of the inflatable and/or otherwise pressure-deployable modules includes one or more inflation or pressure adjusting means such as a simple plug-type valve (not shown); however, a variety of other well-known inflation or pressure adjusting means may be employed including, for example, manual or automatic pumps, pressurized gas canisters, and the like. Further, to enable the various modules of the modular apparatus to operate as a unit, each module typically includes one or more attachment means (not shown) for attaching the module to other modules, for attaching accessory elements, and/or for securing and stabilizing the apparatus as noted above.

FIG. 1B depicts the modular field-deployable apparatus 600 shown in cross-section concentrating radiant electromagnetic rays 28 (e.g., solar radiation), to heat an energy-absorbing accessory element (not shown), such as a pot, kettle, oven, and the like, suspended in proximity to the focal point 26 via a cable-stayed support 618. Note that the movable upper portion of the modular apparatus is positioned or couched within the lower support ring 614 to substantially align the focal axis 30 of the basic reflector module 610 with the incoming solar radiation 28. The safety cover 620 is shown retracted and secured with ties (not shown) (or other attachment means); however, note that the safety cover can be partially deployed, thereby providing an adjustable means for attenuating (i.e., reducing) the amount of concentrated radiant energy impinging upon the element held in proximity to the focal point.

FIG. 1C depicts an exploded cross-sectional view of the modular field-deployable apparatus 600 illustrating in greater clarity its primary modules and their basic physical constructions. Such modular construction allows the apparatus to be readily reconfigured by the user in the field to perform other user-selected functions, as will be shown hereinbelow. Further, such modular construction enhances safety by providing redundant structures, thereby effectively mitigating the risk of catastrophic collapse of the apparatus.

It should be noted that each of the primary modules of apparatus 600 may optionally comprise a plurality of user-selected, user-detachable sub-modules. For example, as shown hereinbelow, the basic reflector apparatus 610 may alternatively have one or more removable central membranes and/or a removable reflector chamber to increase versatility of the basic reflector apparatus 610 and/or modular apparatus 600. As another example, the inflatable safety cage module 616 is shown as having a plurality (e.g., four) of removably attached, individually inflated, toroidal rings. This multi-ring configuration also promotes versatility in that the rings can be separated and/or alternately combined with other elements of the apparatus to serve other functions, for example, use as water flotation devices. Note that the use of multiple, separately inflated rings for the safety shield also provides an effective means for mitigating the risk of rapid catastrophic collapse.

It should be further noted that the various modules and/or components thereof (e.g., sub-modules) are shown preferably sized, where possible, to substantially match the size of one or more other modules and/or components of the present apparatus, both to reduce fabrication cost, and to permit similarly sized modules or components to be easily interchanged to increase versatility and/or facilitate maintenance.

The invention also contemplates that one or more of the primary modules of the overall modular apparatus may be integrally attached and, optionally, simultaneously inflated by providing interconnecting gas ports between the integrally attached modules. Although such integration and interconnection may reduce structural redundancy, safety may nonetheless be enhanced, for example, by causing the safety shield to be deployed simultaneously with the reflector apparatus. The invention further contemplates various alternate configurations for each of its primary modules, several examples of which will be shown hereinbelow.

Figure 2A:
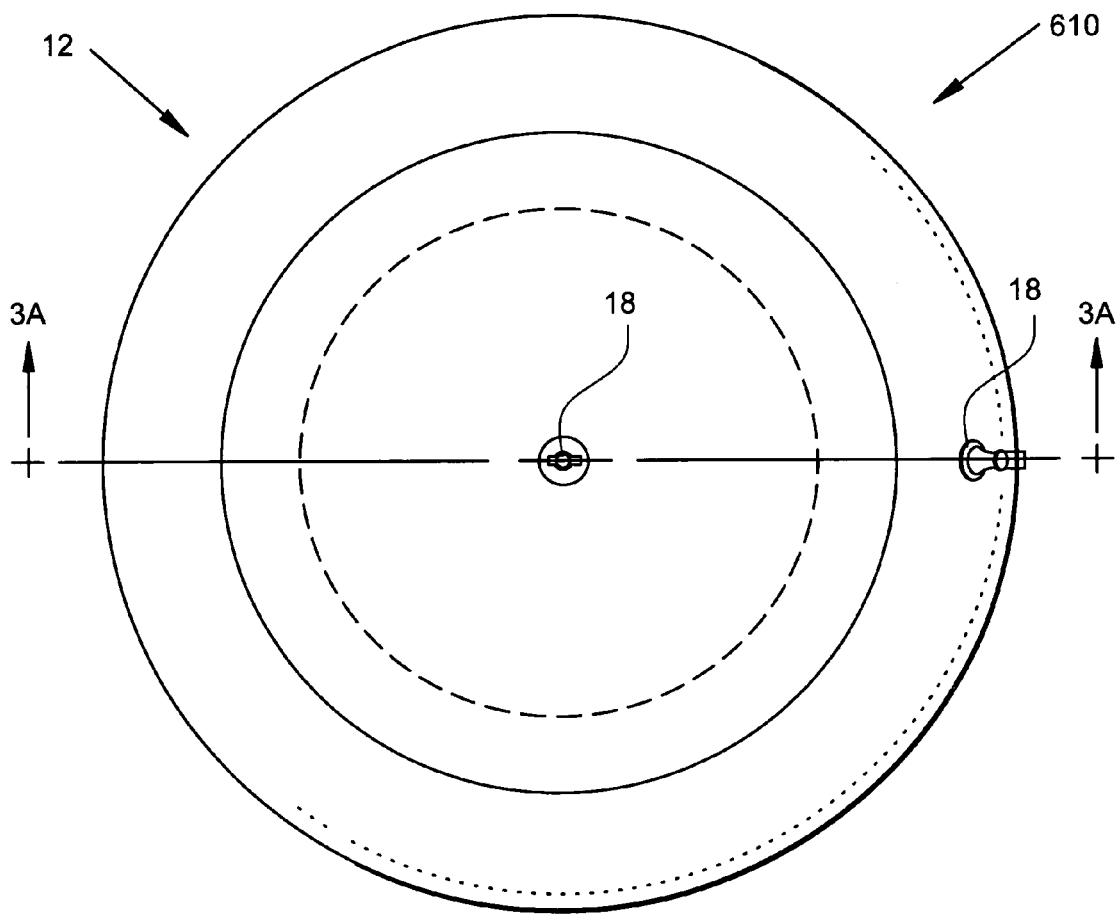
FIGS. 2A–B are, respectively, a schematic top plan view and a schematic side-elevation view of the basic inflatable reflector apparatus in a currently preferred first embodiment configuration.
Figure 2B:
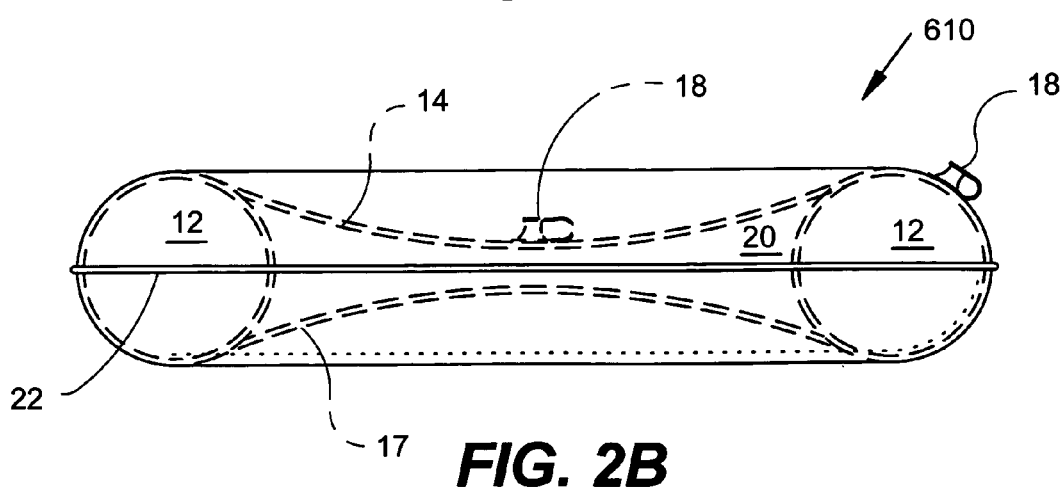

FIGS. 2A–D Description of the Basic Inflatable Reflector Apparatus—First Embodiment FIGS. 2A and 2B depict a currently preferred first embodiment configuration of the basic inflatable reflector apparatus 610, which is illustrated as an inflated toroid or ring support element 12 having a circular cross-section and supporting an upper frontal reflective membrane 14 and a lower transparent reflective membrane 17. The ring support element, as shown in FIGS. 2A–B, defines a vacant center. The two central reflective membranes 14, 17 in conjunction with the inner portion of the toroidal ring support element 12 provide or define a central reflector chamber (i.e., pressure envelope) 20 with a double parabolic, concave—concave configuration when inflated to a sub-ambient pressure, i.e., deployed in sub-ambient mode. The membranes 14, 17 each have a centered inflation valve 18 as an example of a pressure-adjusting or inflation means for inflating the reflector chamber 20. (Note that the valve 18 disposed in the transparent membrane 17 has been omitted from the figure.) The inflatable toroidal ring support element 12 also has a valve 18 as an example of an inflation means for inflating the ring support element to form a rigid ring. It should be noted that by utilizing the inner portion of the ring support element as an integral part of the reflector chamber, the first embodiment device 610 can be manufactured very economically from a minimum number of pieces.

The toroidal ring support element 12 is fabricated from two sheets, which are substantially flat and annular prior to inflation, and which are adhesively or thermally bonded to each other along continuous seams 22 at their inner and outer periphery to form a toroid upon inflation, as one example of forming the toroid. The two sheets comprising the toroid 12 are made of a high-strain-capable material, i.e., a material having high strength and low elastic modulus, such as vinyl, which is necessary for allowing the inner potion of a toroid fabricated from flat annular sheets to strain (i.e., stretch) sufficiently so as not to impede full inflation of the toroidal ring support element 12.

The central pressure-deformable membranes 14, 17 are made from thin circular sheets of high-strength, flexible material such as nylon or Mylar®, a polyethylene terephthalate plastic composition. Reflective surface 24 is provided by preferably coating the outer side of the membrane 14 with vapor deposited aluminum and the like reflective material. The reflective membrane 14 is thermally or otherwise pre-formed during fabrication into the shape of a paraboloid to provide a short, fixed focal length for safety purposes and to reduce the differential pressure required to fully deform and smooth the reflective membrane 14, thus facilitating deployment as well as reducing the loads imposed on the support ring by the reflective membrane (mechanical loads) and the reflector chamber (pressure loads). The transparent membrane 17 optionally may also be pre-formed to reduce the load it imposes on the support ring. Seams 22 are provided for adhesively or thermally bonding the periphery of the central membranes 14, 17 to the toroid 12 at or near what will become circular lines of tangency between the central membranes 14, 17 and the toroidal ring support element 12 upon inflation.

Numerous alternate toroid configurations can be incorporated (i.e., substituted) into the basic first embodiment device as described above. FIG. 2A shows that the toroidal ring support element 12 has a circular planform; however, it is noted that the invention can be practiced using other types of supports including those having hexagonal, square, rectangular, elliptical, and other planforms. (Note that planforms having at least one substantially linear peripheral edge may prove useful for orienting and/or stabilizing the apparatus.) Furthermore, the simple two-sheet construction of the toroid as described above may be replaced with various alternate toroidal ring support elements offering greater performance and stability, but generally at the expense of somewhat greater complexity. For example, the toroid optionally may be fabricated from a plurality (e.g., generally four or more) flat annular sheets of high modulus material, such as described in our previous (cross-referenced) applications, which also describe several other alternate configurations. Additionally, it should be noted that the invention is not intended to be limited to the specific materials and/or configurations as specified above for the toroid. Depending on the configuration, the toroid can be made from any suitably flexible material, including various other substantially polymeric materials, including monolithic, layered, and/or fiber-reinforced composite material.

Similarly, numerous alternate central pressure-deformable membrane configurations can be incorporated (i.e., substituted) into the basic first embodiment device as described above. For example, the invention can be practiced using a planar (i.e., non-pre-formed) pressure-deformable reflective membrane to yield a device capable of providing a variable focal length as a function of the differential pressure imposed across the reflective membrane 14. Furthermore, the use of pre-formed, non-parabolic reflective membranes (e.g., reflective membranes having surfaces which are spherical, undulating, dimpled, faceted, or which comprise a series of conic sections, and the like) is contemplated to limit the maximum degree of concentration to further enhance safety and/or to provide more uniform heating. The invention can also employ a redundant reflective membrane such as described in our previous cross-referenced applications (e.g., the transparent membrane can be replaced with a reflective membrane to provide a second reflector having optionally similar or significantly different optical properties, such as focal length). It should be noted that the invention is not intended to be limited to the specific materials and/or configurations as specified above for the central pressure-deformable membranes. Similar to the toroid, depending on the configuration, the central membranes can also be made from any suitably flexible material, for example, other substantially polymeric materials, including monolithic, layered, and/or fiber-reinforced composite materials. Additionally, the reflective surface can be provided by a plastic reflective membrane, which alternatively has reflective particles homogeneously incorporated, or which contains an integral conductive wire or mesh, all of which tend to selectively reflect or filter the impinging radiation. Also, the device may optionally incorporate membranes having other arbitrary but useful optical properties such as selective transparency, translucency, opacity, color, texture, and/or polarization for practical and/or artistic applications.

Regarding valves, note that the pre-formed pressure-deployable central membranes are shown (in FIGS. 1B and 1C) as having a funnel-shaped region surrounding the centered inflation valve to facilitate fluid collection. Membranous valves may also be employed, including those having self-sealing means such as used in toy balloons, or Ziploc® type tongue-and-groove sealing means.

To fully deploy the basic first embodiment device 610 in sub-ambient mode as shown in FIGS. 2A and 2B, the device, which is typically compactly folded for portage and storage, is first unfolded to gain access to the inflation valves 18. Subsequently, the toroidal ring support element 12 is inflated to a super-ambient pressure to rigidize the ring support element 12 as is necessary to properly support and tension the central membranes 14, 17. The reflector chamber 20 is then inflated to a sub-ambient pressure (as is required for most applications) to deform and smooth the reflective membrane 14 into a concave, substantially parabolic reflector. Finally, the focal axis of the parabolic reflective membrane is appropriately oriented toward the energy source and/or target, as required for a particular application or mode of operation. As previously noted, the first main embodiment device 610 can also be deployed in super-ambient mode as shown later in this document.

Figure 2C:
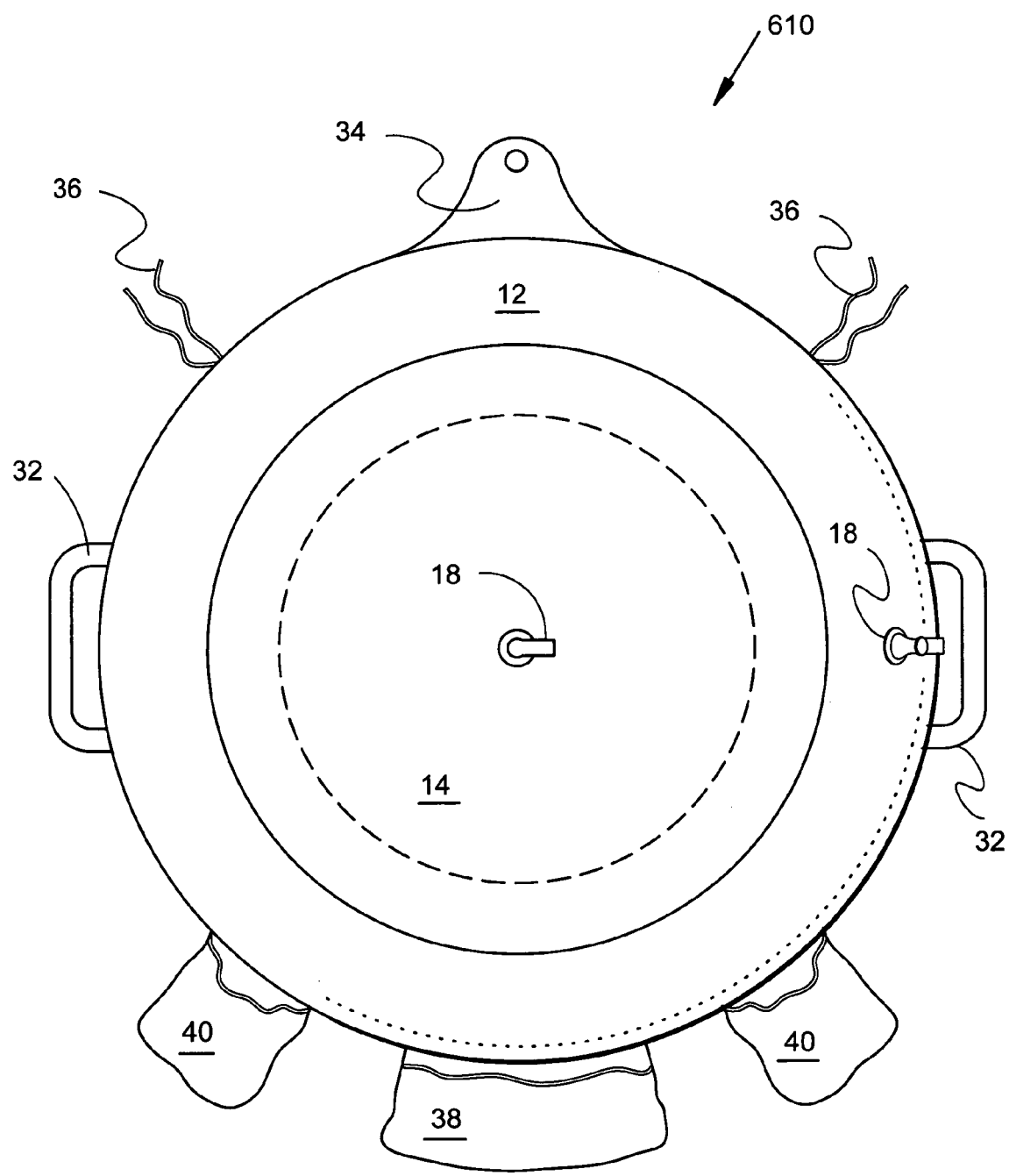
FIGS. 2C–D are a schematic top plan view and a schematic side elevational view of the basic inflatable reflector apparatus showing various optional attachment means for attaching other modules, for connecting other accessory elements, and/or for securing the apparatus as exemplary of the various attachment means which also may be included in the other modules.

FIG. 2C depicts a currently preferred first embodiment configuration of the basic inflatable multi-function reflector apparatus 610 further including various optional accessory attachment means for attaching other modules, for connecting other accessory elements, and/or for securing and stabilizing the apparatus. A pair of handles 32 is positioned diametrically on the sides of the toroid 12. An apertured tab 34 is provided on a side equidistantly between the handles 32 for hanging up when in storage or the like. A pair of tying or hanging straps 36 is attached on either side of the apertured tab 34. A storage pouch 38 is provided for storing the deflated and folded apparatus 610. A pair of bottom pouches 40 is provided for filling with dense material to stabilize an upright apparatus 610. It should be noted that these appendages can be incorporated into the device in any useful quantity, location, and combination thereof. It should also be noted that each of these appendages is highly amenable to fabrication from thin membrane materials to minimize size and weight to facilitate portage and storage, and that each can be fabricated fully or in part from extensions of the central membranes 14, 17 and/or the membranes comprising the toroidal support element 12 to facilitate manufacturing.

Figure 2D:
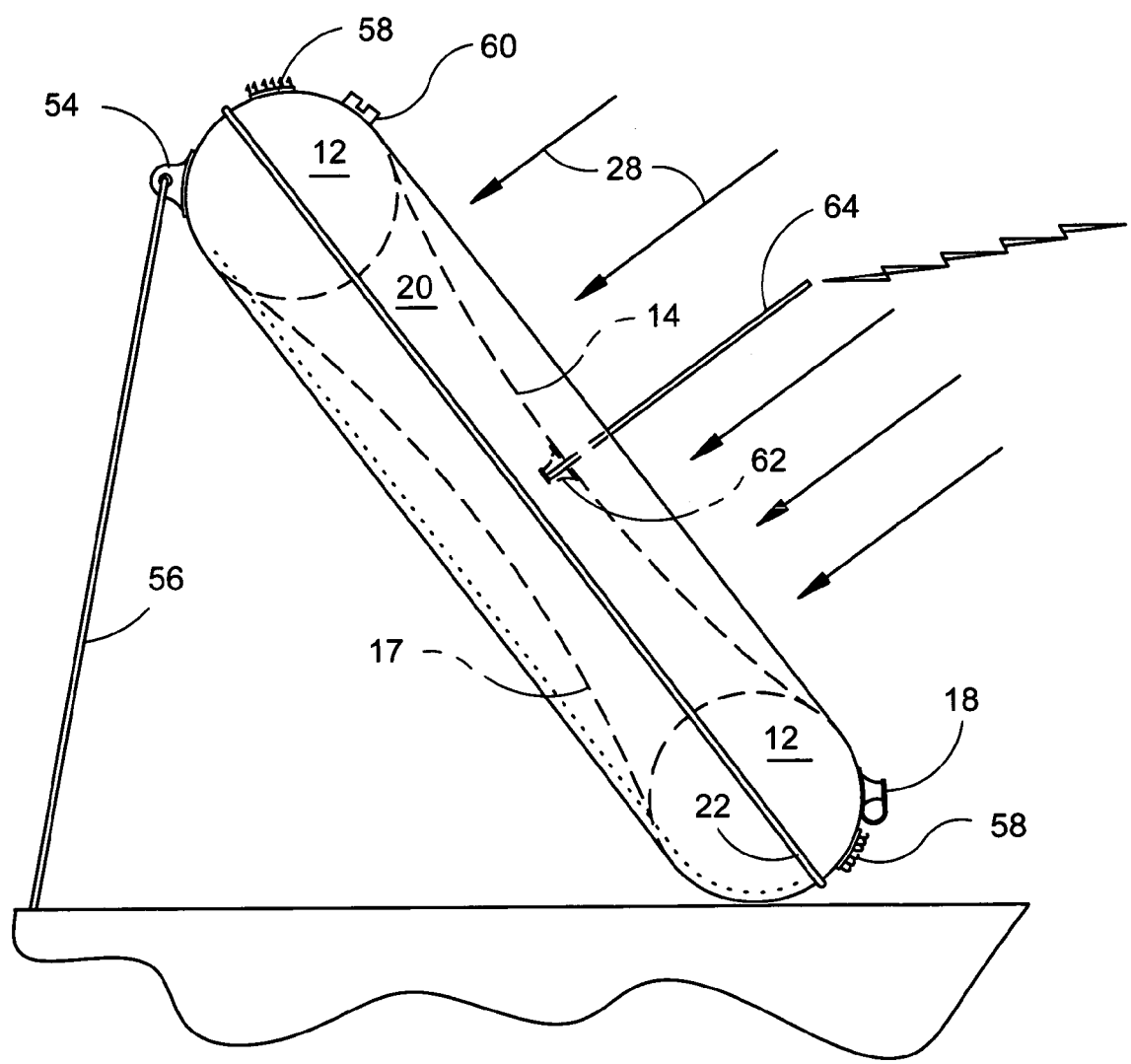

FIG. 2D depicts other various optional attachment devices which are generally rigid or semi-rigid, but which are preferably collapsible to facilitate portage and storage. Examples include a clevis, shackle, clip or bracket 54 for attaching various accessory elements including, for example, a support rod 56 or a line. Hook-and-loop fastening patches 58 and a mounting stud 60 are also provided for attaching various accessory elements. A centered socket 62 is shown in the upper frontal reflective membrane 14 for supporting other accessory elements including, for example, an antenna 64.

It should be noted that any of these attachment devices can be incorporated into the basic reflector apparatus 610 (or any other module, sub-module, and/or accessory elements of the present invention, including any alternate embodiments or configurations thereof) in any useful quantity, location, and combination thereof. Further, one or more of these attachment means may be combined or otherwise integrated with other various features of the present invention to facilitate manufacture or for other purposes. For example, an inflation valve 18 may be combined with a mounting bracket 54, hook-and-loop fastening patches 58, a socket 62, or the like.

Figure 3A:
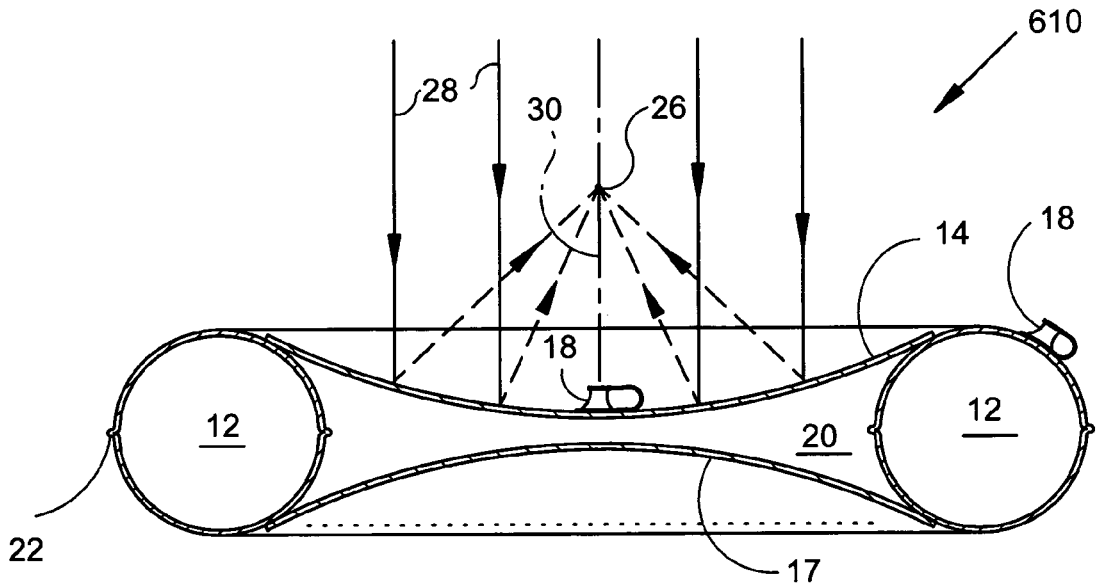
FIGS. 3A–3B are schematic cross-sectional views of the basic first embodiment reflector apparatus being used to concentrate and project, respectively, radiant electromagnetic energy with its reflector chamber deployed in sub-ambient mode.

FIGS. 3A–G Operation of the Basic Inflatable Reflector Apparatus—First Embodiment FIG. 3A depicts the first main embodiment device 610 deployed in sub-ambient mode as an electromagnetic radiant ray concentrator having the focal axis 30 of the pre-formed parabolic reflective membrane 14 oriented toward the sun (not shown). The radiant solar rays 28 are reflected by the pre-formed parabolic reflective membrane 14 to focus on an energy-absorbing object (not shown) placed at the focal point 26.

Regarding the instant device's ability to capture and concentrate electromagnetic radiation, it should first be noted that a device deployed in sub-ambient mode allows the electromagnetic rays to travel unobstructed to and from the reflector, thus providing superior capture efficiency relative to much of the prior art as well as the second main embodiment of the instant invention (capture efficiency is defined herein as the portion of the incoming radiant energy that is delivered to the focal point and local surrounding area). As an example, when operated in sub-ambient mode as a terrestrially-based solar concentrator as shown in FIG. 3A, the first main embodiment device has an effective capture efficiency exceeding 90%, which is limited only by the reflective efficiency of the membrane and the transmission and dispersion characteristics of the surrounding atmosphere. Second, although a reflective parabolic surface is the ideal geometry for reflecting all incoming parallel radiant rays to the focal point and, thus, producing extremely high theoretical concentrations of energy, the ability of the instant device to concentrate energy is limited by several factors including, but not limited to, the geometric precision of the reflective membrane and, hence, its supporting toroidal ring support element, the capture efficiency of the device as noted above, the apparent finite angular diameter of the source (e.g., the sun), and the wavelength of the radiation relative to the diameter of the reflector. Despite these and other limiting factors, a precisely constructed first embodiment device used as a terrestrially-based solar concentrator has the ability to concentrate sunlight by factors in excess of 10,000.

Regarding safety, as one consequence of having a pre-formed reflective membrane 14, the device has a fixed focal length, i.e., the focal point is located at a substantially fixed distance from the reflective membrane along the focal axis of reflector 14. This fixed focal length greatly enhances safety by allowing the user to maintain greater control of the location of any potentially dangerous high concentrations of electromagnetic radiation at the focal point. A second consequence of employing thermally or otherwise pre-formed reflective membranes is that pre-forming allows the reflectors to achieve significantly shorter focal lengths than is practical using non-pre-formed, planar membranes due to the limited ability of planar membranes to elastically deform. The very short focal lengths achieved by such deeply pre-formed reflective membranes further enhance safety by providing the user with even greater control over the location of the concentrated electromagnetic radiation.

Figure 3B:
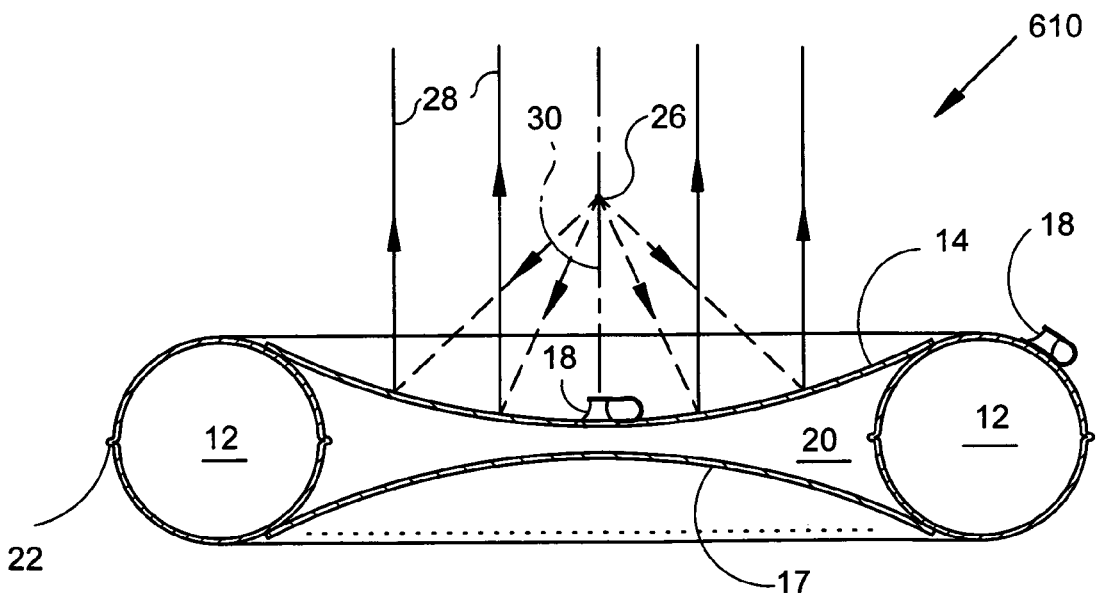

FIG. 3B depicts a first main embodiment device 610 deployed in sub-ambient mode as a radiant ray projector with the same reflector structure 20 as shown in FIG. 3A, but projecting a collimated beam of the electromagnetic rays from a non-collimated light source (not shown) such as a light bulb, lamp, or candle placed at the focal point 26 to a distant object (not shown). It should be noted that the selection of the concentrating or projecting mode depends on the position of the light or other electromagnetic source relative to the focal point of the device.

It should be further noted that the focal axis of the pre-formed parabolic reflective membrane 14, as depicted in FIGS. 3A and 3B, is coincident with the axis-of-revolution of the toroidal support element 12, thereby causing the focal point of the device to be aligned with the axis-of-revolution of the toroid and, thus, to be located directly above the center of the reflective membrane. However, the reflective membrane 14 may be pre-formed and/or attached to the toroid support element 12 in such a manner that the focal point of the device 610 is located off the axis-of-revolution of the support ring 12. Note that such "off-axis" reflectors can facilitate orientating the device relative to the energy source and/or target for certain applications.

Figure 3C:
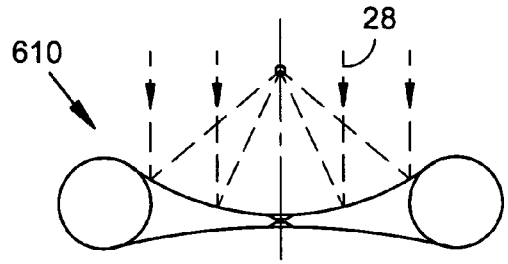
FIGS. 3C–F are schematic cross-sectional views of the basic first embodiment reflector apparatus being used to manipulate radiant electromagnetic energy with its reflector chamber deployed in sub-ambient mode (FIG. 3C) and, alternatively, in super-ambient mode (FIGS. 3D–G).
Figure 3D:
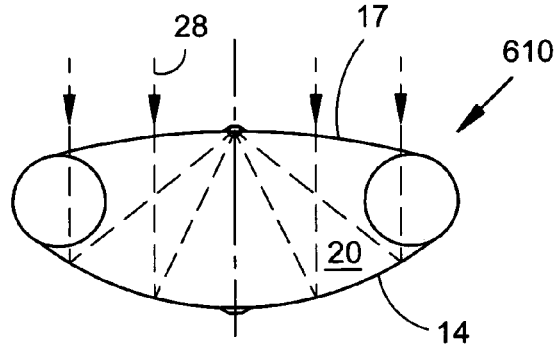

FIG. 3C depicts the apparatus 610 in sub-ambient mode. In contrast, FIG. 3D depicts the basic first embodiment reflector apparatus 610 being used to concentrate radiant electromagnetic energy 28 with its reflector chamber 20 alternatively deployed in super-ambient mode (i.e., the reflector chamber is inflated to a super-ambient pressure to outwardly deploy the reflective membrane). Note that central membranes 14, 17 are pre-formed such that the focal point is located substantially at the surface of the transparent membrane 17 of the super-ambient pressurized reflector chamber 20, thereby allowing the transparent membrane 17 to directly support a suitable electromagnetic accessory device (not shown) in proximity to the focal point.

Figure 3E:
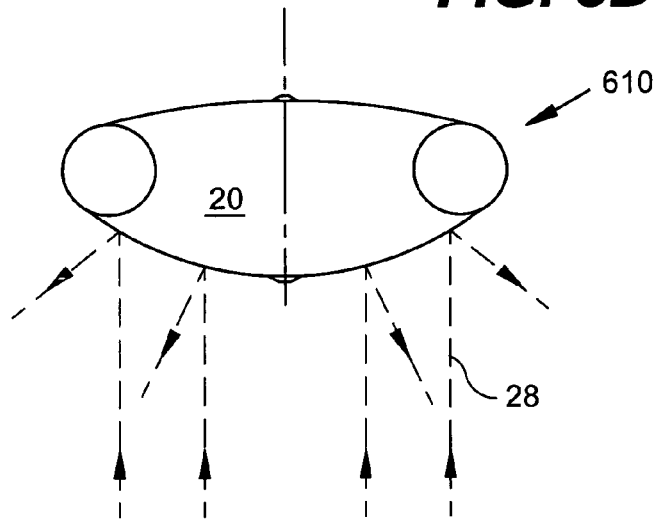

FIG. 3E depicts a first main embodiment device 610 deployed in super-ambient mode as a radiant ray diffuser with the same reflector structure 20 as shown in FIG. 3D, but used alternatively as a convex mirror, such as for expanding the user's field of view for surveillance or safety. More specifically, the apparatus can serve as an economical field-deployable convex mirror, which can be used, for example, to allow a vehicle operator to see around a blind corner.

Figure 3F:
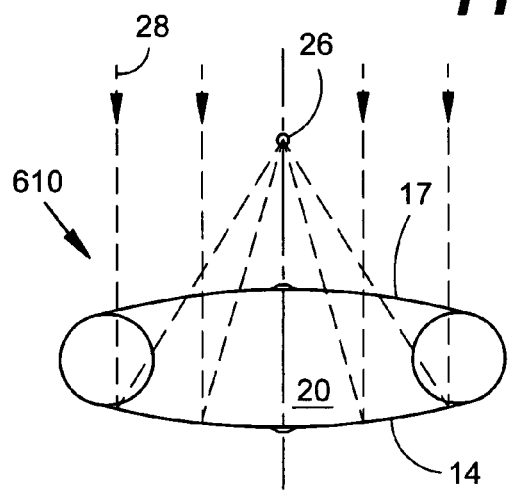

FIG. 3F depicts a modified basic first embodiment reflector apparatus 610 being used to concentrate radiant electromagnetic energy with its reflector chamber 20 deployed in super-ambient mode, wherein the central membranes 14, 17 are pre-deformed such that the focal point 26 is located outside the super-ambient pressurized reflector chamber 20.

Figure 3G:
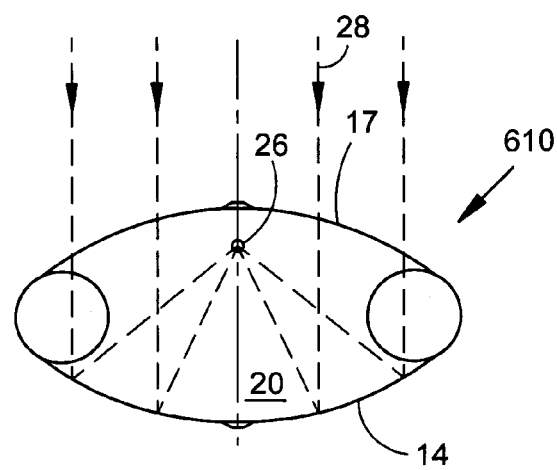

FIG. 3G depicts a modified basic first embodiment reflector apparatus 610 being used to concentrate radiant electromagnetic energy with its reflector chamber 20 deployed in super-ambient mode, wherein the central membranes 14, 17 are pre-deformed such that the focal point 26 is located within the super-ambient pressurized reflector chamber 20.

Figure 4A:
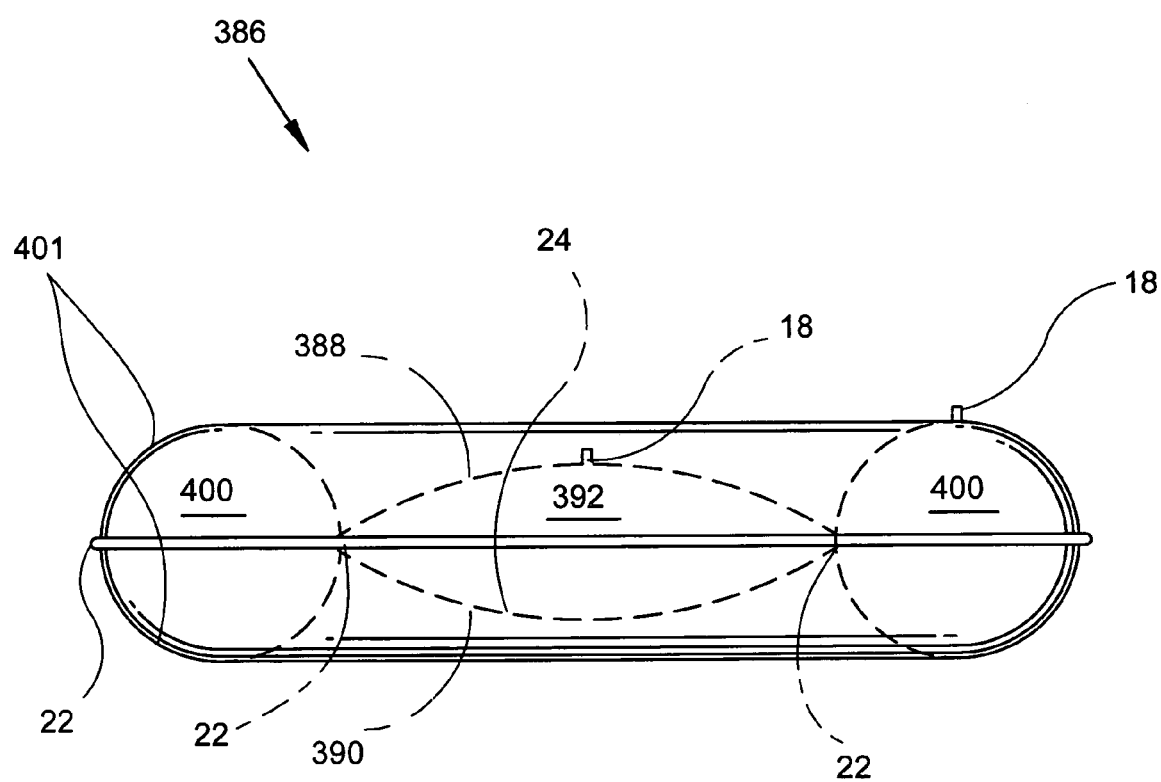
FIG. 4A is a schematic side-elevation view of the basic inflatable reflector apparatus in a second embodiment configuration.
Figure 4B:
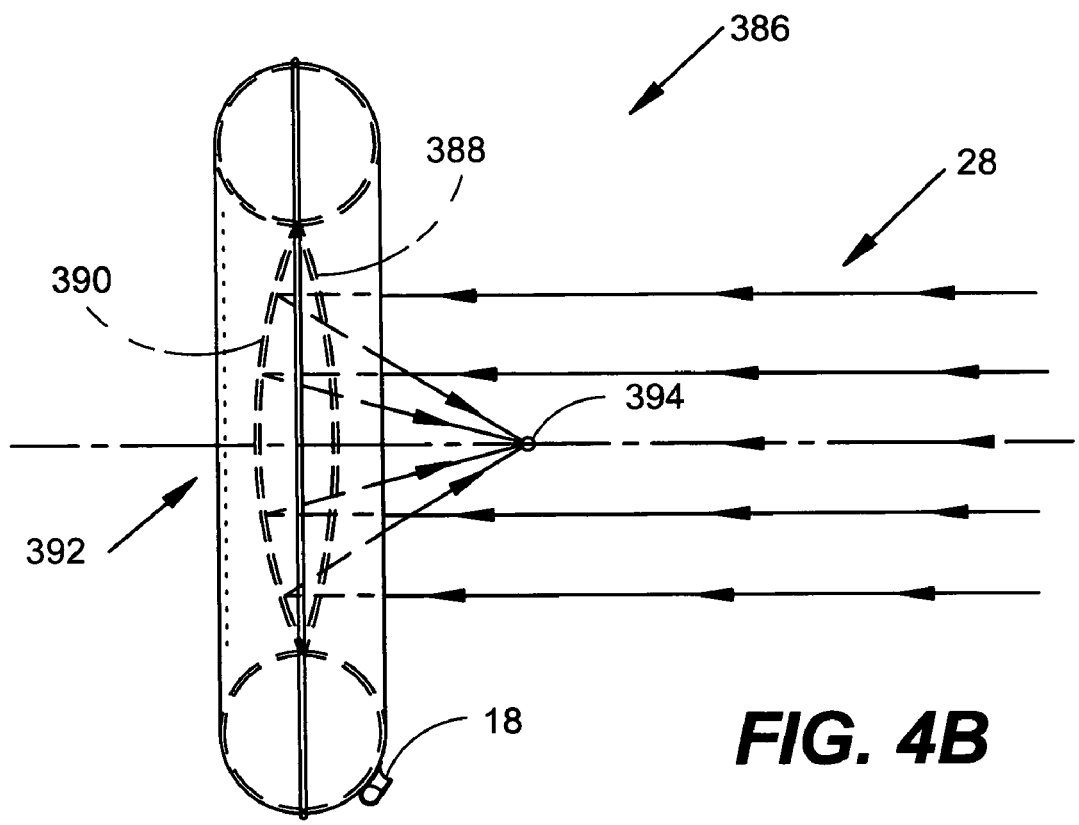
FIGS. 4B–C are schematic side-elevational views of the basic inflatable reflector apparatus in a second embodiment configuration illustrating the operation of various preferred and alternate reflector chamber configurations.
Figure 4C:
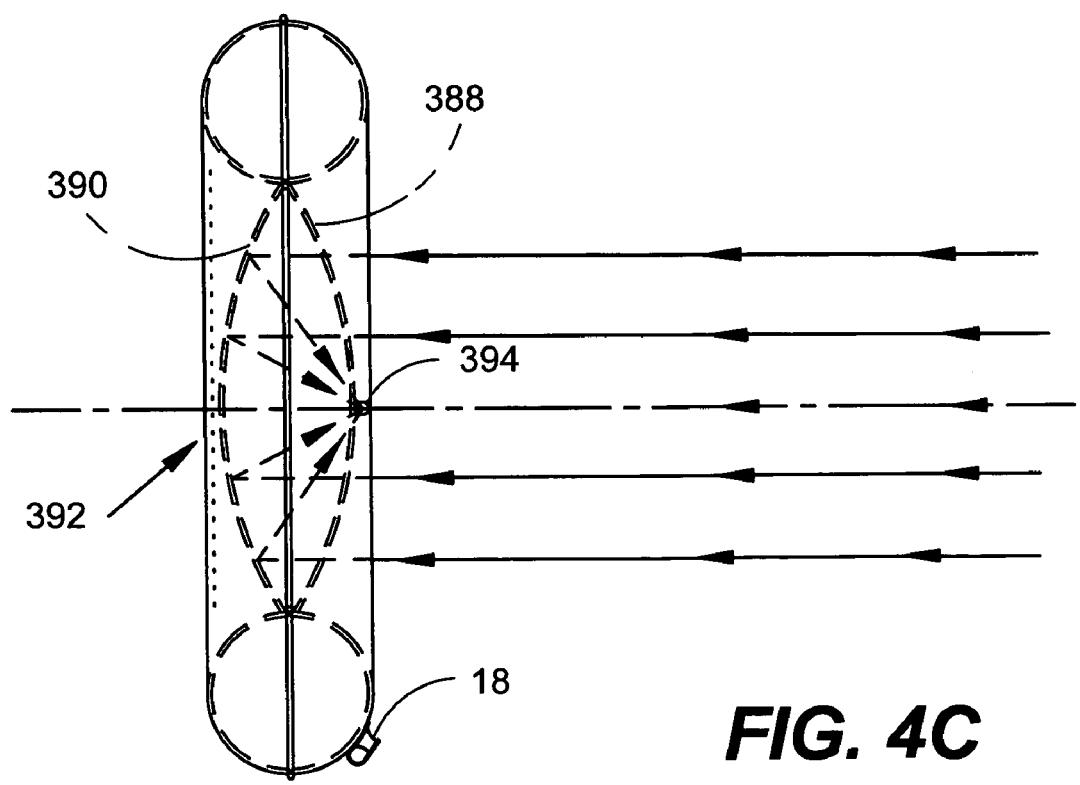

FIGS. 4A–C Description and Operation of the Basic Inflatable Reflector Apparatus—Second Embodiment In FIG. 4A, the second main embodiment device 386 is illustrated as an inflated toroid or ring support element 400 supporting an upper transparent membrane 388 and a lower reflective membrane 390. The transparent membrane 388 and reflective membrane 390 provide a central reflector chamber (i.e., pressure envelope) 392 with a double parabolic convex—convex lens configuration when inflated to a super-ambient pressure. The transparent membrane 388 has a centered inflation valve 18 for inflating the reflector chamber 392; however, it is noted that the inflation valve 18 may alternatively be located at any other useful location such as in the reflective membrane 390. The inflatable toroidal support element 400 also has a valve 18 for inflation to form a rigid ring. Two valves are shown for separate inflation of the ring support 400 and the reflector chamber 392; however, it is noted that the two pressure envelopes (the toroid 400 and the reflector chamber 392) can be interconnected, thereby allowing both super-ambient pressure envelopes to be inflated with a single valve 18.

The toroidal support element 400 is fabricated from two thin sheets 401 of material, each of which is fully pre-formed into the shape of a half toroid and adhesively or thermally bonded to each other along continuous seams 22 at their inner and outer periphery, as one example of forming the toroid. The two sheets 401 comprising the toroid 400 are made of a flexible, high-strength material capable of being thermally or otherwise pre-formed, such as vinyl, nylon, and the like.

The transparent membrane 388 is made from a thin circular sheet of transparent, high-strength, flexible material such as Mylar® or Nylon. The reflective membrane 390 is also made from a thin circular sheet of high-strength, flexible material such as Mylar® or Nylon; however, a reflective surface 24 is provided by coating the inner side (preferred, but not necessary if the uncoated membrane material is otherwise transparent) of the membrane 390 with vapor deposited aluminum and the like reflective material. The reflective membrane 390 is pre-formed during fabrication substantially into the shape of a paraboloid to provide a substantially fixed, short focal length for safety purposes, and to reduce the differential pressure required to fully deform and smooth the reflective membranes 390 to facilitate deployment. The transparent membrane 388 is optionally also pre-formed, primarily to reduce loads imparted on the support ring; however, the transparent membrane 388 also can be pre-formed for other purposes, such as to facilitate supporting an accessory element in close proximity to the focal point as will be shown below. However, the transparent membrane need not be pre-formed (or it can be pre-formed to a different extent than the reflective membrane), thus yielding an asymmetrical reflector chamber. Seams 22 are shown for adhesively or thermally bonding the outer periphery of the reflective and transparent membranes 388, 390 to the inner edge of the toroid 400. This basic, four-sheet, fully pre-formed construction represents a first species of the second main embodiment device 386.

Similar to the first embodiment, it should be noted that several alternate toroid, central membrane, and valve configurations can be incorporated (i.e., substituted) into the basic second embodiment device as described above. In addition to having alternate plan forms, the simple two-sheet toroidal support element 400 as described above may be replaced with alternate support rings offering greater performance and/or stability, but generally at the expense of somewhat greater complexity. However, such alternate support ring configurations for the second embodiment are limited to those particular configurations wherein the portion of the support ring to which the reflector chamber is bonded does not move appreciably in the radial direction upon inflation. Otherwise, either the reflector chamber will generally restrict proper inflation of the toroid resulting in a buckled ring structure, or the inflated ring will not properly tension the perimeter of the reflective membrane. Numerous alternate membrane configurations can be incorporated (i.e., substituted) into the basic second embodiment device as described above including membranes having any of the alternate shapes, functional characteristics, optical properties, constructions, and materials as noted for the first embodiment. The many optional valves or other inflation means available for the first embodiment are also available for the second embodiment. Note that our previous (cross-referenced) applications describe several useful alternate configurations for the toroid, membranes, valves, and other elements, all of which are generally applicable to the present invention.

FIG. 4B depicts the second main embodiment 386 in an electromagnetic radiant ray concentrating mode having the transparent membrane 388 facing the sun (not shown). The radiant solar rays 28 are illustrated as passing through the transparent membrane 388 to the reflective membrane 390, which then reflects the rays back through the transparent membrane 388 to focus on an energy-absorbing object 394 placed at the focal point of the device 386. Although the figure shows the focal point to be outside of the reflector chamber, it should be noted that the reflective and transparent membranes can each be pre-formed or otherwise deformed to any predetermined shape or extent (e.g., deeply pre-formed, moderately pre-formed, non-pre-formed, etc.) such that the focal point alternatively is located inside the reflective chamber, or at the surface of the transparent membrane, such as shown in FIG. 4C. However, the reader is cautioned that the latter case should be restricted to low-power (e.g., radio frequency) applications to prevent the possibility of thermally or otherwise damaging the transparent membrane and/or any integral or removable elements attached to the surface of the transparent membrane at or near the focal point. Additionally, by pre-forming the reflective membrane and transparent membrane to different extents, an asymmetrical reflector chamber is provided. For example, an apparatus may have a deeply pre-formed reflective membrane and a slightly pre-formed transparent membrane to yield an asymmetrical reflector chamber having a very short focal length. In contrast, an apparatus may have a slightly pre-formed reflective membrane and a deeply pre-formed transparent membrane to yield an asymmetrical reflector chamber having a relatively long focal length.

The basic second embodiment reflector apparatus may have an alternate configuration, wherein the attachment means for the central reflector chamber is offset or displaced from the inner periphery of the toroidal support ring to accommodate a larger reflective membrane.

Additionally, the basic second embodiment reflector apparatus may have an alternate configuration, wherein the attachment means for the central membranes of the reflector chamber are offset or displaced in opposite directions from the inner periphery of the toroidal support ring to accommodate a still larger reflective membrane. Note that this configuration is similar to that of the first embodiment except that the transparent membrane is highly pre-deformed to an extent that the apparatus cannot operate in sub-ambient mode (i.e., the central membranes would experience significant interference).

Figure 5A:
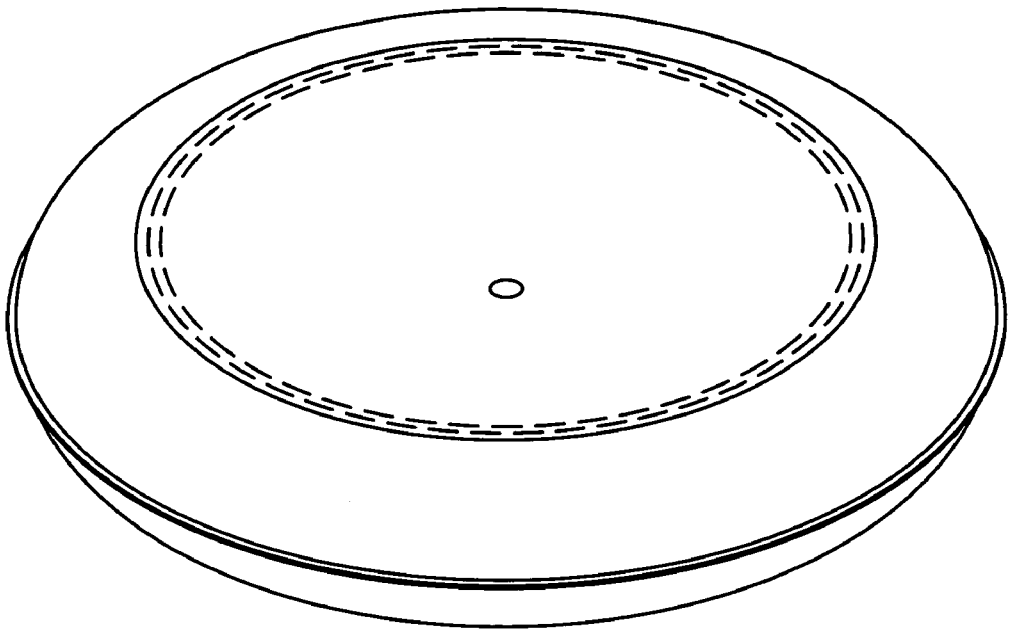
FIGS. 5A–C are, respectively, a schematic perspective view, a schematic diametrical cross-sectional view, and a schematic partial cross-sectional view of a modified basic first embodiment reflector apparatus having a removably attached central pressure-deformable membrane.
Figure 5B:
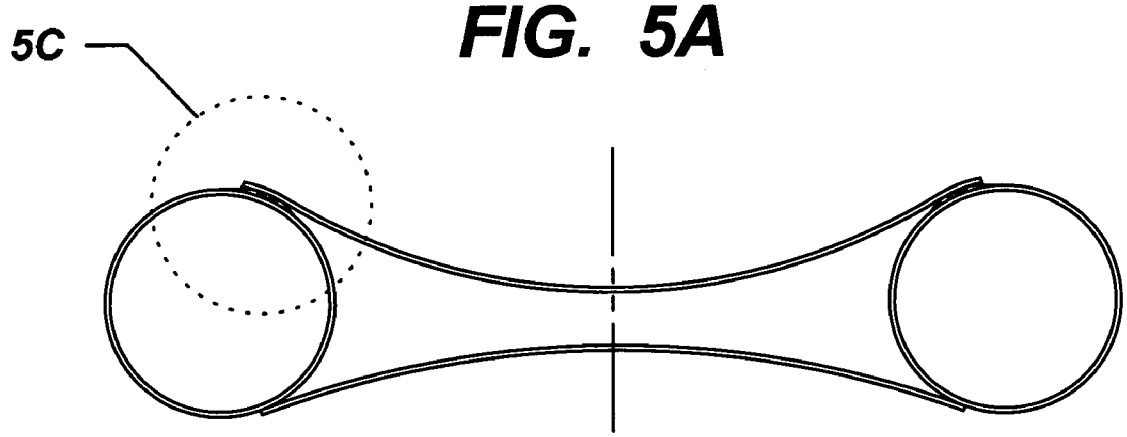
Figure 5C:
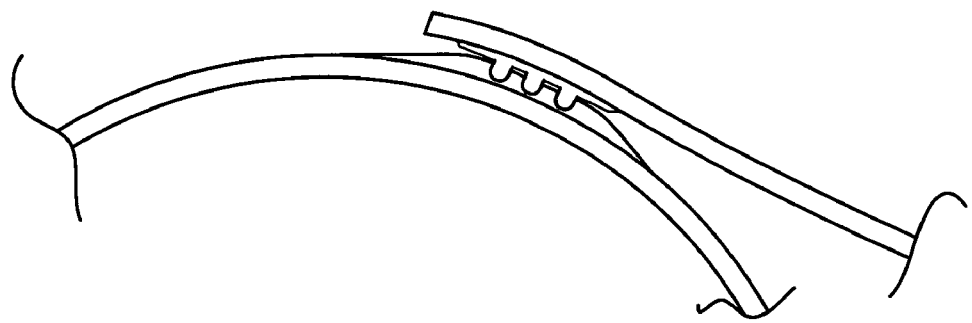

FIGS. 5A–C Removable Central Membranes

FIGS. 5A–C depict a modified first embodiment basic reflector apparatus having a removable upper central membrane, which is removably attached via a quick attachment and sealing means, such as a tongue-and-groove fastening mechanism, to the toroid. FIG. 5C shows the removable membrane having an affixed integrated multi-tongue element inserted into a multi-groove element affixed to the toroid. The use of multiple tongues and grooves provides structural and sealing redundancy; however, a single tongue-and-grove can be used to promote economy. The lower central membrane optionally may also be removably attached by such means. Note that such means for removably attaching the central membranes allows the user to remove or replace the membranes to enable the apparatus to perform other functions, or to replace a membrane in the event of damage. To facilitate replacement, the removable central membranes and the toroid can optionally further include complementary visual and/or mechanical alignment features (not shown) such as indicia, positioning tabs, studs, alignment holes, snaps, and the like.

FIGS. 6A–D Removable Reflector Chamber

Figure 6A:
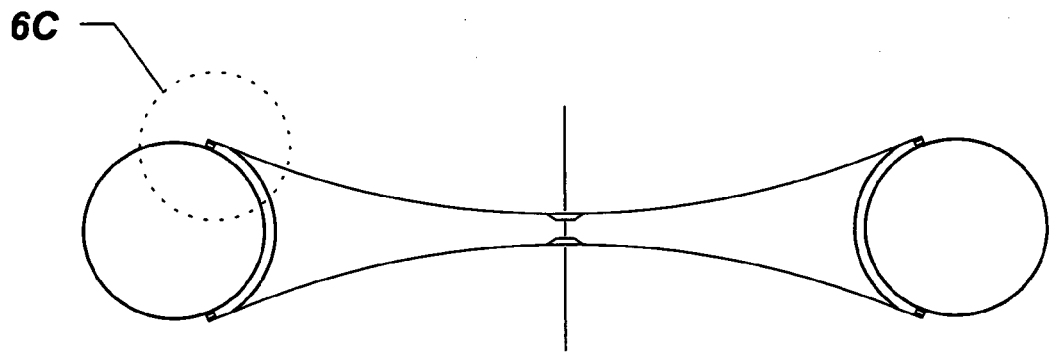
FIGS. 6A–B are, respectively, schematic diametric cross-sectional views of alternate first and second embodiment reflector apparatuses having a removably attached reflector chamber.

FIG. 6A depicts an alternate basic first embodiment reflector apparatus having a removably attached sub-ambient/super-ambient pressurizable reflector chamber.

Figure 6B:
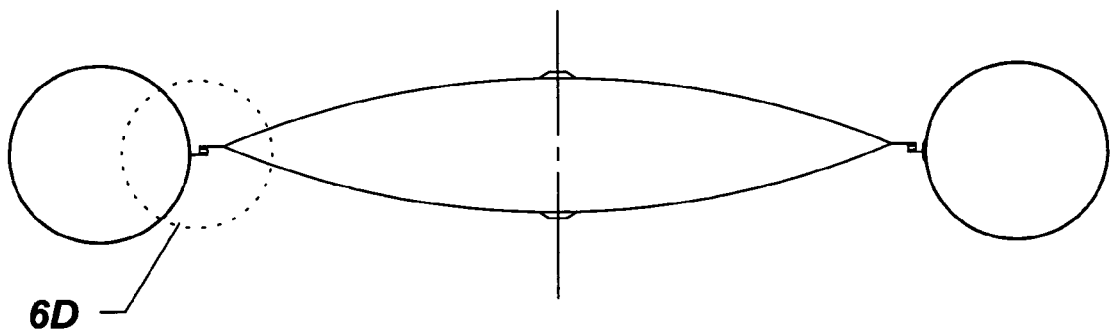

FIG. 6B depicts an alternate basic second embodiment reflector apparatus having a removably attached super-ambient-pressurizable reflector chamber.

Figure 6C:
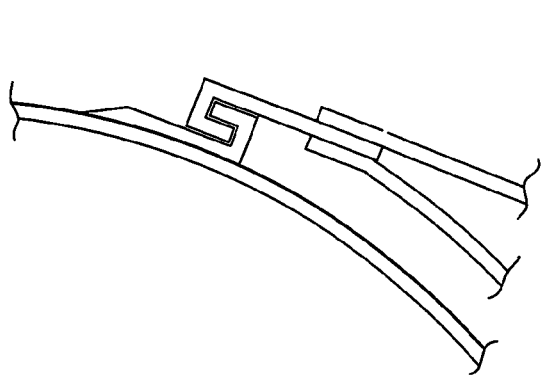
FIGS. 6C–D are partial schematic diametric cross-sectional views of a typical attachment means for securing a removably attachable reflector chamber to the toroid.
Figure 6D:
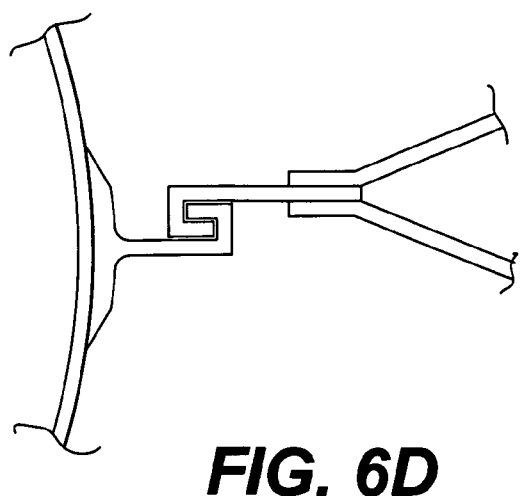

FIG. 6C depicts a typical hook or clip-type attachment means for quickly securing a removably attachable reflector chamber of the first embodiment type to the toroidal support ring. FIG. 6D depicts a similar hook or clip-type attachment means for securing a removably attachable reflector chamber of the second embodiment type to the toroidal support ring. It is noted that other common means can be employed to attach such removable reflector chambers including, for example, one or more attachment means similar to those previously shown in FIGS. 2C–D (e.g., hook-and-loop patches, a plurality of discrete mounting studs with corresponding apertures, and the like).

FIGS. 7A–17B Alternate Detuned Reflective Membranes

Figure 7A:
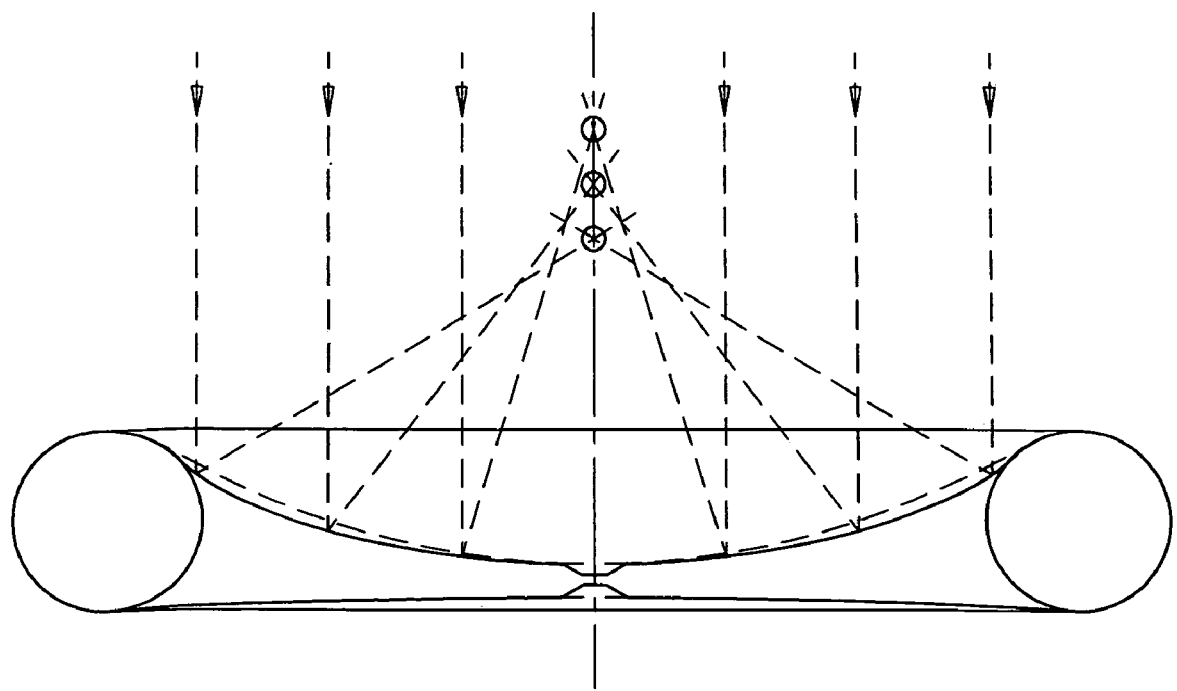
FIGS. 7A–B are schematic diametric cross-sectional views of alternate basic first embodiment reflector apparatuses having detuned (i.e., non-parabolic) reflective membranes which are pre-formed, respectively, into spherical and non-spherical surfaces-of-revolution.

FIG. 7A depicts an alternate basic first embodiment reflector apparatus having a detuned (i.e., non-parabolic) reflective membrane, (first species, first sub-species) wherein the reflective membrane is pre-formed to have a spherical surface contour. Note that the rays do not converge at a single point, thereby limiting the degree of concentration to enhance safety.

Figure 7B:
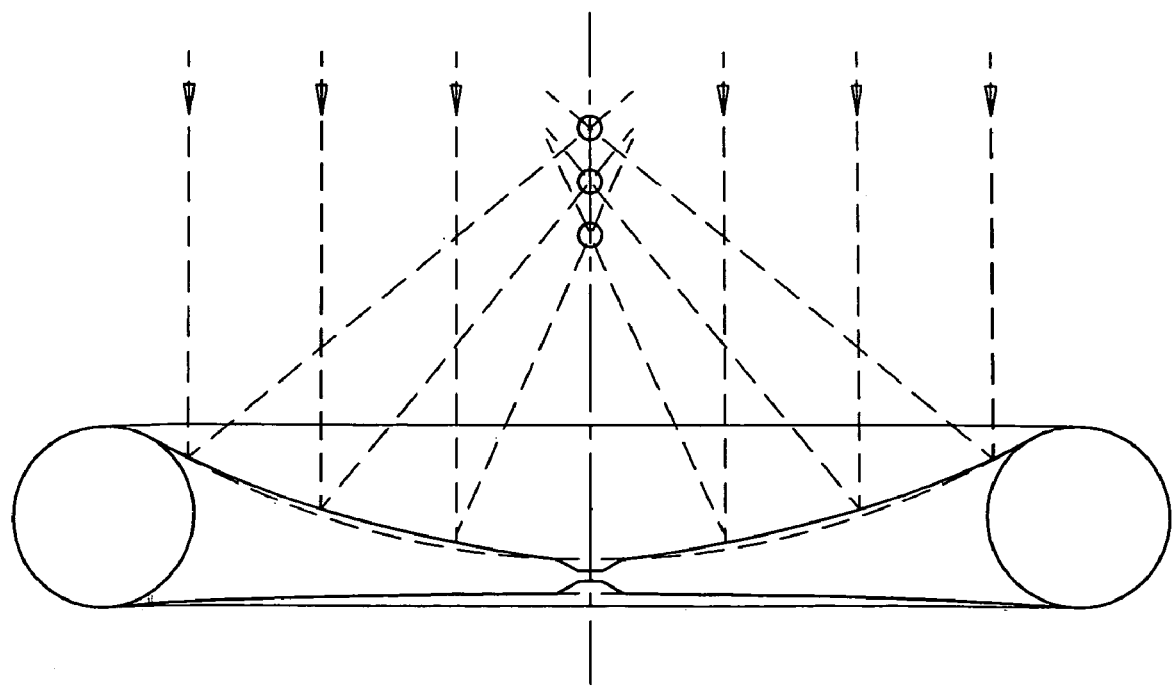

FIG. 7B depicts an alternate basic first embodiment reflector apparatus having a detuned (i.e., non-parabolic) reflective membrane (first species, second sub-species), wherein the reflective membrane is pre-formed to have a surface contour comprising a surface-of-revolution of non-constant radius.

Figure 8A:
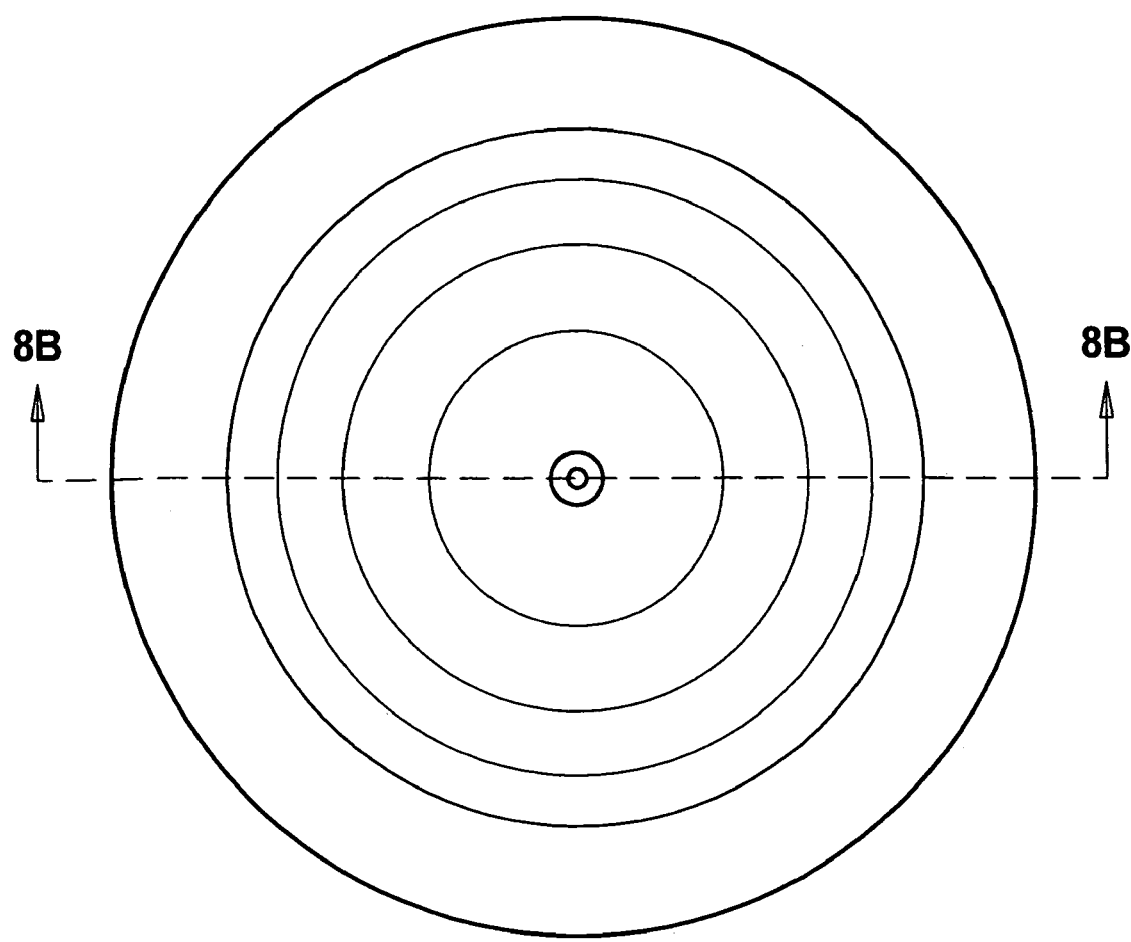
FIGS. 8A–B are, respectively, a schematic top plan view and a schematic diametric cross-sectional view of an alternate basic first embodiment reflector apparatus having a detuned reflective membrane pre-formed into the shape of a radially undulating (or radially stepped) surface of revolution.
Figure 8B:
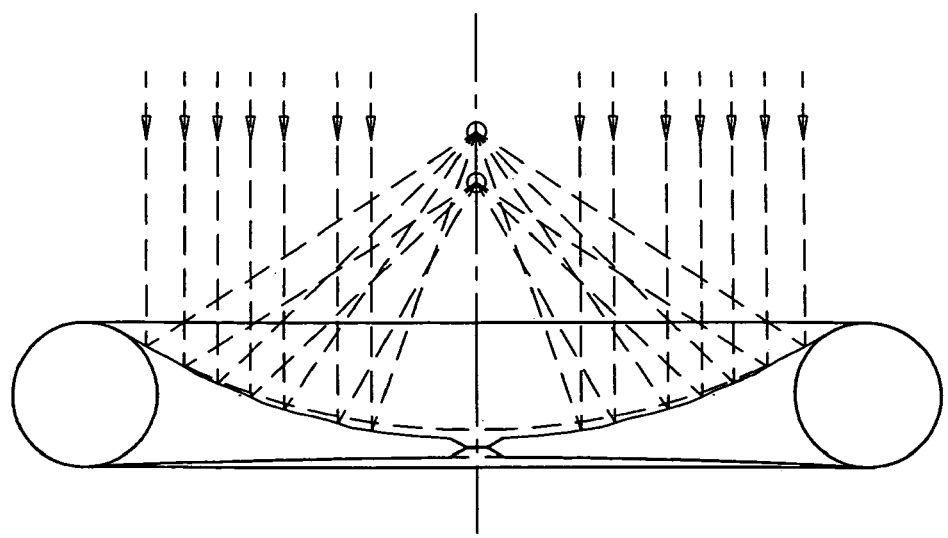

FIGS. 8A and 8B depict an alternate basic first embodiment reflector apparatus having a detuned reflective membrane (first species, third sub-species), wherein the reflective membrane is pre-formed into the shape of a radially undulating (or radially stepped) surface of revolution. Again, FIG. 8B shows that the rays do not converge at a single point.

Figure 9A:
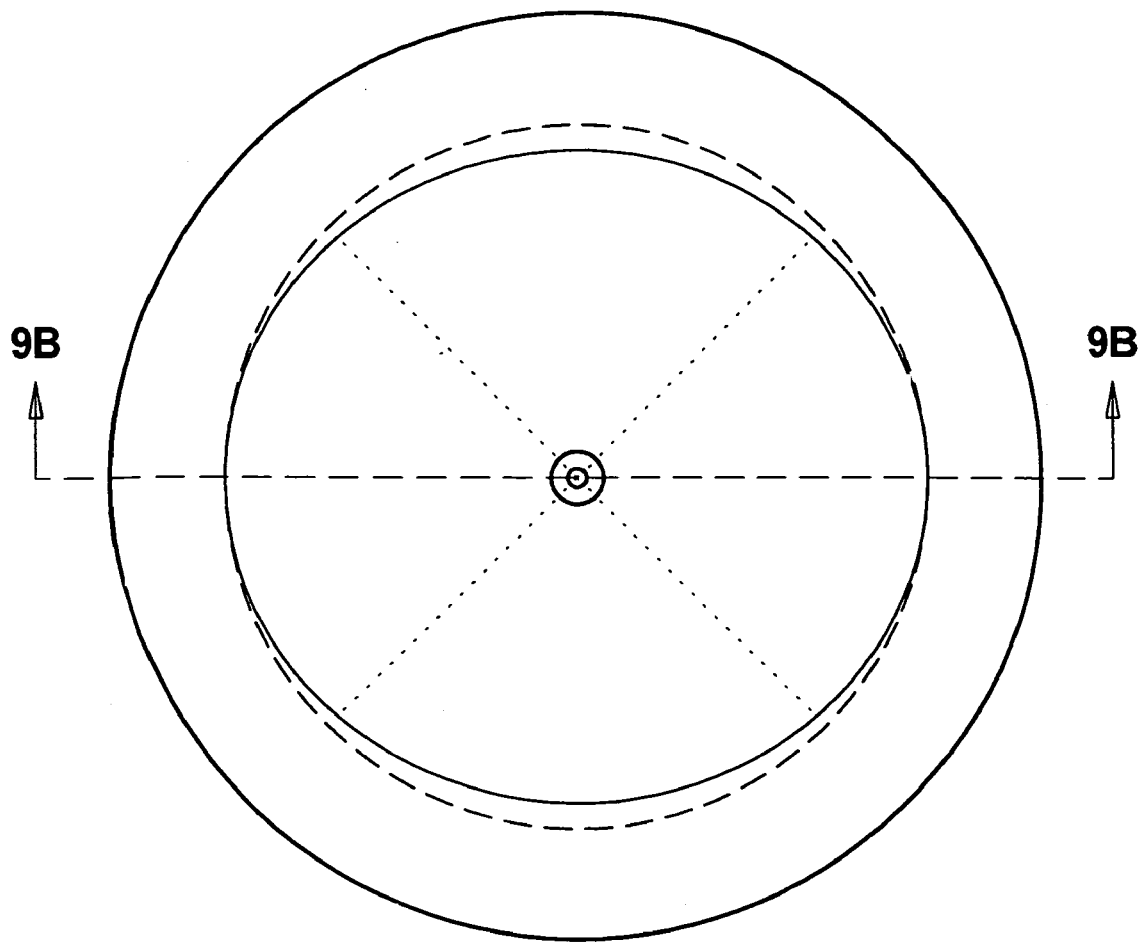
FIGS. 9A–D are schematic top plan views and schematic diametric cross-sectional views of alternate basic first embodiment reflector apparatuses having a detuned reflective membrane pre-formed into the shape of a circumferentially undulating or scalloped surface.
Figure 9B:
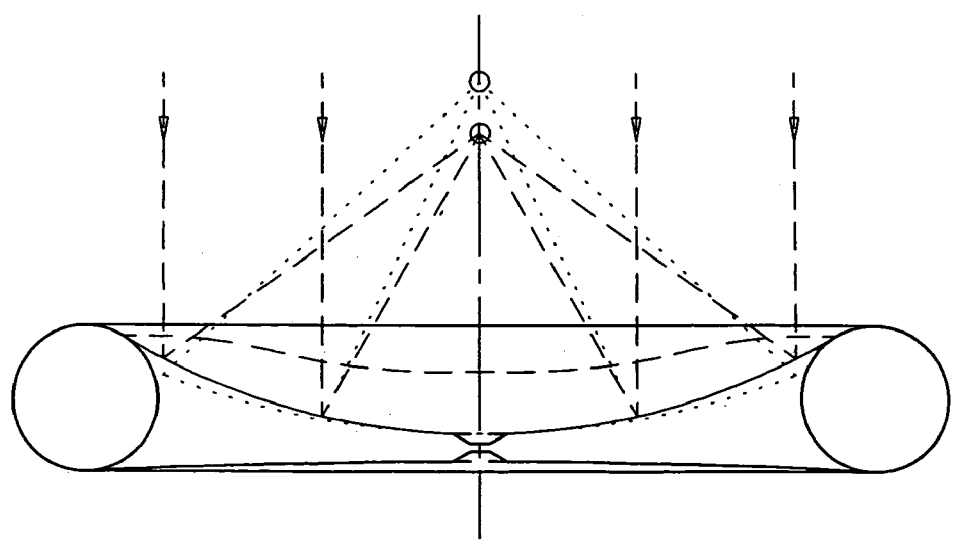
Figure 9C:
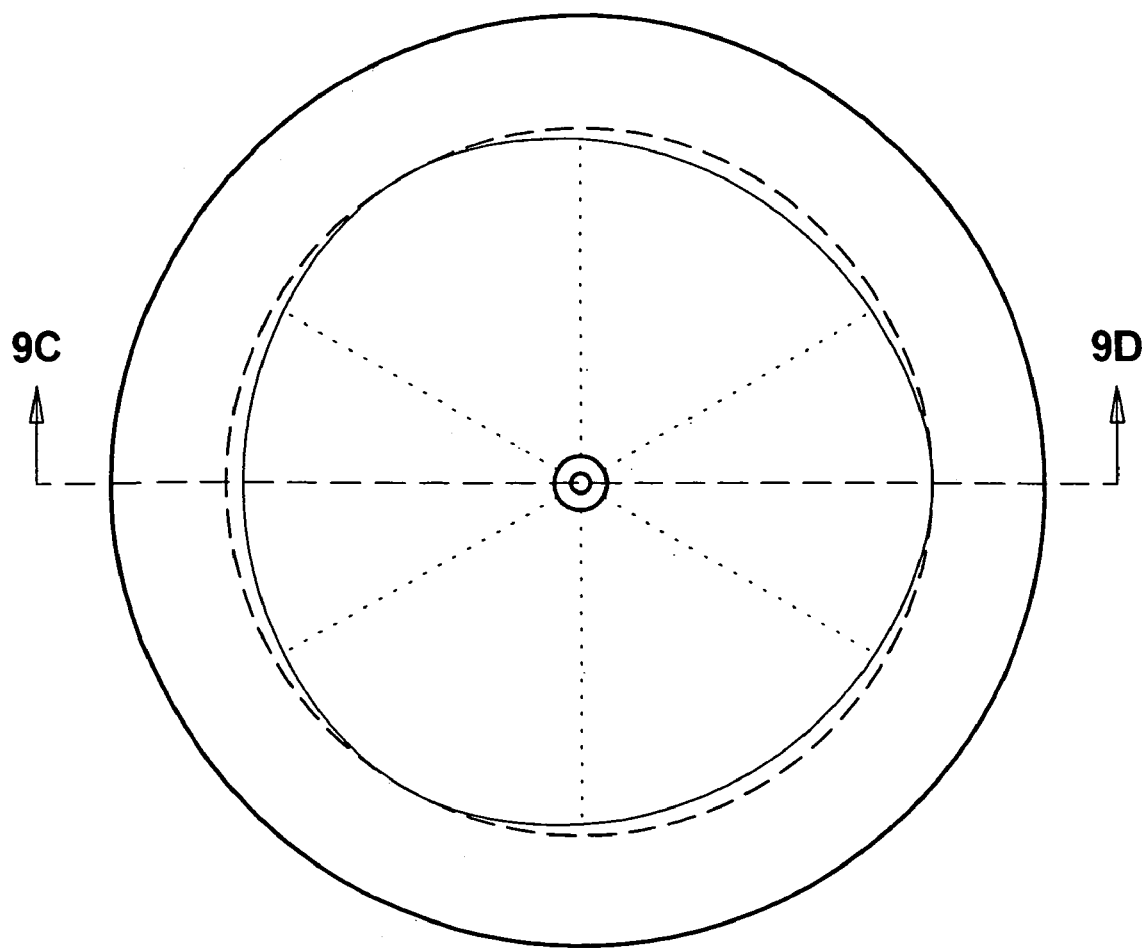
Figure 9D:
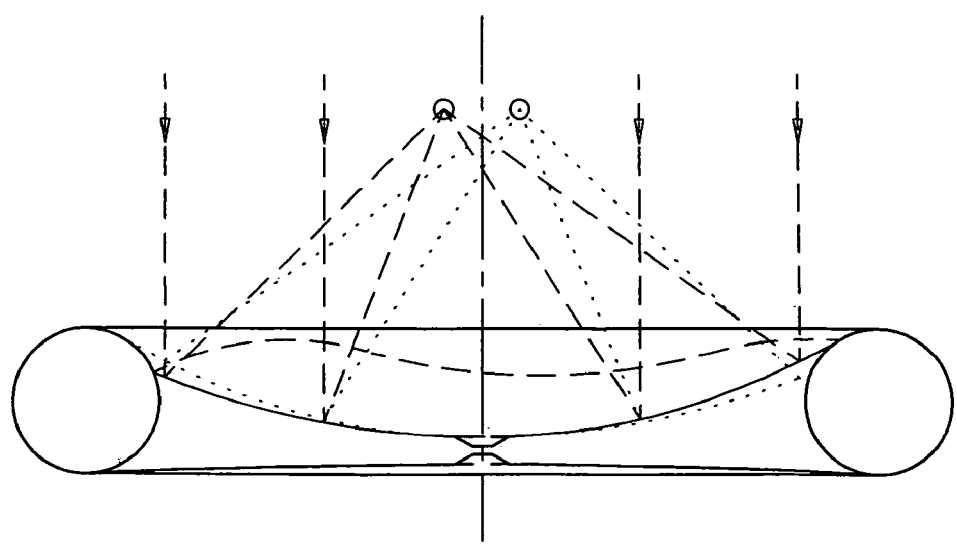

FIGS. 9A and 9B depict an alternate basic first embodiment reflector apparatus having a detuned reflective membrane (second species, first sub-species), wherein the reflective membrane is pre-formed into a circumferentially undulating or scalloped shape having an even number (e.g., two) of circumferential peaks and troughs. Similarly, FIGS. 9C and 9D depict an alternate basic first embodiment reflector apparatus having a detuned reflective membrane (second species, second sub-species), wherein the reflective membrane is pre-formed into a circumferentially undulating or scalloped shape having an odd number (e.g., three) of circumferential peaks and troughs. In FIGS. 9B and 9D, the electromagnetic rays shown dashed represent rays in the plane of the cross-section, and the dotted lines represent rays out of the plane of the cross-section. Note that the reflector of FIG. 9B tends to produce a vertically dispersed ray concentration pattern, whereas the reflector of FIG. 9D tends to produce a horizontally dispersed or annular ray concentration pattern. Note that any number of peaks and troughs may be incorporated into such circumferentially undulating or scalloped membranes.

Figure 10A:
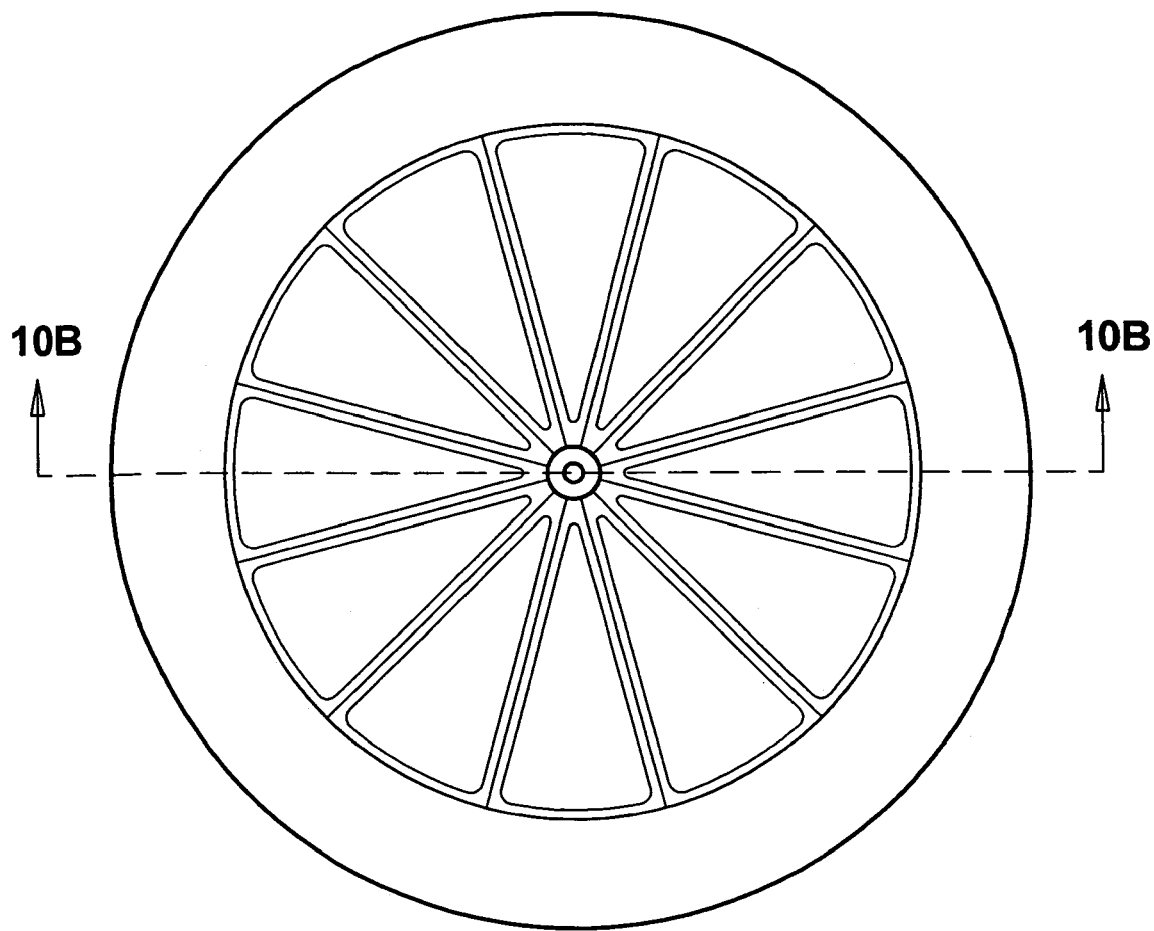
FIGS. 10A–B are a schematic top plan view and schematic diametric cross-sectional view of an alternate basic first embodiment reflector apparatus having a detuned reflective membrane comprising a plurality (e.g., twelve) of pre-formed, wedge-shaped dimples optionally supported by an underlying radial support grid (e.g., a plurality of radial cords, wires, cables, or the like).
Figure 10B:
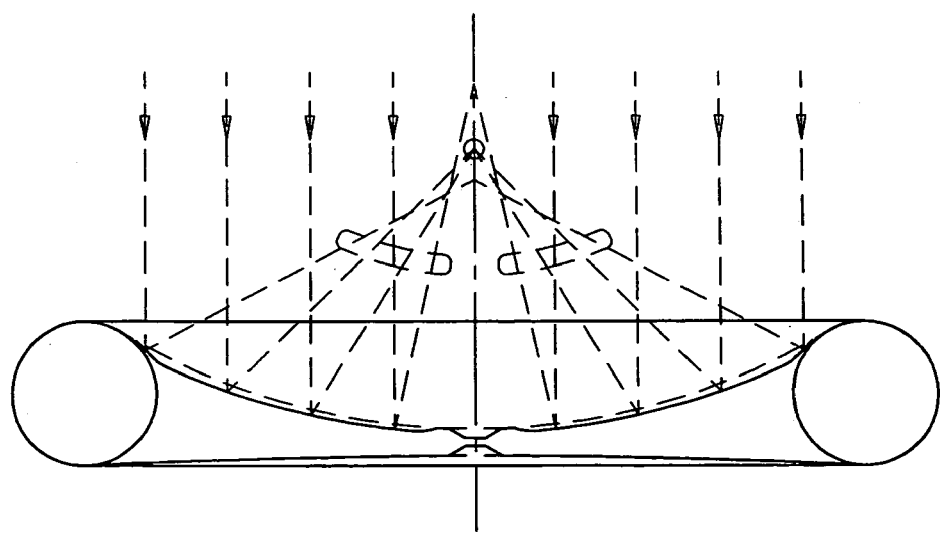

FIGS. 10A–B depict an alternate basic first embodiment reflector apparatus having a detuned reflective membrane (third species, first sub-species), wherein the reflective membrane comprises a plurality (e.g., twelve) of pre-formed, wedge-shaped dimples optionally supported by an underlying radial support grid (e.g., a plurality of radial cords, wires, cables, or the like). FIG. 10B shows that the electromagnetic rays reflected by each dimple form a diffuse, substantially linear focal locus prior to diffusely converging in proximity to the primary focal axis of the reflector.

Figure 11A:
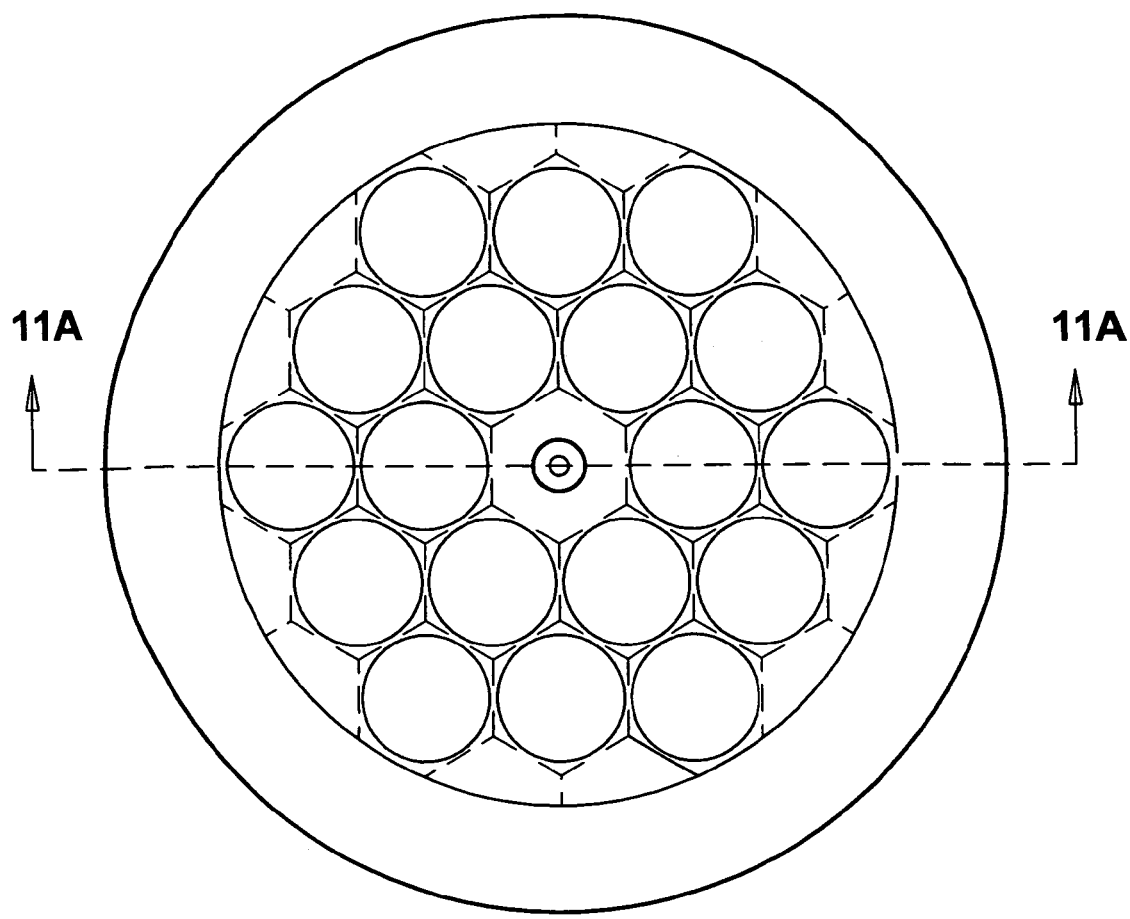
FIGS. 11A–H are several schematic top plan views and a schematic diametric cross-sectional view of alternate basic first embodiment reflector apparatuses having a detuned reflective membrane comprising a plurality of pre-formed dimples in substantially hexagonal, circular, annular, or rectangular arrays, optionally supported by an underlying support grid.
Figure 11B:
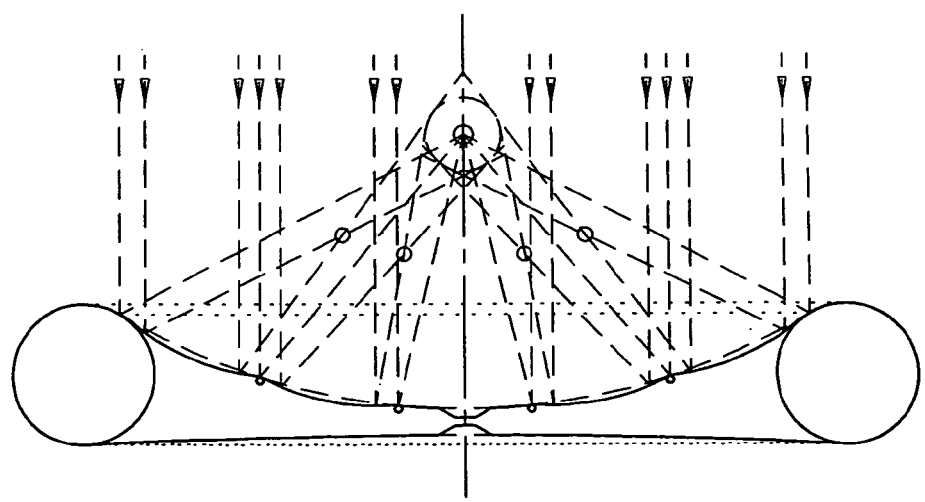

FIGS. 11A and 11B depict an alternate basic first embodiment reflector apparatus having a detuned reflective membrane (third species, second sub-species), wherein the reflective membrane incorporates a plurality (e.g., eighteen) of large pre-formed substantially circular and/or elliptical dimples, which are generally arranged in a staggered pattern or array, such as a substantially hexagonal lattice, to maximize packing density, and further optionally includes a plurality (e.g., twelve) of smaller dimples (not shown) disposed around the larger dimples to further minimize the non-dimpled area of the detuned reflective membrane. An optional underlying mesh may be used to support and/or reinforce the dimpled reflective membrane; however, as will be shown below, a support grid or mesh is required for membranes having dimples which substantially comprise the entire surface of the membrane.

Figure 11C:
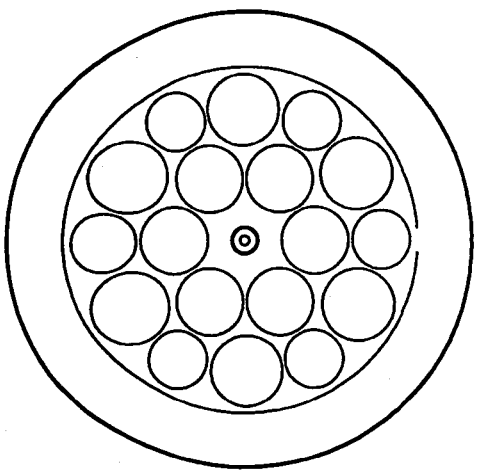
Figure 11D:
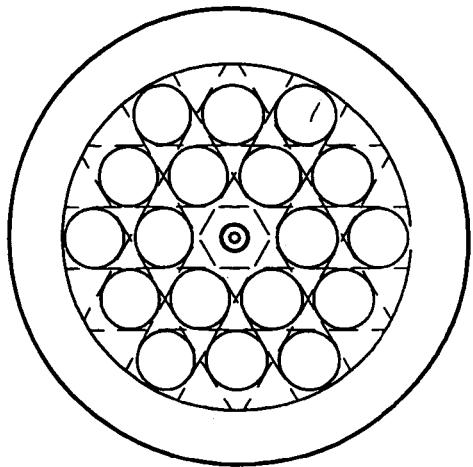
Figure 11E:
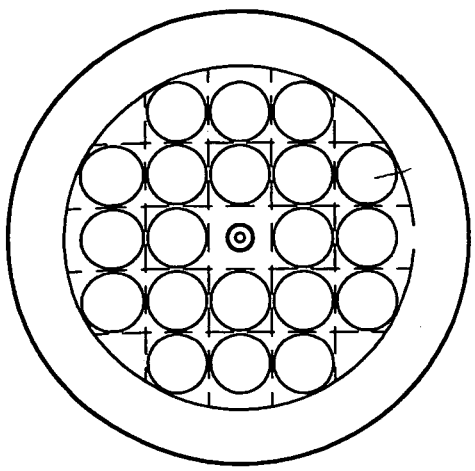
Figure 11F:
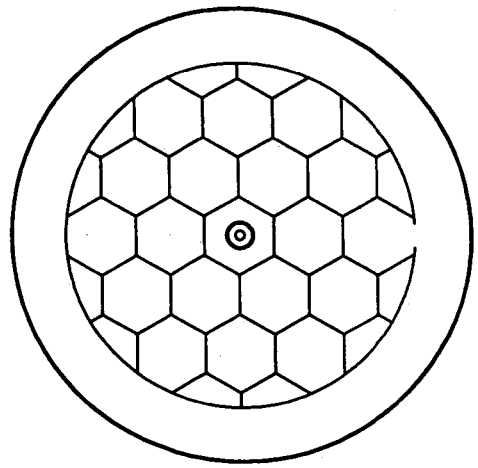
Figure 11G:
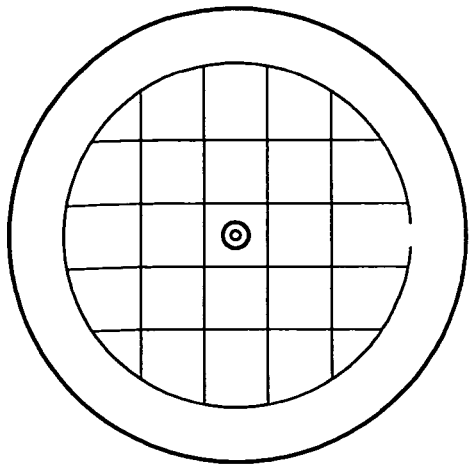
Figure 11H:
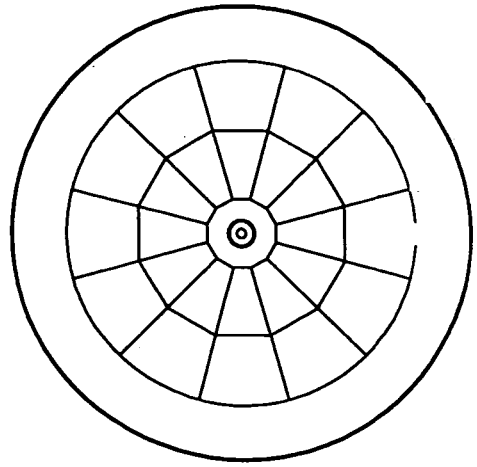

FIGS. 11C–11H depict various other dimpling patterns for dimpled detuned reflectors. Specifically, FIG. 11C depicts a dimpling pattern (third species, third sub-species) incorporating a plurality (e.g., eighteen) of pre-formed substantially circular and/or elliptical dimples, which are generally arranged in a staggered concentric circular pattern or array, wherein a plurality of medium-sized dimples (e.g., six) are surrounded by a plurality (e.g., twelve) of alternating smaller and larger dimples to maximize packing density for a given number of substantially circular and/or elliptical dimples. FIG. 11D depicts a dimpling pattern (third species, fourth sub-species) incorporating a generally staggered array of large and optionally small (not shown) pre-formed substantially circular dimples, which are arranged in such a manner so as to allow the reflective membrane to be reinforced in three directions by a plurality of linear cords, wires, cables, or the like (shown dashed). FIG. 11E depicts a dimpling pattern (third species, fifth sub-species) incorporating a simple, substantially rectangular array of large and optionally small (not shown) pre-formed circular dimples, which are arranged in such a manner so as to allow the reflective membrane to be reinforced in two directions by a plurality of linear cords, wires, cables, or the like (shown dashed). FIG. 11F depicts a dimpling pattern (third species, sixth sub-species) incorporating a generally hexagonal array of pre-formed dimples supported by a hexagonal support grid, wherein each dimple substantially comprises the entire area of its associated cell within the hexagonal support grid. FIG. 11G depicts a dimpling pattern (third species, seventh sub-species) incorporating a generally rectangular array of pre-formed dimples supported by a rectangular support grid, wherein each dimple substantially comprises the entire area of its associated cell within the rectangular support grid. Similarly, FIG. 11H depicts a dimpling pattern (third species, eighth sub-species) incorporating a concentric annular array of tapered quadrilateral dimples supported by a tapered quadrilateral support grid, wherein each dimple substantially comprises the entire area of its associated cell within the support grid. It should be noted that dimples of any pre-determined size, quantity, shape, and/or combinations thereof may be employed to tailor the light concentration pattern to a predetermined intensity and distribution, i.e., the invention is not limited to the specific examples shown.

Figure 12A:
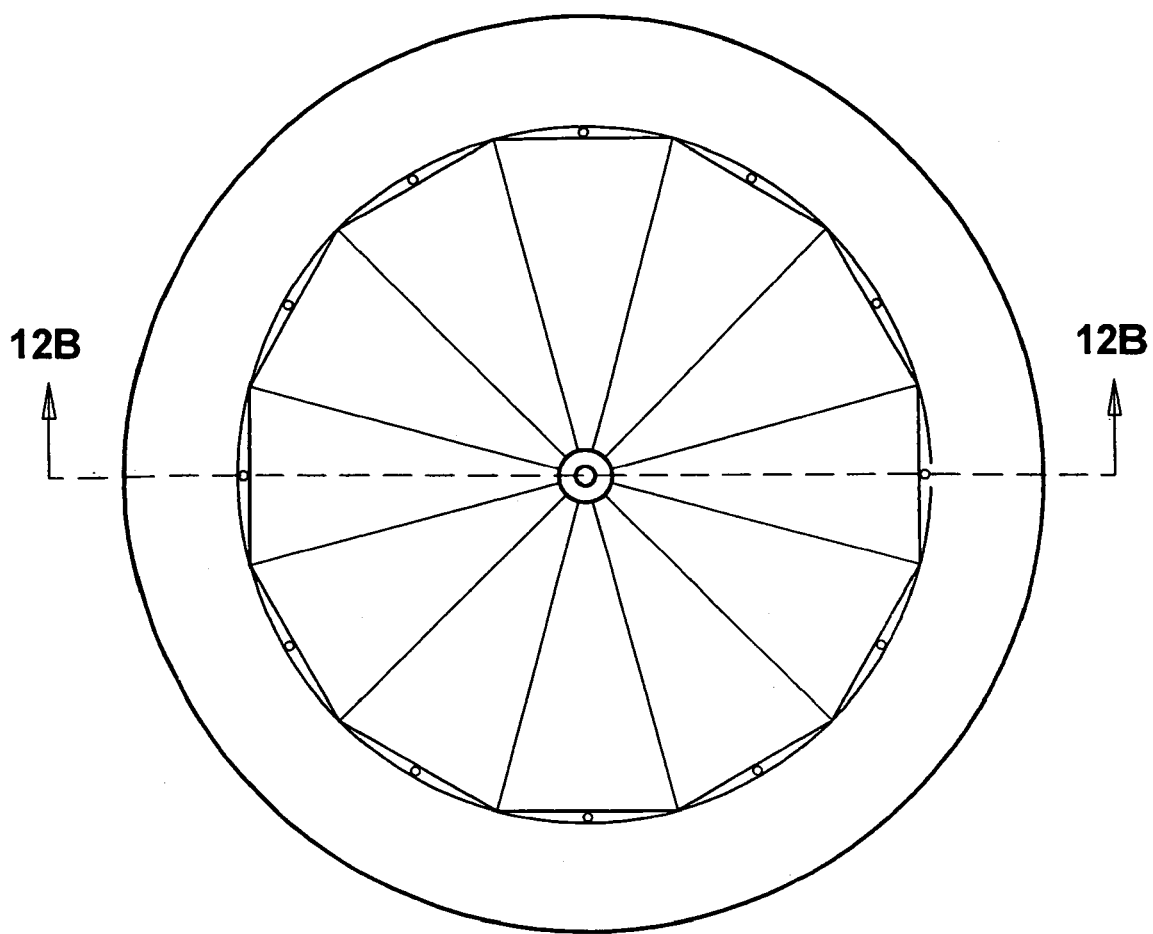
FIGS. 12A–D are schematic top plan views and schematic diametric cross-sectional views of alternate basic first embodiment reflector apparatuses having a detuned reflective membrane comprising a plurality of generally wedge-shaped facets.
Figure 12B:
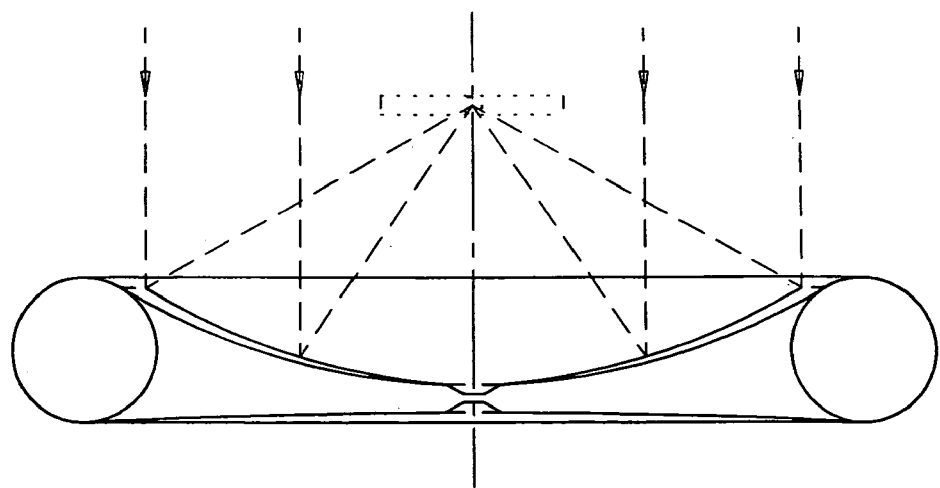

FIGS. 12A–B depict an alternate basic first embodiment reflector apparatus having a composite detuned reflective membrane (fourth species, first sub-species), wherein the composite reflective membrane comprises a mechanically deformable reflective membrane selectively bonded to a pressure-deformable membranous substrate along a plurality (e.g., twelve) of radial lines or seams to provide an equal number of wedge-shaped facets, each of which is curved in the radial direction and substantially flat in the circumferential direction. One or more orifices need to be provided to allow gas (e.g., air) to freely enter or exit the chambers or cavities between the reflective membrane and substrate membrane. Such orifices can be included in and/or around the periphery of the reflective membrane. FIG. 12B shows that the electromagnetic rays reflected by each facet form a diffuse, substantially linear focal locus (shown dotted) in proximity to the primary focal axis of the reflector.

Figure 12C:
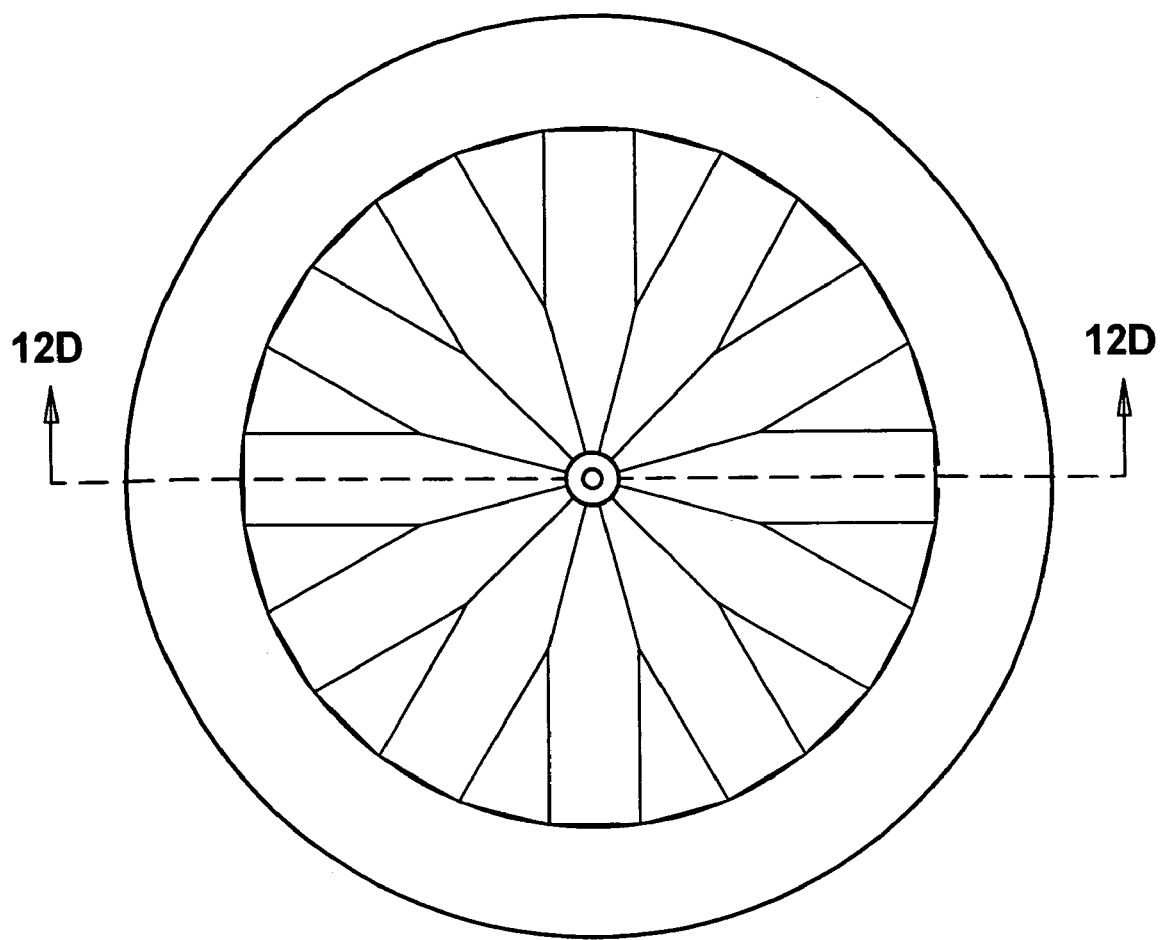
Figure 12D:
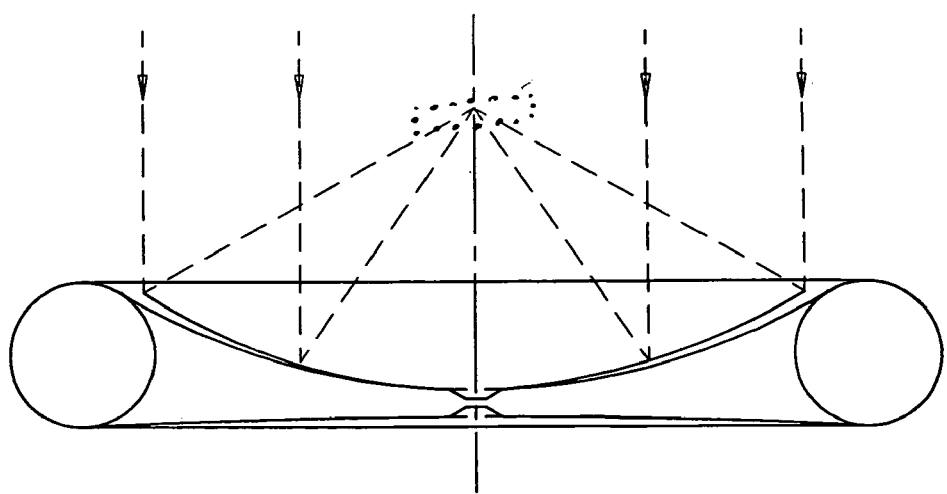

Similarly, FIGS. 12C–D depict an alternate basic first embodiment reflector apparatus having a composite detuned reflective membrane (fourth species, second sub-species), wherein the composite reflective membrane comprises a mechanically deformable reflective membrane bonded to a pressure-deformable membranous substrate along a combination of radial seams and parallel-to-radial seams to provide a plurality (e.g., twenty-four) of alternating wedge-shaped facets and circumferentially truncated wedge-shaped facets, each of which is curved in the radial direction and substantially flat in the circumferential direction. FIG. 12D shows that the electromagnetic rays reflected by each facet form a diffuse, substantially linear focal locus (shown dotted) in proximity to the primary focal axis of the reflector; however, this pattern produces a more uniform but more highly concentrated pattern of energy than is provided by the faceted reflector of FIG. 12B.

Figure 13A:
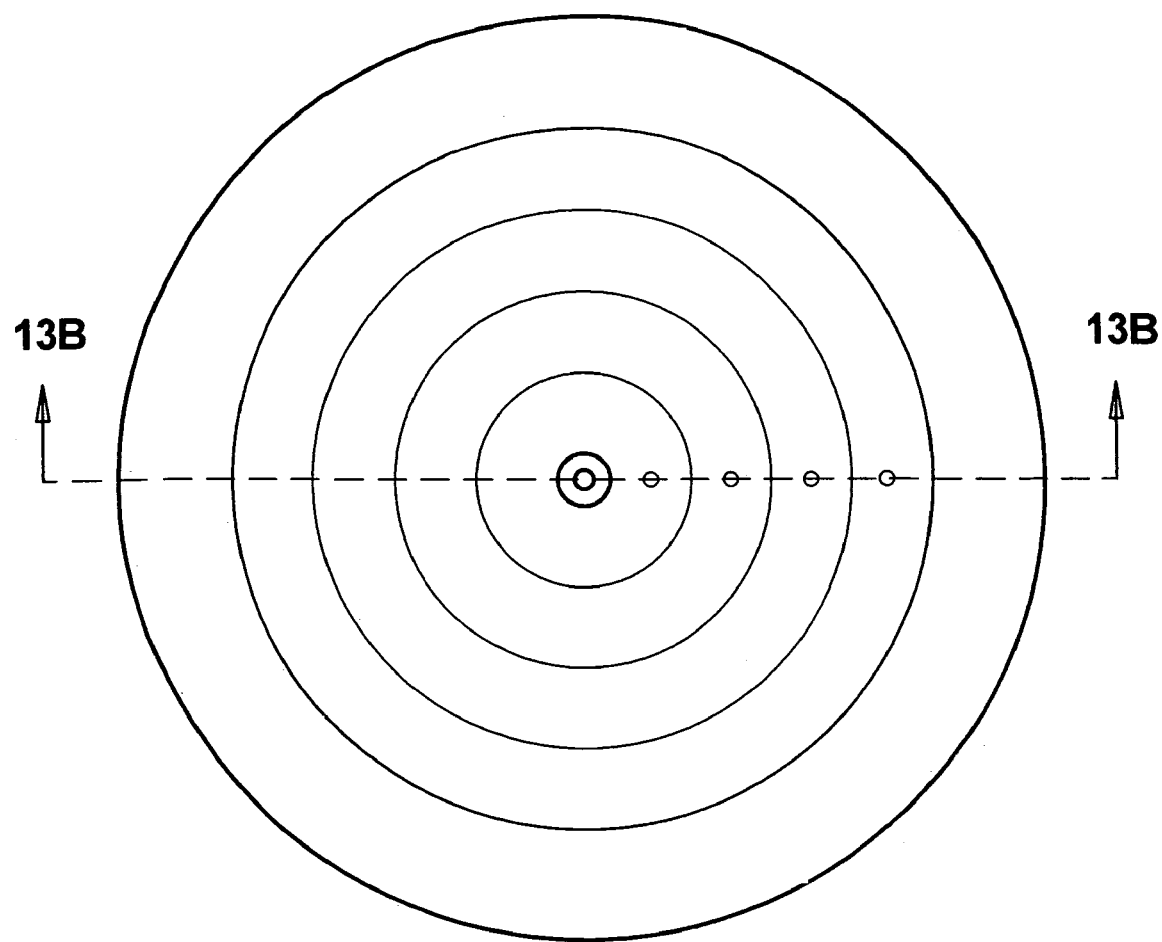
FIGS. 13A–D are schematic top plan views and schematic diametric cross-sectional views of alternate basic first embodiment reflector apparatuses having a detuned composite reflective membrane comprising a plurality of conical facets.
Figure 13B:
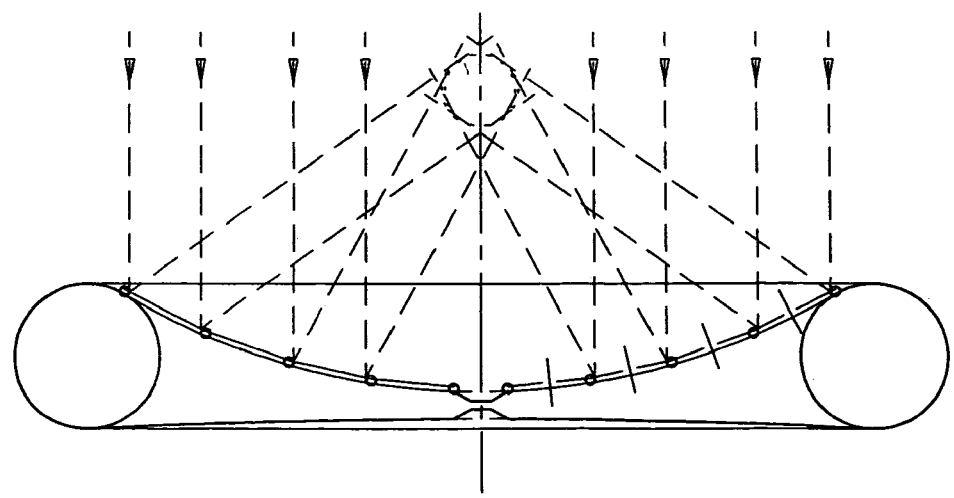

FIGS. 13A–B depict an alternate basic first embodiment reflector apparatus having a composite detuned reflective membrane (fifth species, first sub-species), wherein the composite reflective membrane comprises a mechanically deformable reflective membrane selectively bonded to a pressure-deformable membranous substrate along a plurality (e.g., five) of equally spaced circumferential lines or seams to provide a plurality (e.g., four) of conical facets of equal radial width, each of which is curved in the circumferential direction and substantially flat in the radial direction. FIG. 13B shows that the electromagnetic rays reflected by each facet converge in proximity to the primary focal axis of the reflector to provide a substantially spherical pattern of concentrated light.

Figure 13C:
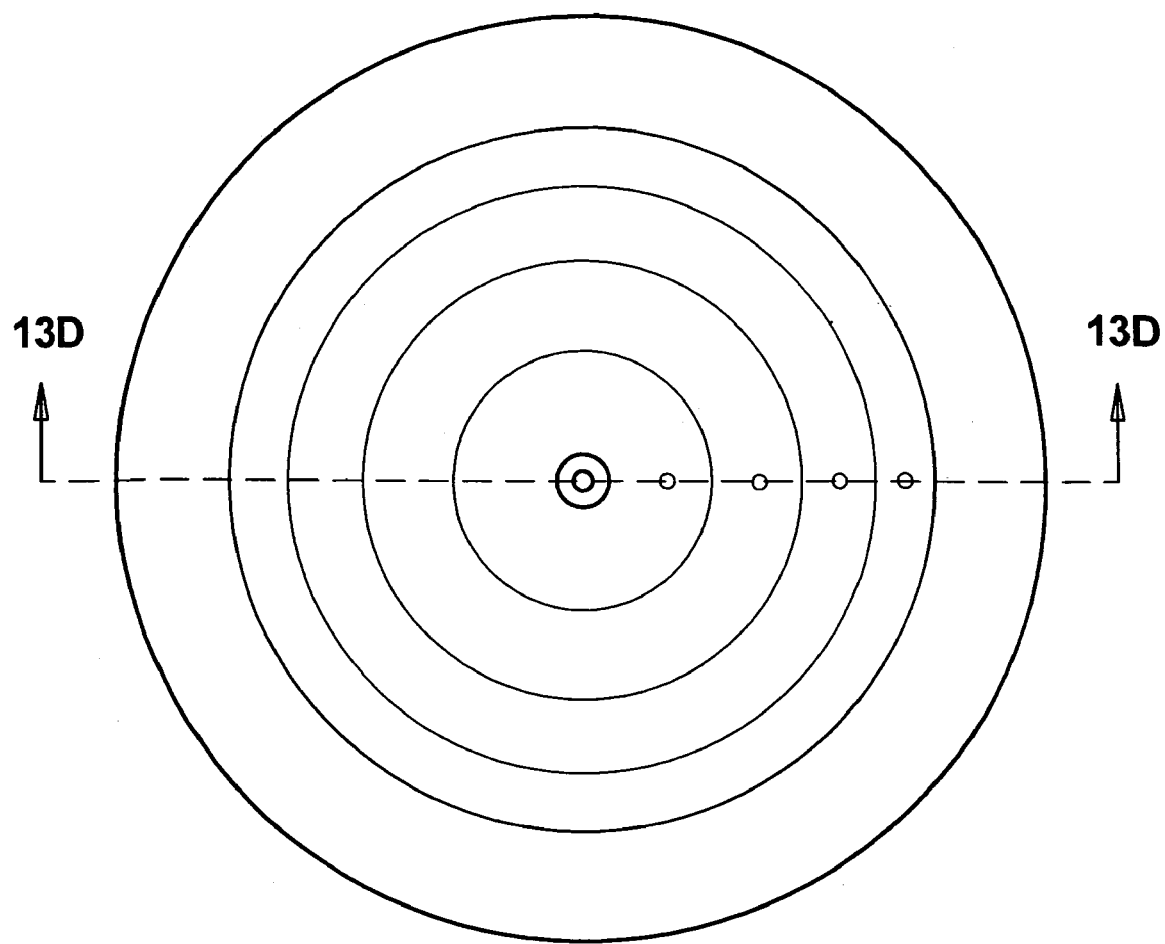
Figure 13D:
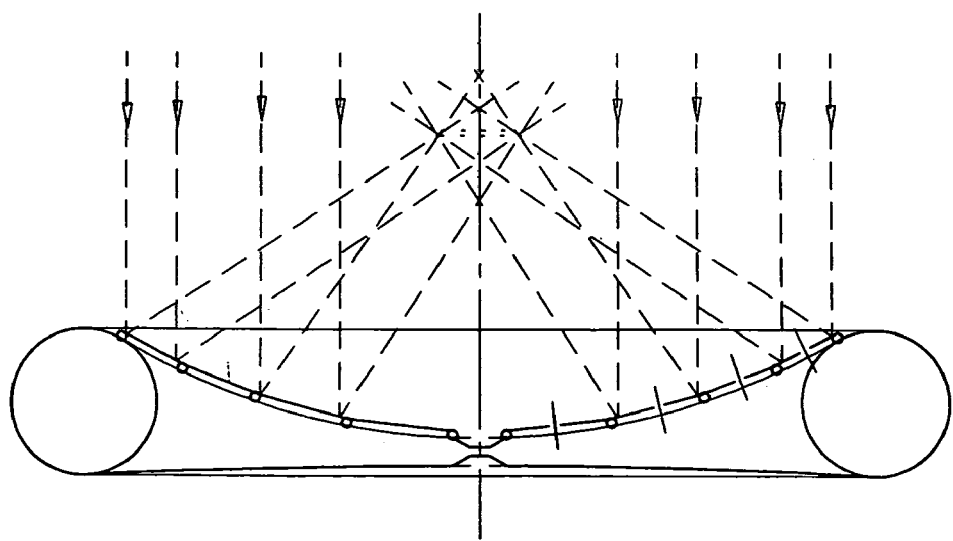

Similarly, FIGS. 13C–D depict an alternate basic first embodiment reflector apparatus having a composite detuned reflective membrane (fifth species, second sub-species), wherein the composite reflective membrane comprises a mechanically deformable reflective membrane bonded to a pressure-deformable membranous substrate along a plurality (e.g., five) of circumferential lines or seams having progressively reduced radial spacing to provide a plurality (e.g., four) of conical facets of decreasing radial width, each of which is curved in the circumferential direction and substantially flat in the radial direction. FIG. 13D shows that the electromagnetic rays reflected by each facet converge in proximity to the primary focal axis of the reflector to provide a substantially planar pattern of concentrated light.

Figure 14A:
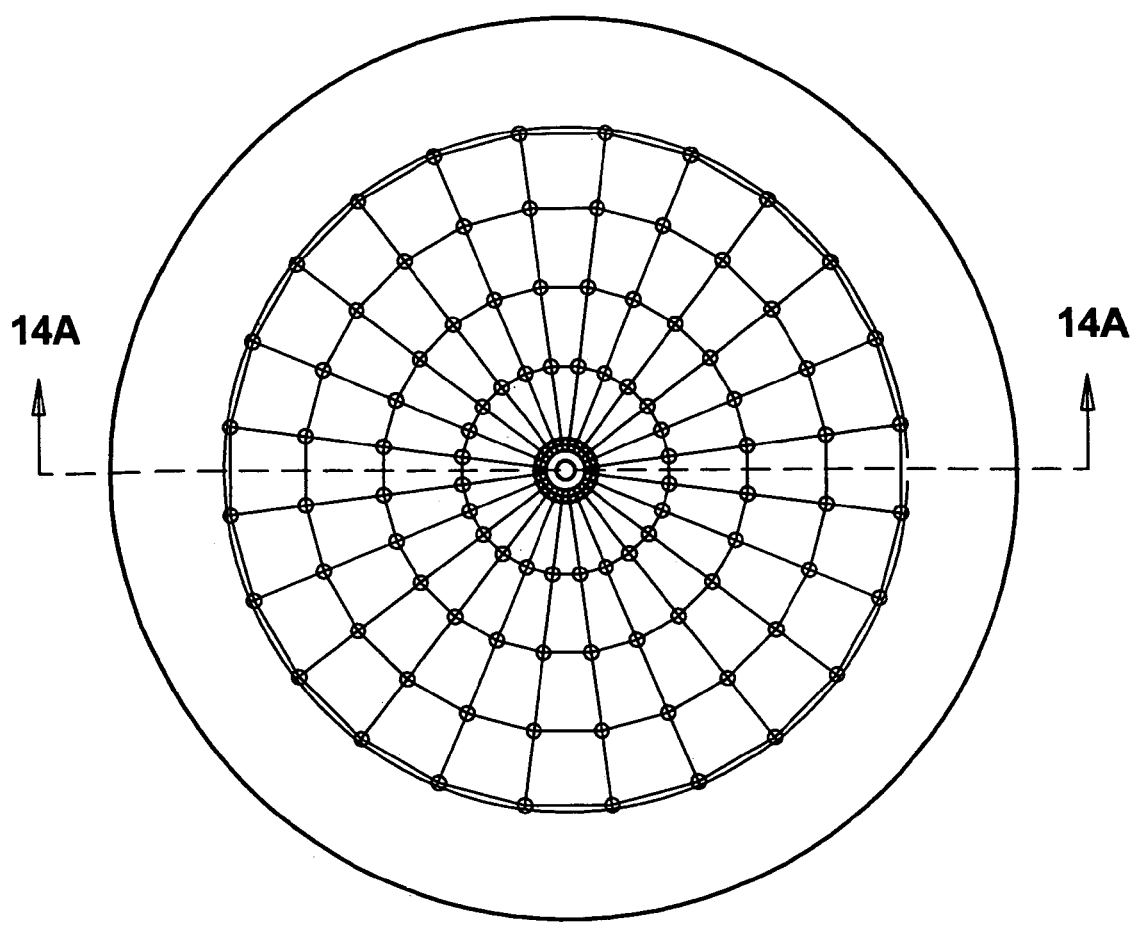
FIGS. 14A–F are several schematic top plan views and a schematic diametric cross-sectional view of alternate basic first embodiment reflector apparatuses having a detuned composite reflective membrane comprising a plurality of substantially planar facets in substantially circular, annular, or triangular arrays.
Figure 14B:
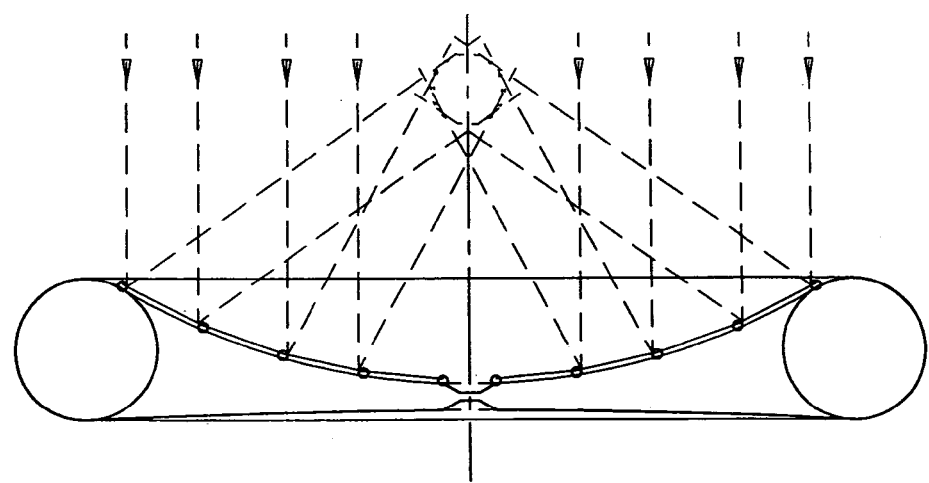

FIGS. 14A–B depict an alternate basic first embodiment reflector apparatus having a composite detuned reflective membrane (sixth species, first sub-species), wherein the composite reflective membrane comprises a mechanically deformable reflective membrane selectively bonded to a pressure-deformable membranous substrate at a plurality of discrete points in an annular pattern or array (i.e., aligned concentric circular arrays) to form a plurality (e.g., ninety-six) of substantially planar quadrilateral facets having constant width in the radial direction. FIG. 14B shows that the electromagnetic rays reflected by each facet form an associated non-concentrated column of light, all of which converge in proximity to the primary focal axis of the reflector to provide a substantially spherical pattern of concentrated light. It should be noted that this planar faceted configuration forms a substantially spherical pattern of concentrated energy that is more uniform than that provided by the conically faceted reflector of FIGS. 13A–B.

Figure 14C:
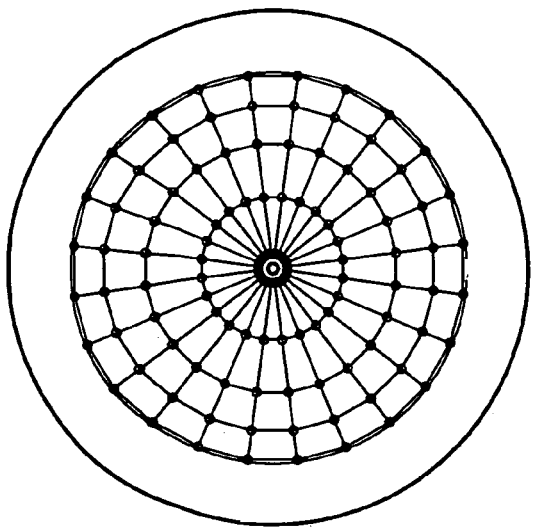
Figure 14D:
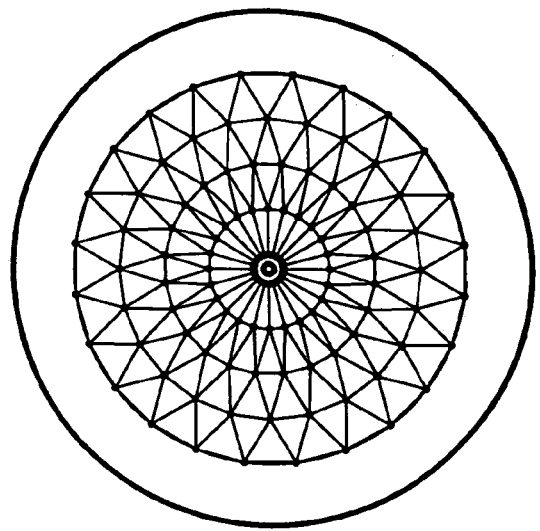
Figure 14E:
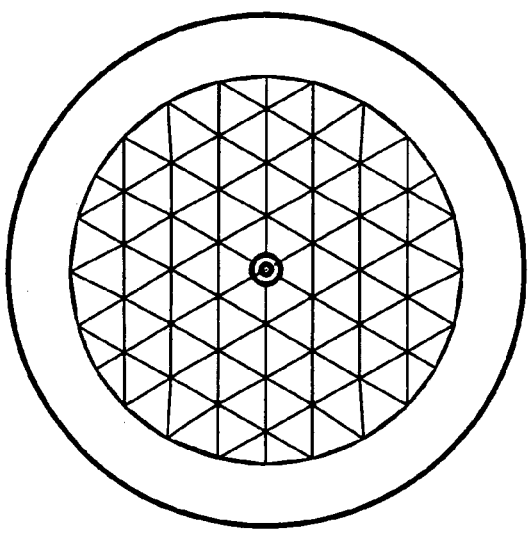
Figure 14F:
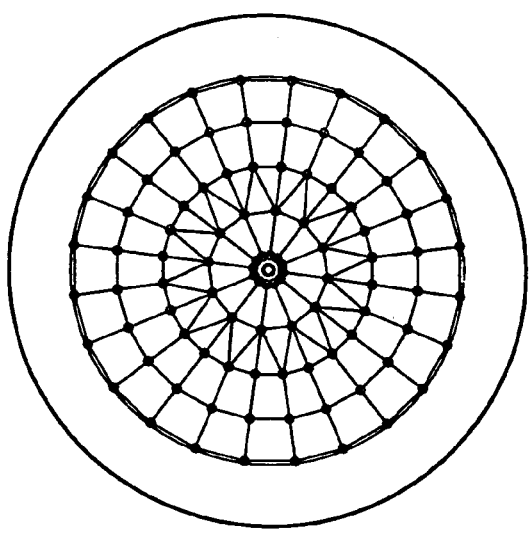

FIGS. 14C–14F depict various other faceting patterns for faceted detuned composite reflectors. Specifically, FIG. 14C depicts a faceted composite detuned reflective membrane (sixth species, second sub-species), wherein the composite reflective membrane comprises a mechanically deformable reflective membrane bonded to a pressure-deformable membranous substrate at a plurality of discrete points in an annular pattern or array to form a plurality (e.g., ninety-six) of planar quadrilateral facets having decreasing width in the radial direction. Note that this planar faceted configuration forms a substantially planar pattern of concentrated energy similar to that provided by the conically faceted reflector of FIGS. 13C–D, but which is significantly more uniform. Similarly, FIG. 14D depicts a faceted composite detuned reflective membrane (sixth species, third sub-species) comprising a mechanically deformable reflective membrane bonded to a pressure-deformable membranous substrate at a plurality of discrete points in a staggered pattern of concentric circular arrays to form a plurality (e.g., 168) of planar triangular facets having optionally constant width in the radial direction. FIG. 14E depicts a faceted composite detuned reflective membrane (sixth species, fourth sub-species) comprising a mechanically deformable reflective membrane bonded to a pressure-deformable membranous substrate at a plurality of discrete points in a generally triangular pattern or array to form a plurality (e.g., ninety-six) of planar, substantially equilateral, triangular facets. FIG. 14F depicts a faceted composite detuned reflective membrane (sixth species, fifth sub-species) comprising a mechanically deformable reflective membrane bonded to a pressure-deformable membranous substrate at a plurality of discrete points in a generally annular pattern or array to form a plurality (e.g., 96) of intermixed planar quadrilateral and triangular facets.

It should be noted that the use of substantially planar facets provides excellent control of the maximum degree to which the light can be concentrated. More specifically, the light concentration factor cannot exceed the number of planar facets. Further, facets of any pre-determined size, quantity, shape, and/or combinations thereof may be employed to tailor the light concentration pattern to a predetermined intensity and distribution, i.e., the invention is not limited to the specific examples shown.

Figure 15A:
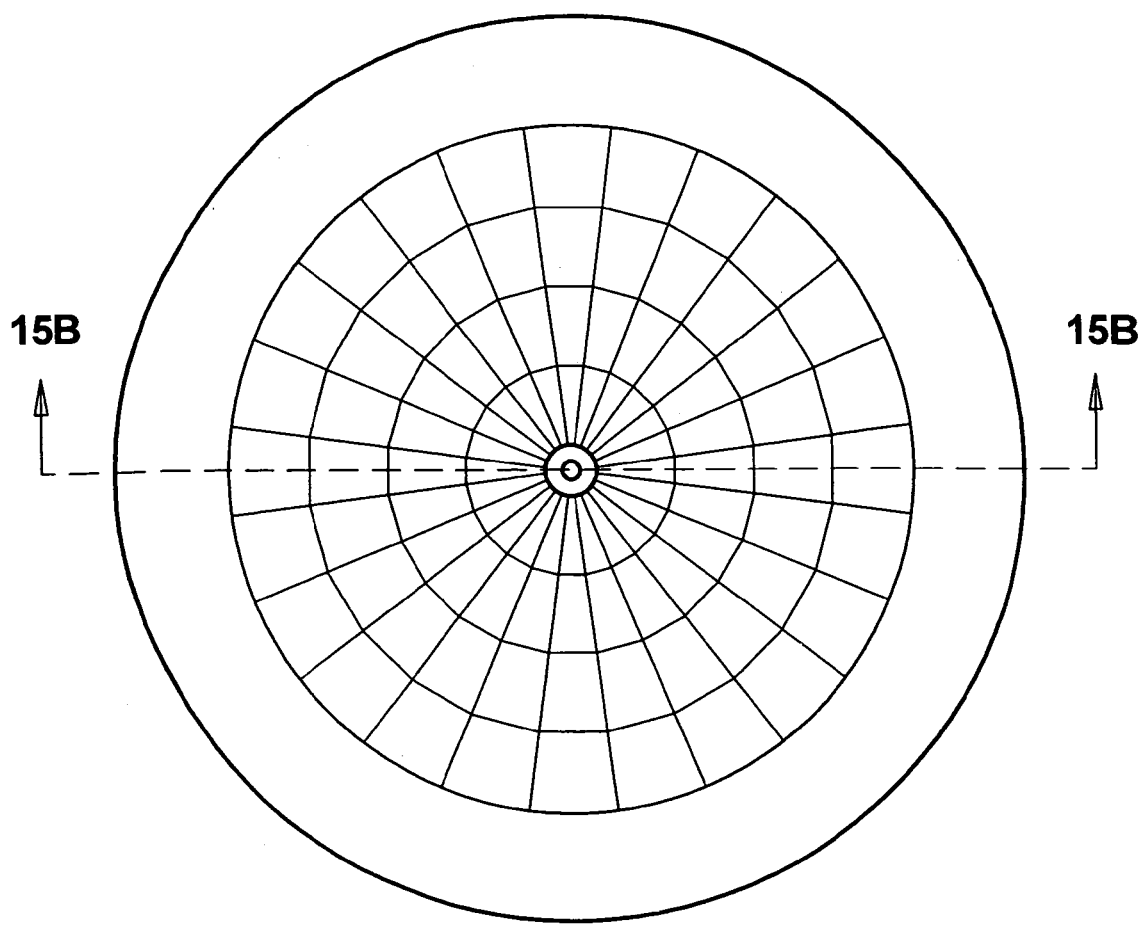
FIGS. 15A–B are a schematic top plan view and a schematic diametric cross-sectional view of an alternate basic first embodiment reflector apparatus having a detuned faceted reflective membrane which is alternately deployed via a plurality of internal ribs or sheets bonded to an opposing membrane.
Figure 15B:
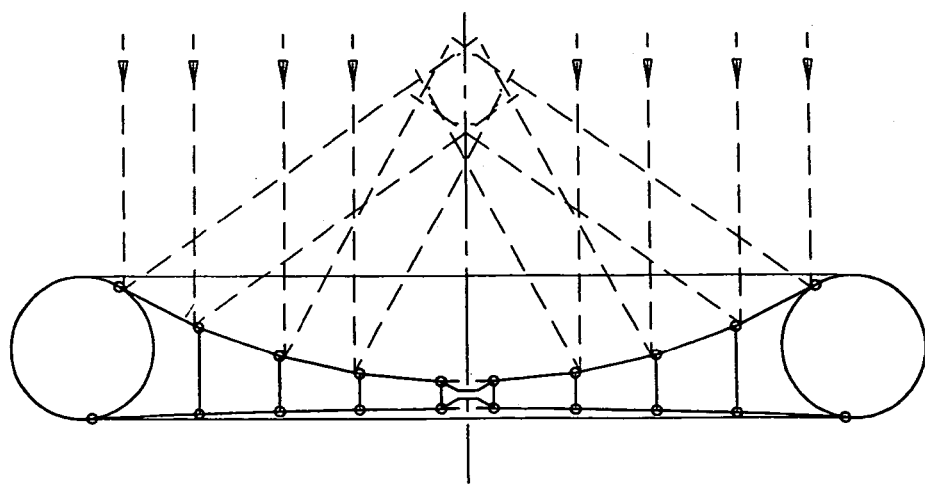

FIGS. 15A and 15B depict an alternate basic first embodiment reflector apparatus having a detuned reflective membrane (seventh species) comprising a mechanically deformable reflective membrane bonded to an opposing membrane via a plurality of internal linear radial ribs and linear (i.e., chorded) circumferential ribs or sheets to form, in an annular pattern, a plurality (e.g., ninety-six) of substantially planar quadrilateral facets having constant width in the radial direction, whereby the reflector can be deployed without imposing a differential pressure across the reflective membrane. However, one or more orifices need to be provided to allow gas (e.g., air) to freely enter or exit the chamber(s) between the reflective membrane and opposing membrane. Such orifices can be included in (and/or around the periphery of) the reflective membrane and/or opposing membrane, and may also be included in the internal ribs to allow interconnection of the compartments within the central chamber. Note that other faceting patterns may be produced, such as any of the preceding faceted patterns described herein, by the judicious use of radial, circumferential, and/or otherwise oriented internal ribs. Additionally, the central reflector chamber of this configuration may be pressurized to adjust the degree of energy concentration.

Figure 16A:
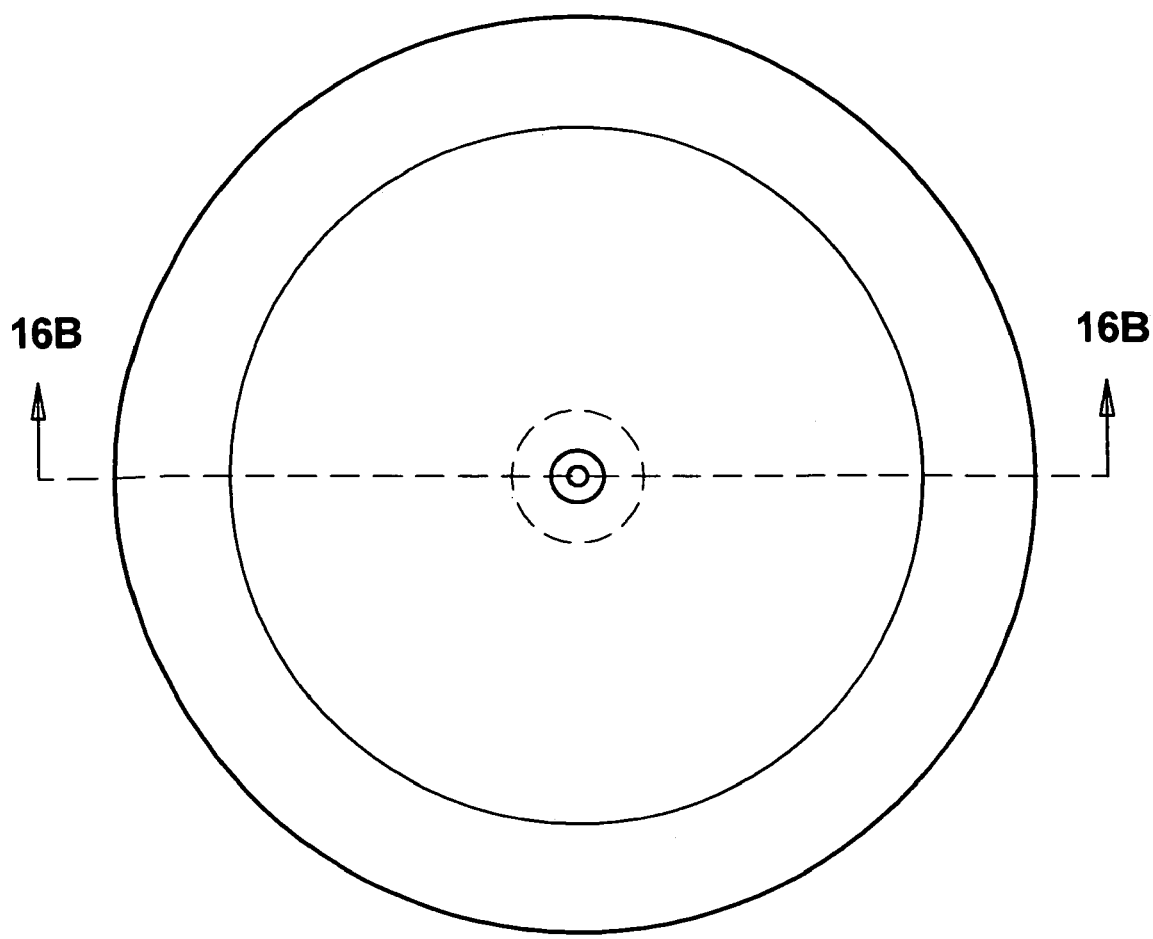
FIGS. 16A–B are a schematic top plan view and a schematic diametric cross-sectional view of an alternate basic first embodiment reflector apparatus having a detuned reflective membrane, wherein a central inflatable pressure envelope is disposed between the upper and lower pressure-deformable membranes to mildly distort the reflective membrane.
Figure 16B:
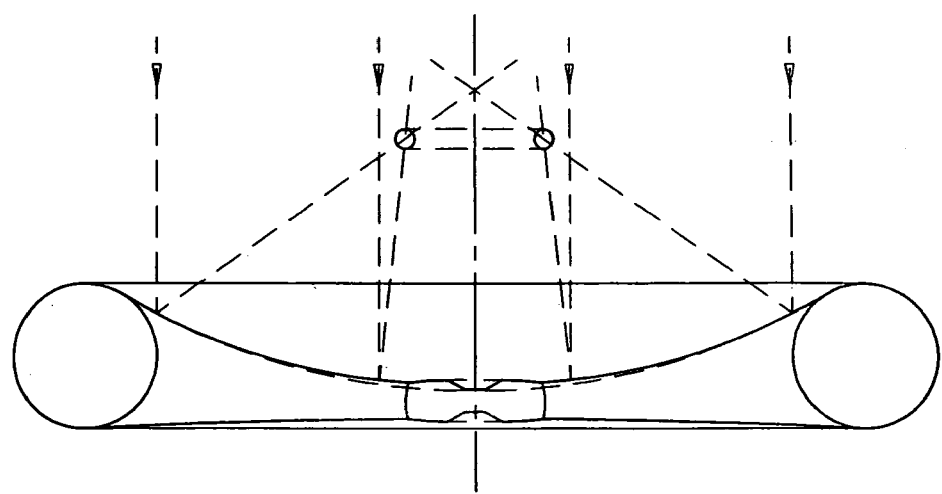

FIGS. 16A and 16B depict an alternate basic first embodiment reflector apparatus having a detuned reflective membrane, (eighth species) wherein a secondary central inflatable pressure envelope is disposed between the upper and lower pressure-deformable membranes (i.e., centered within the reflector chamber) to mildly distort the reflective membrane to provide an annular focus. This configuration enables the concentration and distribution of light to be adjusted by varying the pressure within the secondary central pressure envelope.

Figure 17A:
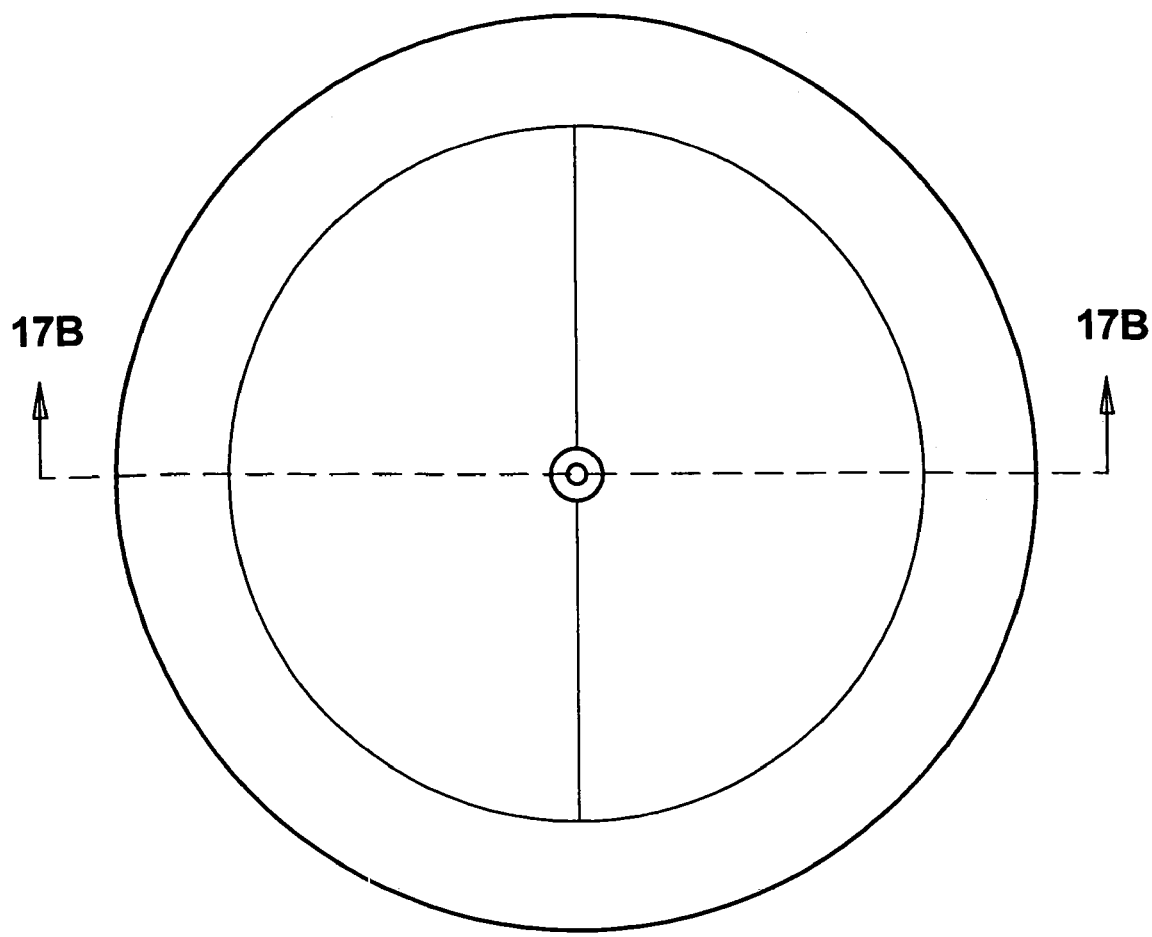
FIGS. 17A–B are a schematic top plan view and a schematic diametric cross-sectional view of an alternate basic first embodiment reflector apparatus having a dual-focal-point, detuned reflective membrane resulting in a device having two useable focal points.
Figure 17B:
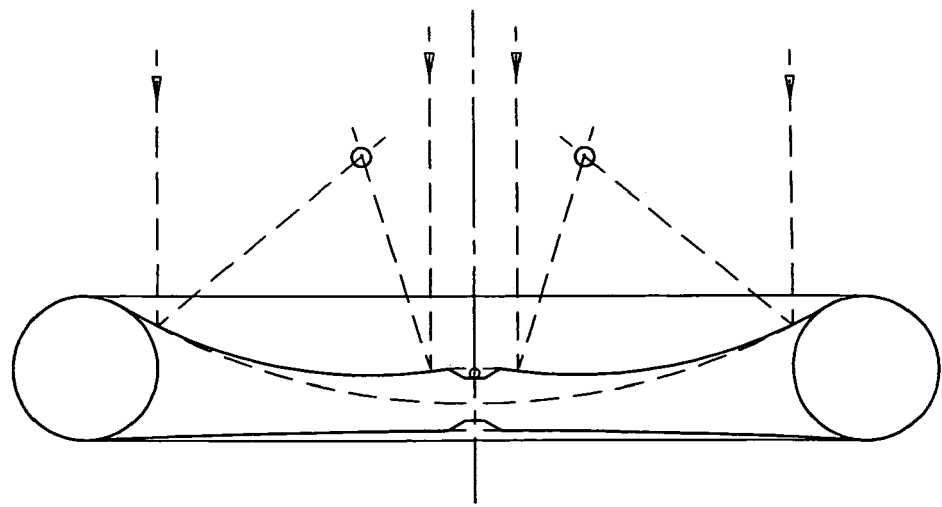

FIGS. 17A and 17B depict an alternate basic first embodiment reflector apparatus having a dual-focal-point, detuned reflective membrane, wherein an underlying tensioned cord, wire, or cable diametrically spanning the toroid distorts the reflective membrane to provide two discrete detuned focal points, whereby the apparatus can simultaneously accommodate two distinct accessory elements (not shown), one at each focal point.

Operation as a Broad-Spectrum Electromagnetic Energy Concentrator:

The modular multi-function apparatus can be used to concentrate solar energy to heat or cook materials contained in a vessel supported by the cable-stayed focal point support in proximity to the focal point.

Alternatively, the modular multi-function apparatus can be used to concentrate solar energy to distill liquids contained in a distillation apparatus supported by the cable-stayed focal point support in proximity to the focal point.

Further, the modular multi-function apparatus can be used to provide thermal energy by concentrating sunlight onto a heat exchanger supported by the cable-stayed focal point support in proximity to the focal point, wherein a liquid effluent is cyclically heated and piped via conduits to and from an insulated energy-storage vessel or thermal reservoir.

Additionally, the modular multi-function apparatus can be used to generate electrical power by concentrating sunlight onto a liquid-cooled photo-electric cell supported by the cable-stayed focal point support in proximity to the focal point. Electrical conduits transmit electrical energy to a device requiring electrical power. Note that thermoelectric cells can also be employed for this purpose. Further note that the optional heat exchanger used to cool the photovoltaic cell device can effectively be used to provide heat as noted above.

Operation as a High-Gain Radio-Frequency Antenna:

The modular multi-function apparatus can be used as a high-gain antenna to enable electronic communications between a geo-synchronous satellite and a ground-based communications device, such as a portable computer, by supporting via the cable-stayed focal point support a basic antenna at the focal point of a sub-ambient pressurized reflector chamber. Electrical conduits may be provided for connecting the basic antenna to the ground-based communications device.

Additionally, the modular multi-function apparatus can be used as a high-gain antenna to enhance electronic communications between a distant radio transmission tower and a portable transceiver device, wherein the transparent membrane of a super-ambient pressurized reflector chamber is alternatively used to support a basic antenna in proximity to the focal point. Note that the basic antenna device may be integrally incorporated into the transparent membrane as an integral conductive wire, mesh, or other suitable conductive element. Also note that for this and other applications, the transparent membrane need only be transparent to the particular spectrum of electromagnetic radiation (e.g., RF) being manipulated by the apparatus. Accordingly, the invention contemplates that the transparent membrane can be opaque, translucent, or otherwise disruptive to higher energy spectra, (e.g., broad-spectrum solar energy, visible light, infrared, and the like) to prevent inadvertent damage to the transparent membrane and/or an accessory element (such as a portable transceiver device, cellular phone, and the like) supported thereon in the event the apparatus inadvertently becomes aligned with a high-energy electromagnetic source, such as the sun.

Alternatively, the modular multi-function apparatus can be used as a high-gain antenna to extend the range of electronic communications between two portable transceiver devices by attaching one of the transceiver devices directly to the spherical support element. This configuration allows the apparatus to be quickly converted between various operational modes, such as between use as a high-gain antenna and use as, for example, a broad-spectrum concentrator.

Further, two electrically interconnected modular multi-function apparatuses located on a mountain can be used as high-gain antenna apparatuses (each similar to those noted above) to relay electronic communications between a low-lying transmission tower and a third modular apparatus located on opposite sides of the mountain. It is noted that a single modular multi-function apparatus may be reconfigured by the user to provide two or more reflector modules (such as by attaching a removable reflector chamber to, for example, the separate toroidal support ring or the rings of the safety shield), thus enabling a single apparatus to serve as a relay station between non-aligned remote stations. However, depending on the element selected to support the auxiliary removable reflector chamber, alternate means for supporting the apparatus may need to be implemented.

Operation as a Visible Spectrum Concentrator and Projector:

The modular multi-function apparatus can be used to project a collimated beam of light for enhancing vision, signaling, and the like, by locating a non-collimated light source at the focal point of a sub-ambient pressurized reflector chamber. Various light sources can be used for this application including, for example, a gas or oil lantern, an electrical lamp, a candle, a torch, a phosphorescent glow stick, and the like. Note that the device can optionally include reflectors, transparent covers, and/or transparent membranes (if used in super-ambient mode) having various colors to enable the device to project a wider range of signals, or to project colored illumination, such as for artistic purposes.

Additionally, the modular multi-function apparatus can be used to concentrate moonlight from a crescent moon onto an item to be viewed at night, such as a map or compass, optionally held in proximity to the focal point by the transparent membrane of a super-ambient pressurized reflector chamber. Note that other dim or distance sources of light may also be used for this application, such as a distant street lamp, or the glow emanating from a distant city skyline. Also note that the apparatus alternatively can be deployed in sub-ambient mode for this or other applications disclosed herein.

Further, the modular multi-function apparatus can be used in conjunction with an accessory waveguide device to concentrate and transmit concentrated solar or lunar radiation via waveguide to an underwater lamp to provide pan-chromatic illumination for use by a diver. Note that this configuration can also be used to provide illumination for interior, subterranean, and/or other darkened environments, or to energize optical equipment such as, for example, an image projection device, a heated tool, or a surgical device.

Operation as a Support or Shelter:

The modular multi-function apparatus can be used in an upright position as an insulated crib, cradle, or incubator, such as to hold an infant. In addition to the reflective membrane, the invention contemplates that many of the other elements of the apparatus, such as the interior and/or or exterior walls of the safety shield can have a reflective surface to enhance the thermal insulating characteristics of the apparatus. Alternatively, the modular multi-function apparatus can be used in a horizontal position by a person as a seat or chair, and as a shield from the sun, wind, and/or inclement weather. Further, the modular multi-function apparatus can be used in an inverted position as a shelter to protect a person from inclement weather or other environmental elements. By further incorporating an optional camouflaged external surface, the apparatus effectively serves as a wildlife blind or hunting blind. Still further, the modular multi-function apparatus can be used in a partially disassembled and reconfigured condition, wherein the toroidal base ring is being used as an open flotation device to support a person on water, and the remainder of the apparatus is being used as an enclosed flotation device or weather-resistant gear closet. The apparatus can also be used as a portable cage, terrarium, aquarium, greenhouse, frost shield, and the like. These applications can be facilitated by the inclusion of an integral or removably attached cover, such as a transparent cover to enable use as a greenhouse, or a fine mesh cover to enable use as a cage for small animals or insects. Note that such a fine mesh cover can also be used as an insect shield (e.g., mosquito net) when using the device as a shelter, incubator, and the like.

Operation as a Water Collection, Storage, and Processing Apparatus:

The modular multi-function apparatus can be used to provide potable water by capturing, purifying, and/or storing precipitation (or other sources of water), wherein additional collection area is optionally provided by an outwardly extended safety cover.

Additionally, the modular multi-function apparatus can be used in conjunction with a transparent cover and a liquid collection vessel to produce potable water by first condensing onto the transparent membrane the water vapor emitted from moist materials placed within the apparatus and passively heated by solar radiation, and then collecting the resulting condensate in the collection vessel. The collection vessel can be supported by the cable-stayed focal point support; however, it can be alternatively supported, such as by attaching it to the transparent cover, which is particularly useful when the moist materials are optionally heated by concentrated energy at the focal point. Note that the apparatus described in this paragraph also can be used as a dehydrator, dryer, or curing chamber by providing a means for exhausting vapor from the chamber, such as a partially open cover, or an open valve or loading port.

Alternatively, a disassembled and reconfigured modular multi-function apparatus can be used to provide potable water by collecting precipitation and/or dew, wherein the collection area of the apparatus is greatly increased as a result of separating its basic modular components. Note that accessory membranes, such as removable covers, removable reflective membranes, and/or removable reflector chambers, can be attached to the various toroidal rings of the disassembled modular apparatus to provide a water collection surface.

Operation as a Wind Turbine:

A reconfigured modular multi-function apparatus can be used to harness wind energy, wherein a lightweight accessory wind turbine generator device is mounted via the cable-stayed focal point support within the inflatable safety cage, which is supported horizontally, facing the wind, by the remaining modules of the apparatus. Conduits can be provided for transmitting electrical and/or mechanical power to other accessory apparatus.

Alternatively, a reconfigured multi-function apparatus can be used to harness wind energy, wherein the lower inflatable toroidal support ring is utilized to structurally stabilize a very lightweight collapsible (membranous) accessory wind turbine, which is mounted aft of the inflatable safety cage on a horizontal accessory rod to facilitate wind-pointing.

Additionally, a reconfigured multi-function apparatus can be used to harness wind energy, wherein an accessory wind turbine device is supported within the inflatable toroidal support ring, which has its wind-facing side movably attached to a vertical line support to enable wind-pointing, and which further utilizes a plurality of inflatable rings from the safety shield attached to its aft side both to augment airflow through the turbine and to further enhance wind-pointing.

Further, a reconfigured multi-function apparatus can be used to harness wind energy in a manner similar to that described in the preceding paragraph, but further including additional inflatable rings, optionally from the safety cage, located between the line support and the wind-facing side of the toroidal support ring to promote venturi-type flow augmentation through the wind turbine, and to further enhance wind-pointing.

Note that a collapsible lightweight wind turbine can be formed by attaching a plurality of flexible membranous blades to one of the inflatable toroidal support rings in such a manner so as to provide twist in each blade (i.e., the blade angle decreases with increasing radius) both to enhance aerodynamic performance and to facilitate connection to a central axial hub.

A lightweight wind turbine such as described in the preceding paragraph can be used to produce electrical power, wherein the wind turbine is attached to a generator mounted on a horizontal shaft, which is movably connected to a vertical cable support to enable wind-pointing, and to permit the apparatus to be elevated into higher velocity wind streams.

Alternatively, a collapsible lightweight wind turbine can be formed by attaching the tips of a plurality of simple, generally non-twisted, flexible membranous blades to one of the inflatable toroidal support rings, wherein the plurality of blades is economically fabricated primarily from a single flexible membrane.

The lightweight wind turbine as described in the preceding paragraph can be attached to a generator, wherein the wind turbine is attached to a generator mounted on a horizontal shaft, which is movably connected to a stand formed in part by a vertically oriented accessory rod attached to the basic inflatable reflector apparatus and stabilized by a plurality of cables.

Additionally, a lightweight wind turbine can be formed by attaching a slotted, pre-formed membrane having a central mounting hub to the front side of the inflatable toroidal support ring, and by further attaching a structural safety net having a central hub to the aft side of the inflatable toroidal support ring, wherein the two central hubs are used to stably mount the wind turbine to the shaft of a generator.

The slotted-membrane wind turbine as described in the preceding paragraph can be configured such that the turbine blades are formed by locally slitting and pre-deforming a substantially conical membrane.

Alternatively, a slotted-membrane wind turbine can be similarly configured to that noted above, but wherein the turbine blades are formed by locally slitting and deforming a substantially planar membrane.

Alternatively, a slotted-membrane wind turbine can be configured similar to those described above, but wherein the turbine blades are formed by locally slitting and deforming a shallow, concave, substantially spherical membrane.

As yet another alternative, a slotted-membrane wind turbine can be configured similar to those described above, but wherein the turbine blades are formed by locally slitting and deforming a deeply concave, substantially spherical membrane that is alternatively attached to the aft end of the toroidal support ring so as to not interfere with the stabilizing structural safety nets mounted to the front and aft sides of the toroidal support ring.

Operation for Miscellaneous Applications:

The modular multi-function apparatus can be used as a high-gain directional sound-amplification device, wherein an accessory microphone is attached at the focal point and connected to an amplifying headset to listen, for example, to the auditory chirp of a bird. Note that the naked ear can also be placed in proximity to the focal point to hear distant and/or faint sounds.

Alternatively, the modular multi-function apparatus can be used as a fermentation apparatus by attaching an anaerobic airlock/pressure-relief valve to the upper central membrane. Note that the portable fermentor apparatus optionally can be deployed (i.e., floated) on water to provide temperature stabilization.

Additionally, the modular multi-function apparatus can be used to sieve or filter liquid and/or solid materials by attaching suitable accessory meshes and/or other filter media to the apparatus.

Further, the modular multi-function apparatus can be used as a floating aquatic chamber to hold live fish.

Alternate Methods for Constructing the Spherical Support and Safety Shield:

An alternate modular inflatable multi-function apparatus can be configured having a low-inflation-volume alternate spherical support and a simplified alternate inflatable safety cage, wherein the low-inflation-volume spherical support is formed by connecting a plurality of inflatable toroidal rings of decreasing major diameter, and the simplified inflatable safety cage is formed by connecting a plurality of inflatable toroidal rings of substantially equal minor and major diameter.

Another alternate modular inflatable multi-function apparatus can be configured having an alternate inflatable spherical support and an alternate inflatable safety cage, each of which comprises an inner membrane and an outer membrane joined by a plurality of spaced, continuous circumferential, membranous ribs (i.e., cylindrical, conical, or annular membranes) to form a plurality of optionally interconnected compartments within each structure.

Yet another alternate modular inflatable multi-function apparatus can be configured having an alternate inflatable spherical support and an alternate inflatable safety cage, each of which typically comprises an inner membrane and outer membrane, which are joined to each other at their peripheral edges to form an inflatable pressure envelope, and which are further joined by a plurality of internal, finite, circumferentially spaced, membranous ribs (i.e., substantially planar radial membranes at discrete circumferential positions) to hold the inner and outer membranes in a predetermined shape, and to form (typically) a plurality of optionally interconnected compartments within each structure.

Still another alternate modular inflatable multi-function apparatus can be configured, wherein the spherical support alternatively comprises a plurality (e.g., two) of stacked, progressively smaller basic reflector apparatuses, and wherein the safety shield alternatively comprises a plurality of alternate basic reflector apparatuses having removable reflective membranes and/or removable reflector chambers which are removed and stowed to allow light to strike the primary reflector.

Figure 18:
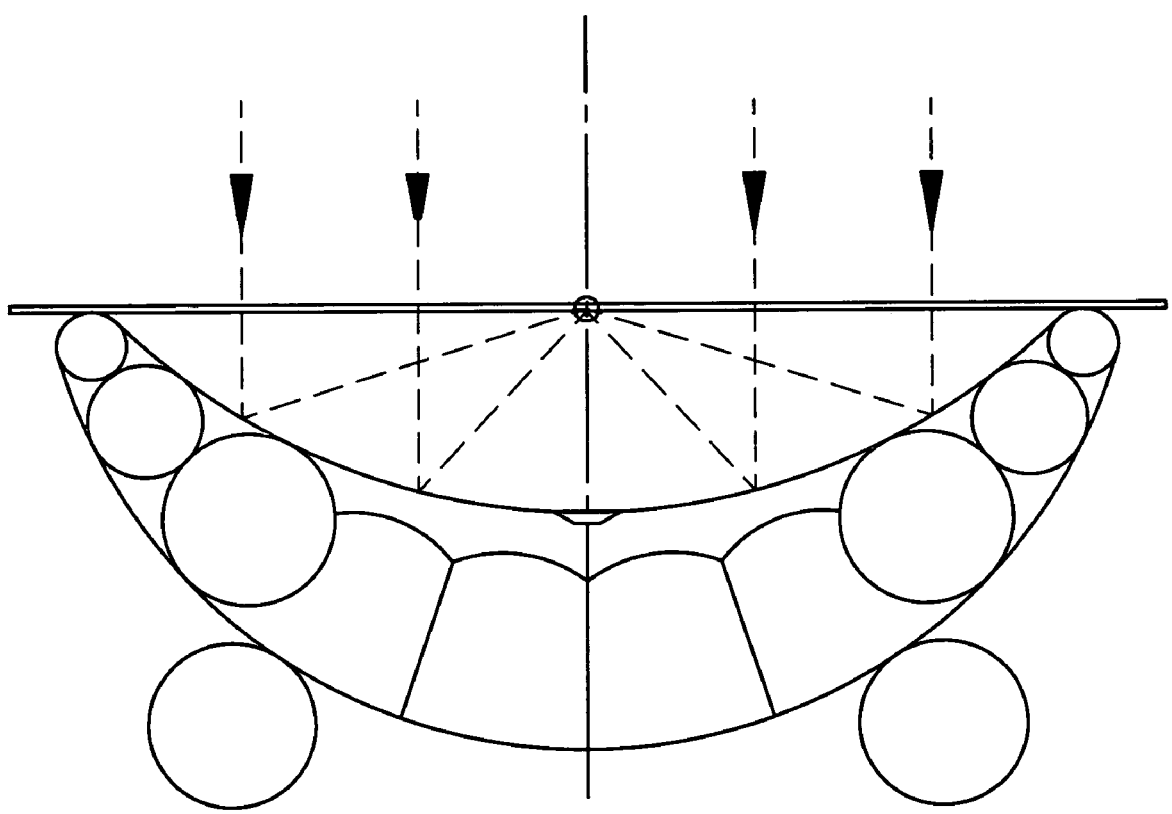
FIG. 18 is a schematic cross-sectional view of an alternate modular inflatable multi-function apparatus comprising a reflective membrane integrated with a low-inflation-volume combination spherical support and focal point support.

FIG. 18 depicts an alternate modular inflatable multi-function apparatus comprising a reflective membrane integrated with a low-inflation-volume combination spherical support and focal point support, wherein the inner portion of the reflective membrane is supported above the spherical support in a pressure-deployable arrangement, and the outer portion of the reflective membrane is intermittently attached to the spherical support in a mechanically deployable arrangement.

Figure 19A:
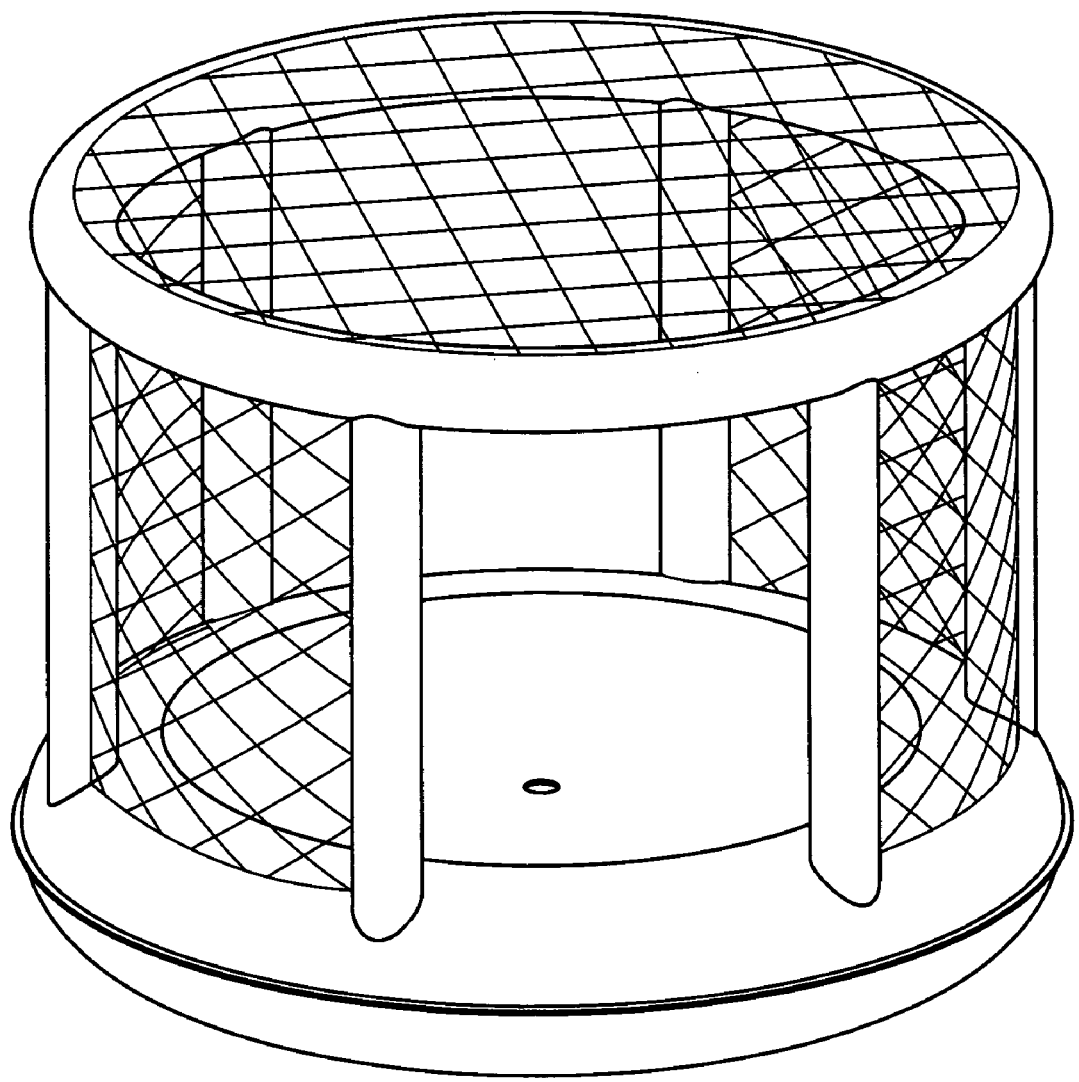
FIGS. 19A–D are schematic perspective views illustrating various alternate inflatable safety cages (e.g., truss-like safety shields with optional safety nets).

FIGS. 19A–D Alternate Safety Cages:

FIG. 19A depicts an alternate modular multi-function apparatus having an integral alternate inflatable safety cage, wherein a plurality (e.g., four) of substantially linear inflatable tubes are integrally connected to the toroidal support ring of the basic reflector apparatus and to an upper inflatable toroidal ring to form a lightweight tubular structure, and wherein several of the openings within the lightweight tubular structure, are covered with a flexible mesh or net, both to provide a physical barrier around the focal point, and to enhance the structural stability of the integral safety cage. Note that by making the safety cage integral with the toroid, both structures can be inflated simultaneously by providing one or more interconnecting gas ports between the structures. This configuration significantly enhances safety by preventing the use of the apparatus without a substantially fully deployed safety cage.

Figure 19B:
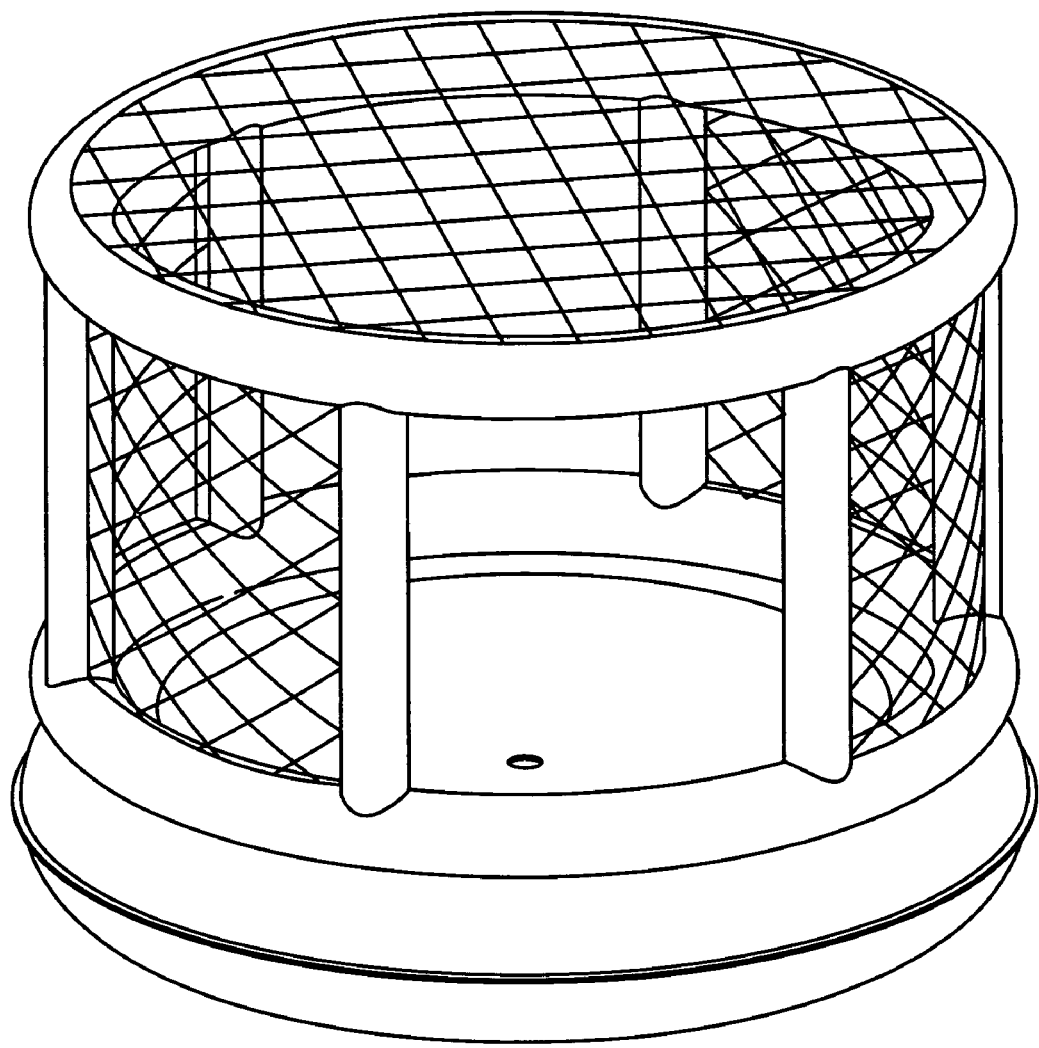

FIG. 19B depicts an alternate modular multi-function apparatus having a removably attached alternate inflatable safety cage, wherein a plurality of linear (but optionally curved) inflatable tubes are integrally connected to both an upper and a lower inflatable toroidal ring to form a removable lightweight tubular structure, and wherein several of the openings within the lightweight tubular structure are covered with a flexible mesh or net, both to provide a physical barrier around the focal point, and to enhance the structural stability of the removable safety cage.

Figure 19C:
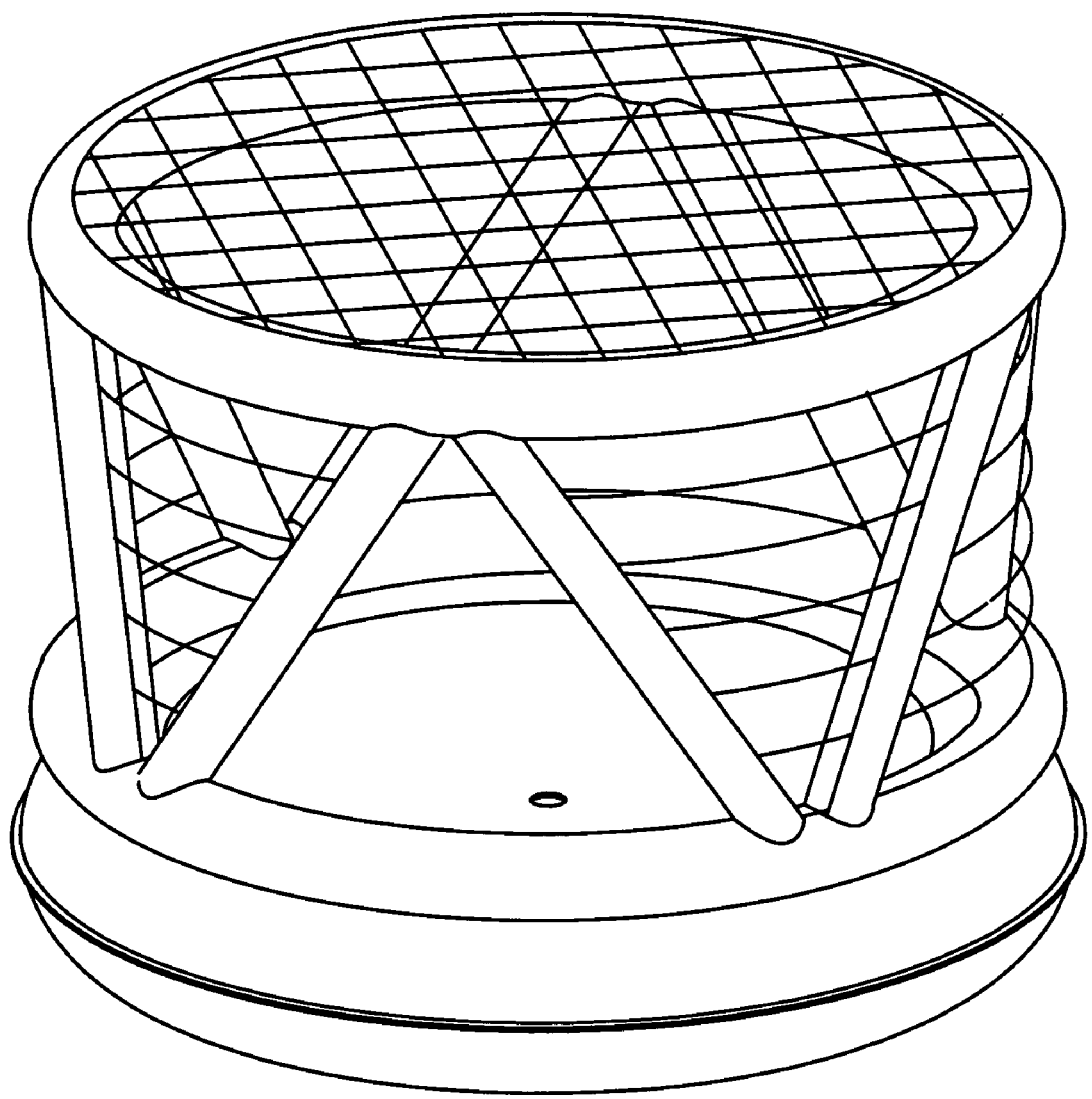

FIG. 19C depicts an alternate modular multi-function apparatus having a removably attached alternate inflatable safety cage, wherein a plurality of linear inflatable tubes connected to an upper and a lower inflatable ring form a lightweight truss structure, and wherein several of the openings within the lightweight truss structure are covered with a flexible mesh or net, both to provide a physical barrier around the focal point, and to enhance the structural stability of the removable safety cage.

Figure 19D:
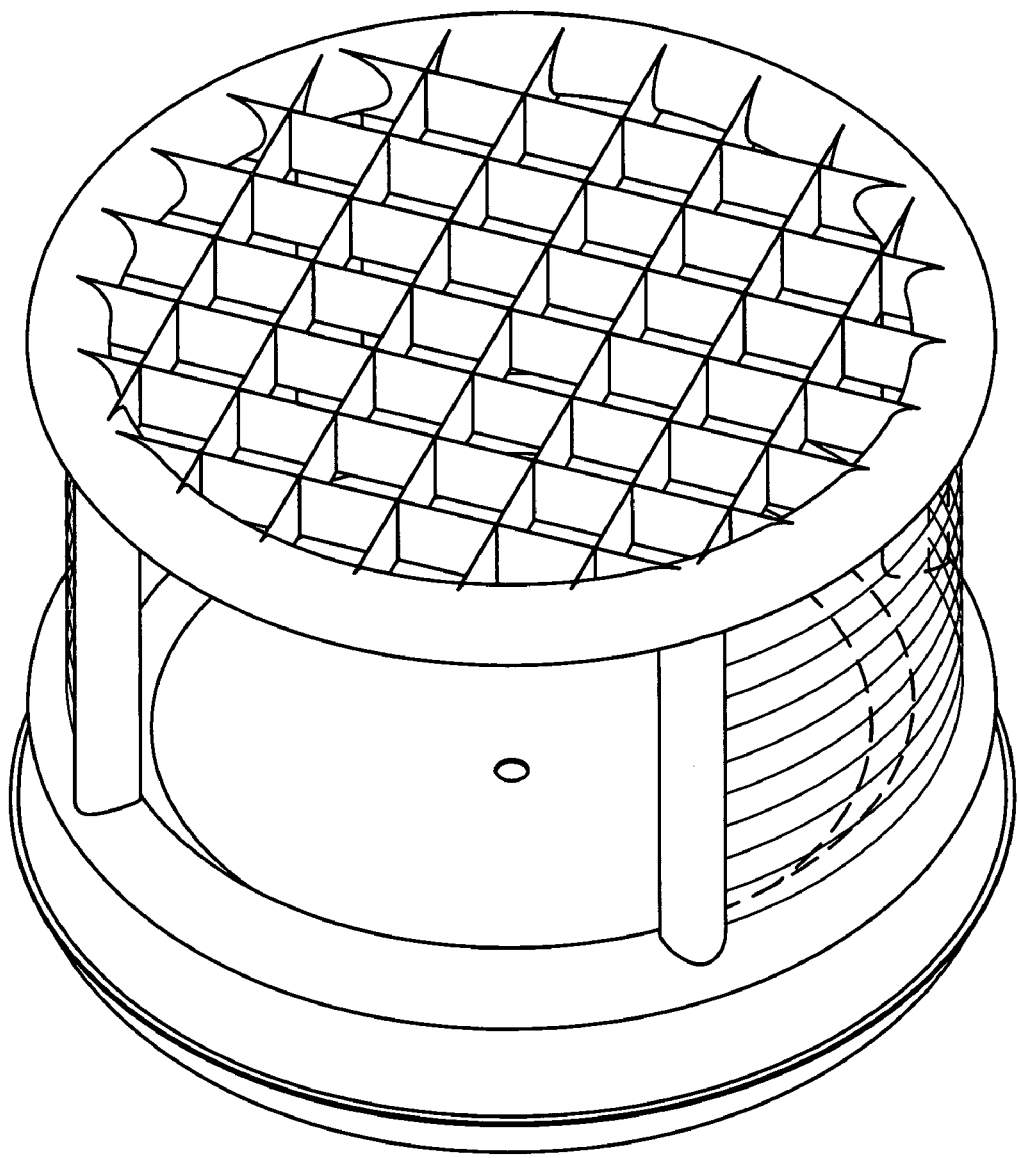

FIG. 19D depicts an alternate modular multi-function apparatus having a removably attached alternate inflatable safety cage comprising a plurality of linear inflatable tubes integrally connected to both an upper and a lower inflatable toroidal ring to form a removable lightweight tubular structure, wherein several of the openings within the side of the tubular structure are covered with a light-attenuating flexible transparent membrane, and the upper opening of the tubular structure is covered with a membranous grid or grating to provide off-axis light attenuation.

Tapered Support and Leveling Rings:

The basic inflatable reflector apparatus can be supported by a plurality of inflatable tapered support and leveling rings, wherein the thinnest portions of the stacked tapered rings are located at one circumferential position, whereby the apparatus can be progressively inclined to a nearly vertical orientation by progressively inflating the tapered rings. Alternatively, the device can be oriented in a nearly horizontal position by substantially deflating the rings. Note that the tapered rings can be inflated simultaneously using one valve by providing interconnecting gas ports between the rings, or inflated separately via individual gas valves for each tapered ring.

Alternatively, a basic inflatable reflector apparatus can be supported by a plurality of inflatable tapered support and leveling rings, wherein the inclination of the basic reflector apparatus is substantially minimized by alternately positioning the thinnest portions of adjacent stacked rings at opposite circumferential locations, but wherein the inclination of the basic reflector apparatus optionally can be maximized by positioning the thinnest portions of the stacked rings at one circumferential location. Note that the rings can also be used to level the apparatus when placed on an inclined surface, such as a hill or roof.

Figure 20A:
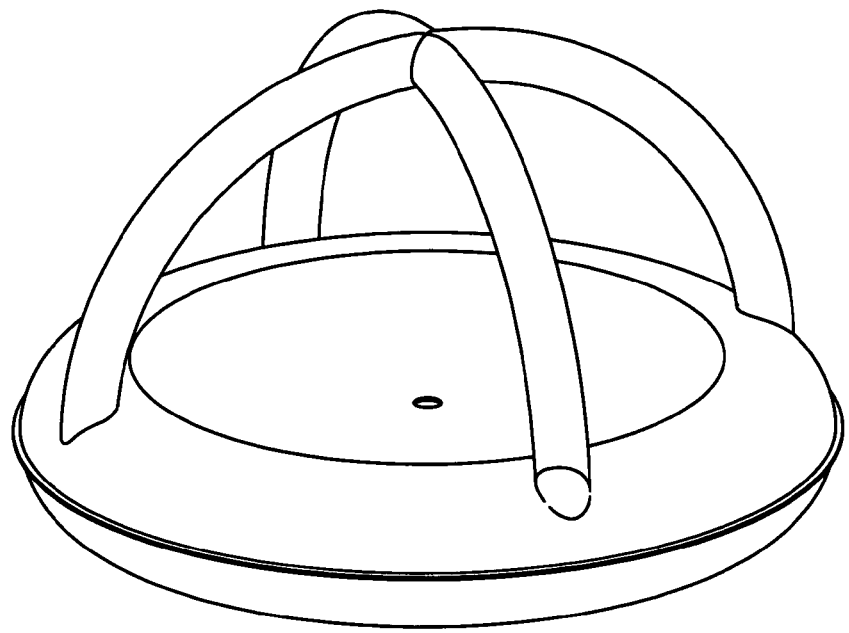
FIGS. 20A–B are schematic perspective views illustrating various alternate combination/dual-use safety cages and device supports.
Figure 20B:
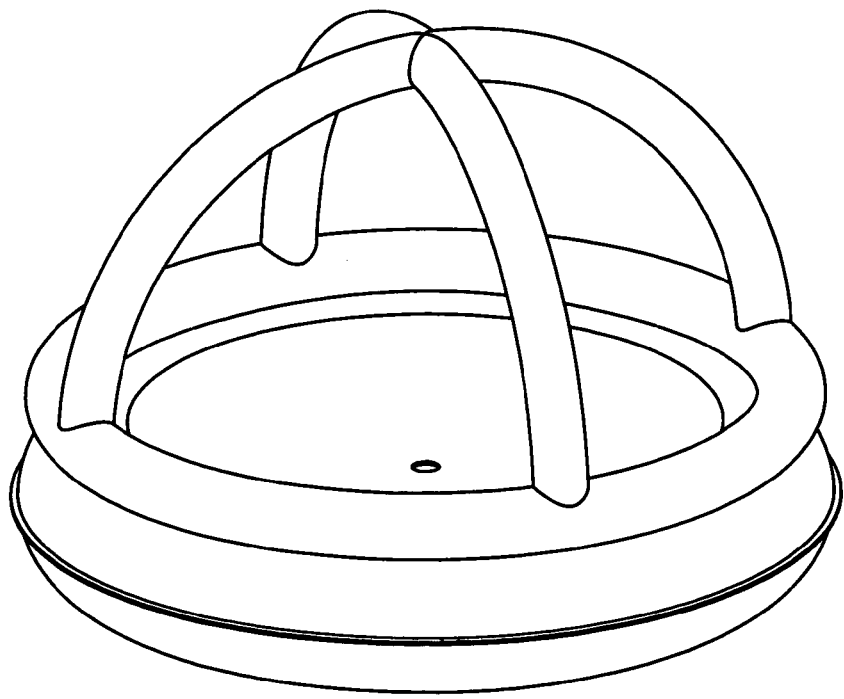

FIGS. 20A–B Alternate Combination/Dual-Use Safety Cages and Device Supports:

FIG. 20A depicts an alternate modular multi-function apparatus having an alternate integral inflatable safety cage and a substantially identical alternate integral inflatable spherical support (not shown), both of which comprise two orthogonally connected semicircular tubes optionally integrally attached to the basic reflector apparatus. The apparatus can also have an alternate inflatable focal point support (not shown) comprising two localized or discrete inflatable pressure vessels removably attached to the basic reflector apparatus for supporting via brackets a rod diametrically spanning the basic reflector apparatus.

FIG. 20B depicts another alternate modular multi-function apparatus having an alternate removably attached inflatable safety cage and a substantially identical alternate removably attached inflatable spherical support (not shown), both of which comprise two orthogonally connected inflatable semicircular tubes integrally attached to an inflatable toroidal ring. The apparatus can also have an alternate means for supporting a rod (not shown) diametrically spanning the basic reflector apparatus, wherein the rod is removably attached via a bracket or other fastening means (not shown) to the inflatable toroidal ring of the safety cage.

Yet another alternate modular multi-function apparatus can be configured having an alternate inflatable means for supporting the apparatus and a substantially identical alternate inflatable focal point support, both of which comprise a removably attached adjustable truss comprising a plurality (e.g., three) of linear inflatable tubes, wherein each inflatable tube has a plurality of individually inflatable compartments with separate inflation valves as a means for adjusting its length.

Still another alternate modular multi-function apparatus can be configured having an alternate inflatable means for supporting the apparatus and a similar alternate inflatable focal point support, each of which comprises a removably attached inflatable tube stabilized by a plurality of tensioned lines or cable stays. Note that two or more inflatable tubes may be used to enhance stability or provide structural redundancy.

Alternate Non-Inflatable Collapsible Combination Safety Cages and Device Supports.

An alternate modular multi-function apparatus can be configured having an alternate collapsible rigid safety cage and a substantially identical alternate collapsible rigid spherical support, each of which comprise a plurality (e.g., five) of semicircular rigid elements rotatably attached (e.g., pinned) to one side of the inflatable toroidal support ring of the basic reflector apparatus at diametrically opposed pin joints, and which further comprise a plurality of cords or cable stays connected to the semicircular rigid elements and to the basic reflector apparatus to stabilize the collapsible structure.

An alternate modular multi-function apparatus can be configured having an alternate globe-shaped combination collapsible rigid safety cage and spherical support comprising a plurality (e.g., twelve) of semicircular rigid elements, which are rotatably attached (e.g., pinned) to each other via pin joints located above and below the basic reflector apparatus along the focal axis of the device, and which are further attached to the inflatable toroidal support ring of the basic reflector apparatus both to support the reflector apparatus and to stabilize the collapsible structure.

Figure 21A:
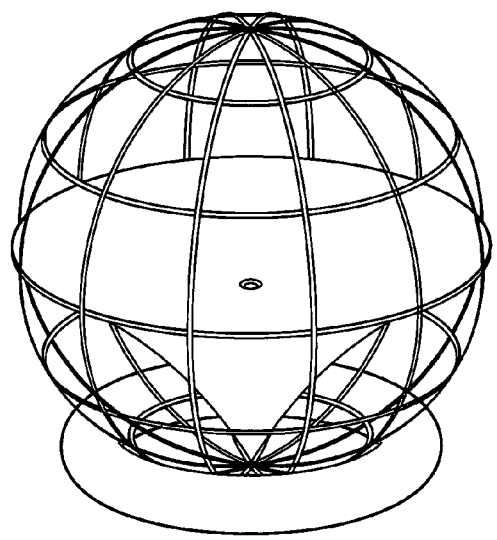
FIGS. 21A–D are a schematic perspective view and three schematic cross-sectional views illustrating various alternate collapsible combination safety cage and device supports shown supporting removable reflector chambers.
Figure 21B:
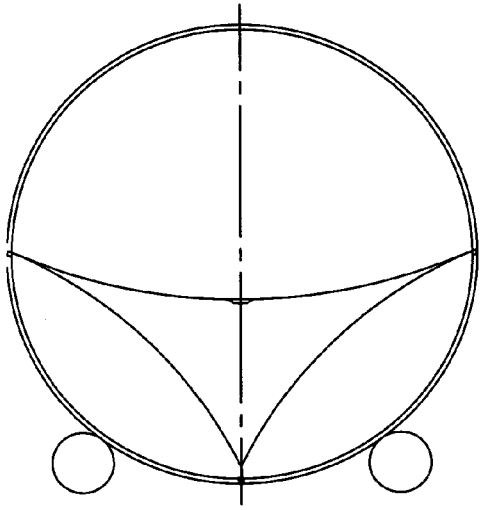

FIGS. 21A–D Alternate "Globe-Type" Collapsible Rigid Element Combination Safety Cage and Device Supports:

FIGS. 21A and 21B depict an alternate configuration of the modular multi-function apparatus comprising a sub-ambient pressurized removable reflector chamber (third species) removably attached via hooks, clips, or the like, to the equatorial rim and the bottom pole of an optionally collapsible, globe-shaped, truss-like, support structure couched within an inflatable toroidal support ring.

Figure 21C:
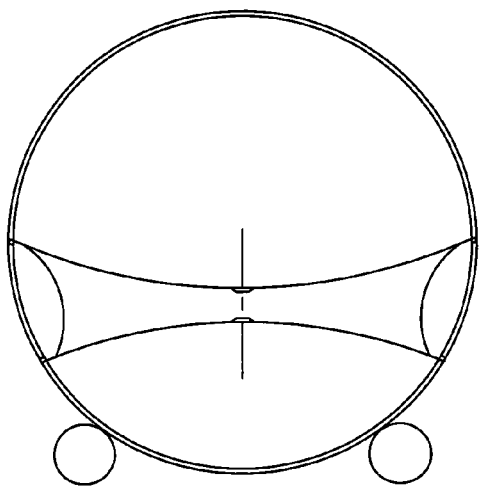

FIG. 21C depicts an alternate configuration of the modular multi-function apparatus comprising a sub-ambient pressurized removable reflector chamber (first species) having its upper side removably attached via hooks, clips, or the like, to the equatorial rim and its lower side similarly removably attached to a lower parallel rim of an optionally collapsible, globe-shaped, truss-like, support structure couched within an inflatable toroidal support ring.

Figure 21D:
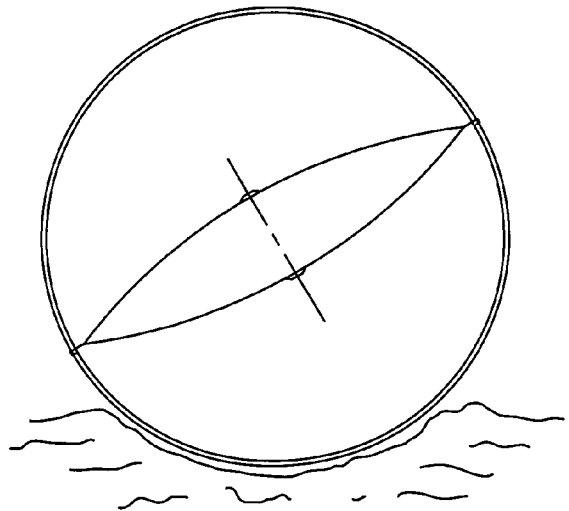

FIG. 21D depicts an alternate configuration of the modular multi-function apparatus comprising a super-ambient-pressurized, removable reflector chamber (second species) removably attached via hooks, clips, or the like, to the equatorial rim of the globe-shaped, truss-like, support structure couched alternatively in a ground depression, such as may be dug in sand.

Figure 22A:
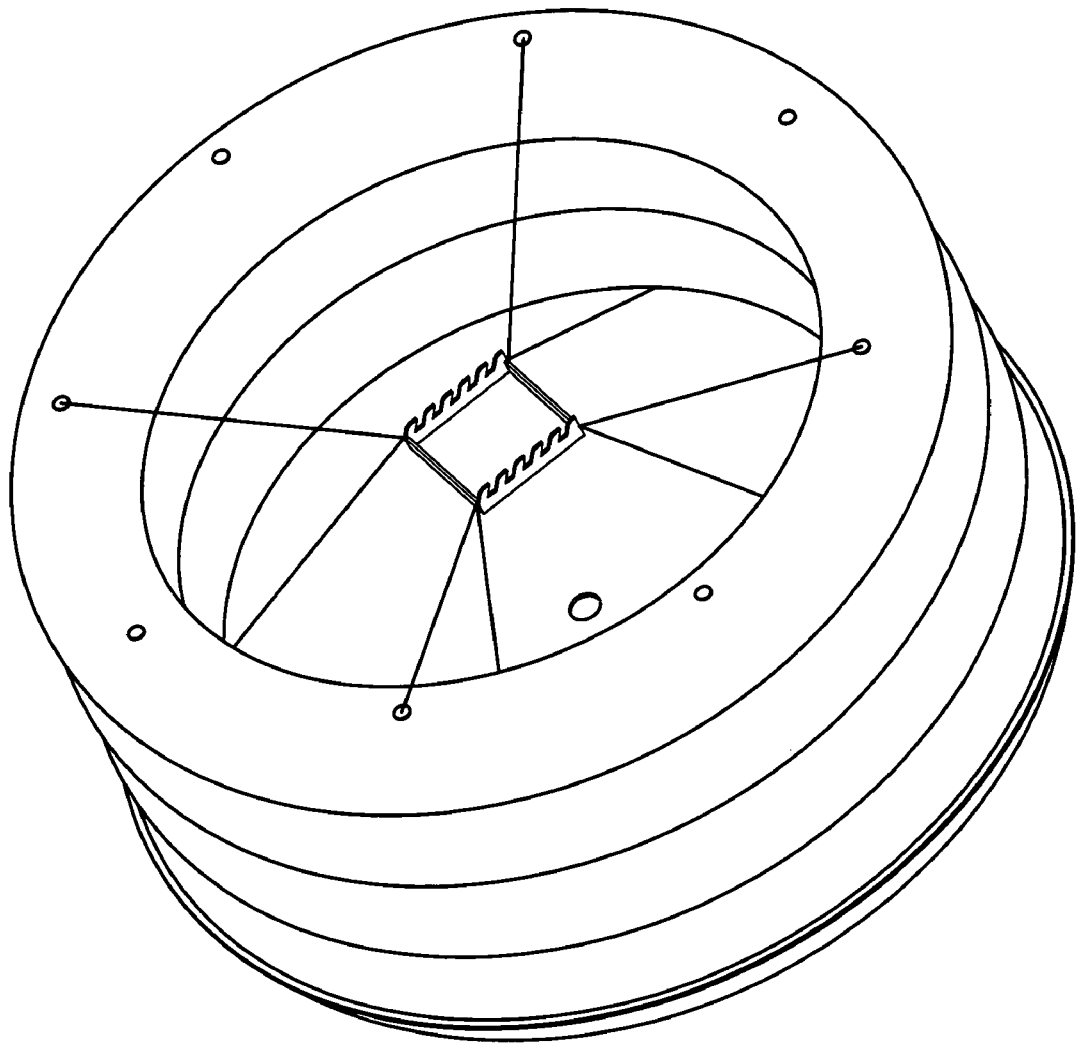
FIGS. 22A–G are schematic perspective views illustrating various alternate cable-stayed focal point supports.

FIGS. 22A–G Alternate Cable-Stayed Focal Point Supports:

FIG. 22A depicts an alternate collapsible, cable-stayed focal point support (second species) comprising a square, rigid frame removably attached to the upper and lower surfaces of an inflatable safety cage using four pairs of cords, wires, or cable stays, whereby various accessory elements can be supported in proximity to the focal point.

Figure 22B:
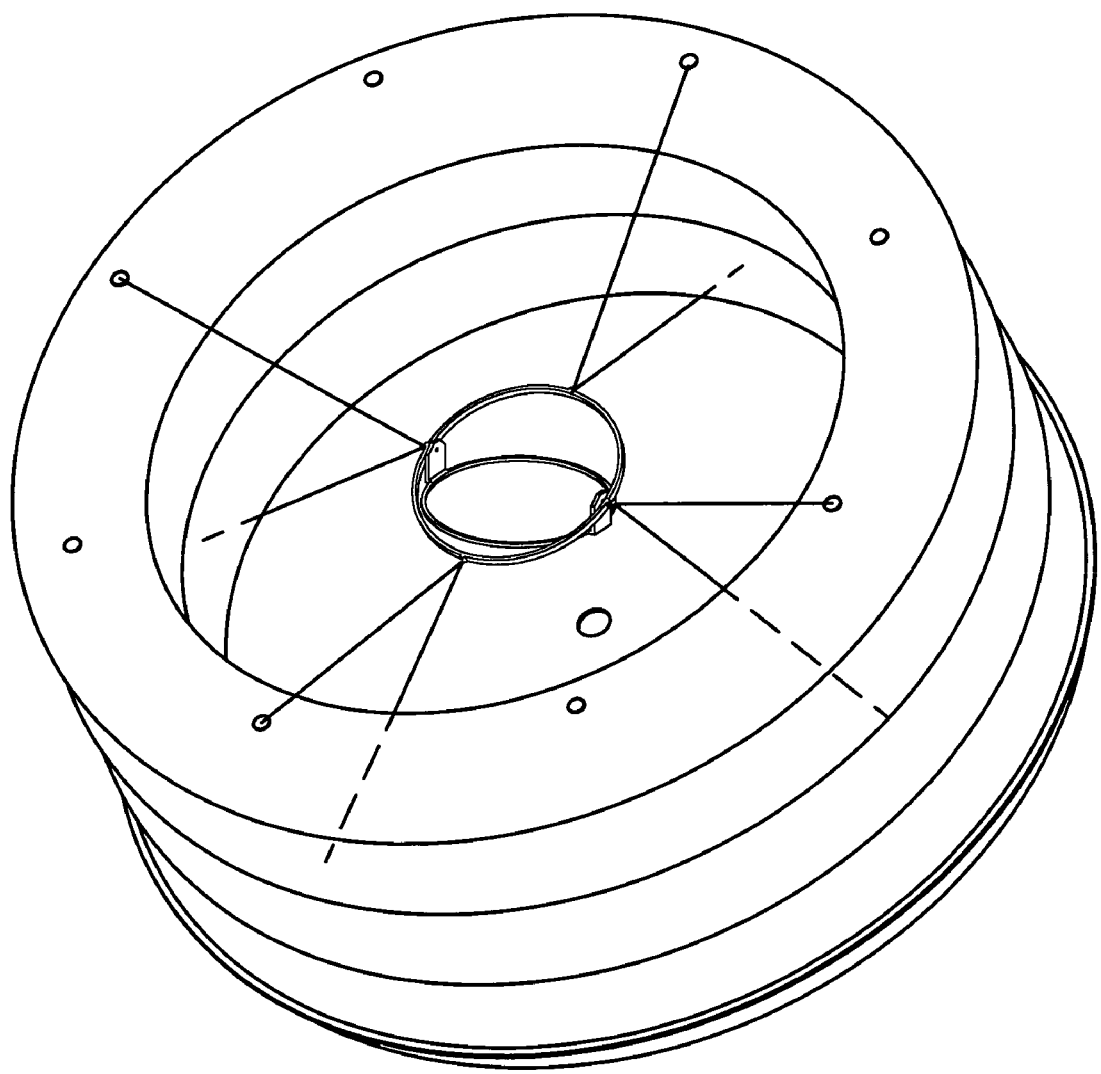

FIG. 22B depicts an alternate collapsible focal point support (third species) comprising a circular gimbal (i.e., a self-leveling pivoting frame) movably attached via pin joints to a circular rigid frame, which is removably attached to the upper and lower surfaces of an inflatable safety cage using four pairs of cords, wires, or cable stays, wherein an accessory element supported by the gimbal in proximity to the focal point can be self-leveling as shown, or optionally adjusted and held in a predetermined orientation using an optional adjustment and securing means (not shown), such as a friction clamp at one of the pivot joints.

Figure 22C:
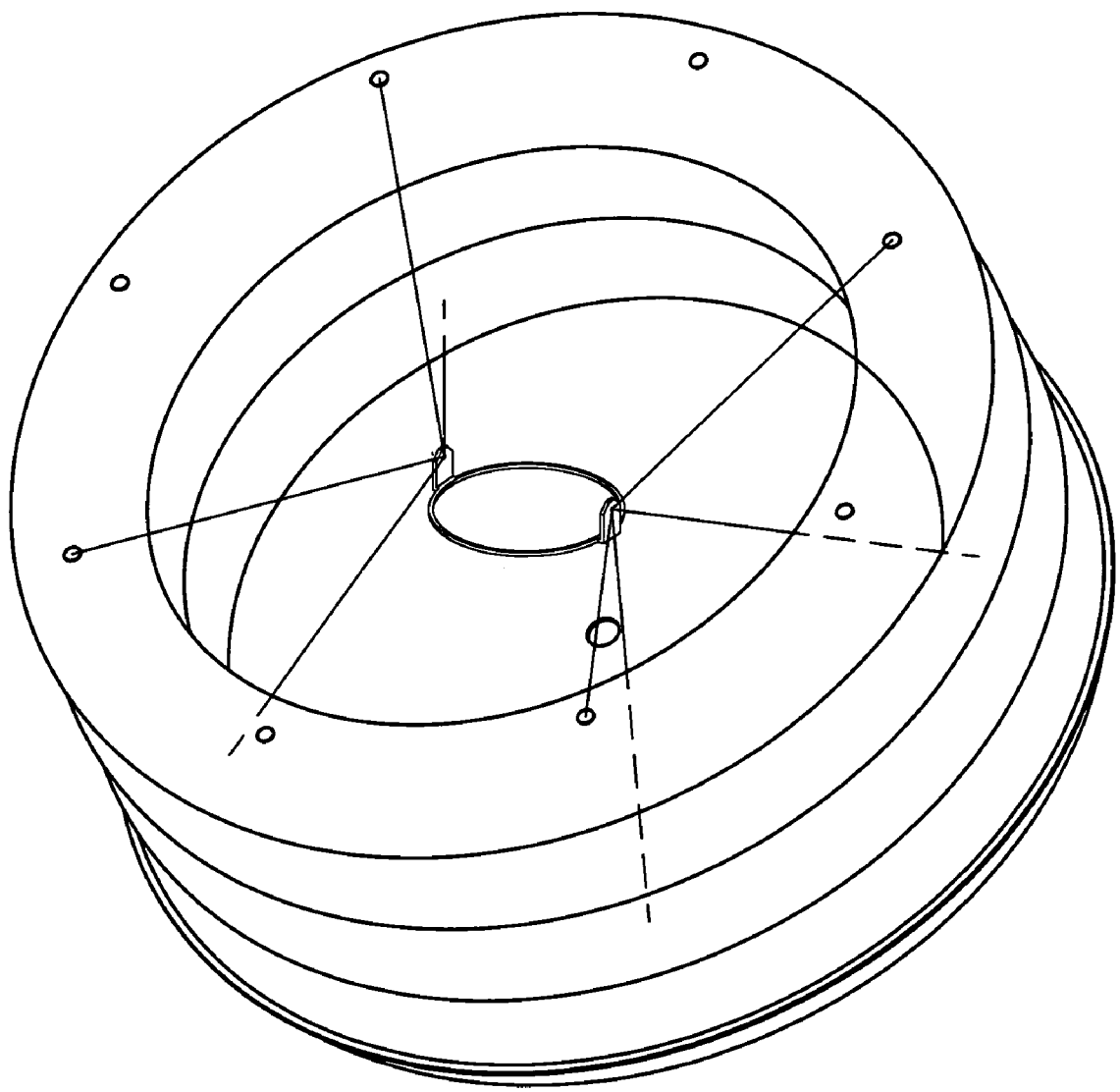

FIG. 22C depicts an alternate collapsible focal point support (fourth species) comprising a circular gimbal (i.e., a self-leveling pivoting frame) movably attached via two pin joints to four pairs of cords, wires, or cable stays, which are removably attached to the upper and lower surfaces of an inflatable safety cage, wherein an accessory element supported by the gimbal in proximity to the focal point can be self-leveling.

Figure 22D:
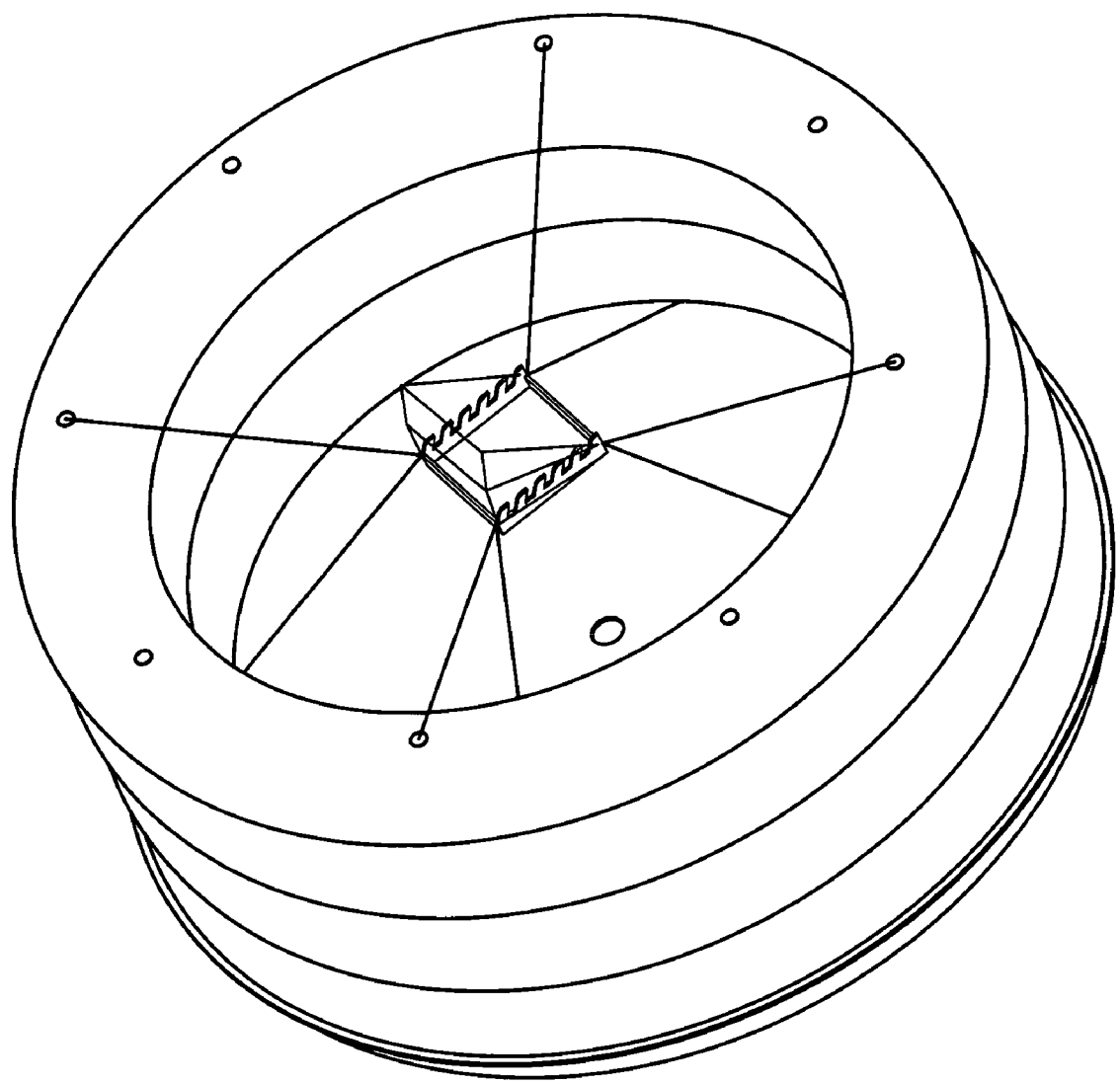

FIG. 22D depicts an alternate collapsible focal point support (fifth species) comprising a rigid square frame removably attached to the upper and lower surfaces of an inflatable safety cage using four pairs of cords, wires, or cable stays, and further comprising an internally reflective, articulated structure attached to the upper side of the rigid frame, whereby accessory elements can be supported in a horizontal (i.e., level) or other predetermined orientation, and the radiant energy entering the lower end of the reflective articulated structure can be redirected to the bottom of an accessory element (not shown), such as a pan, to improve performance.

Figure 22E:
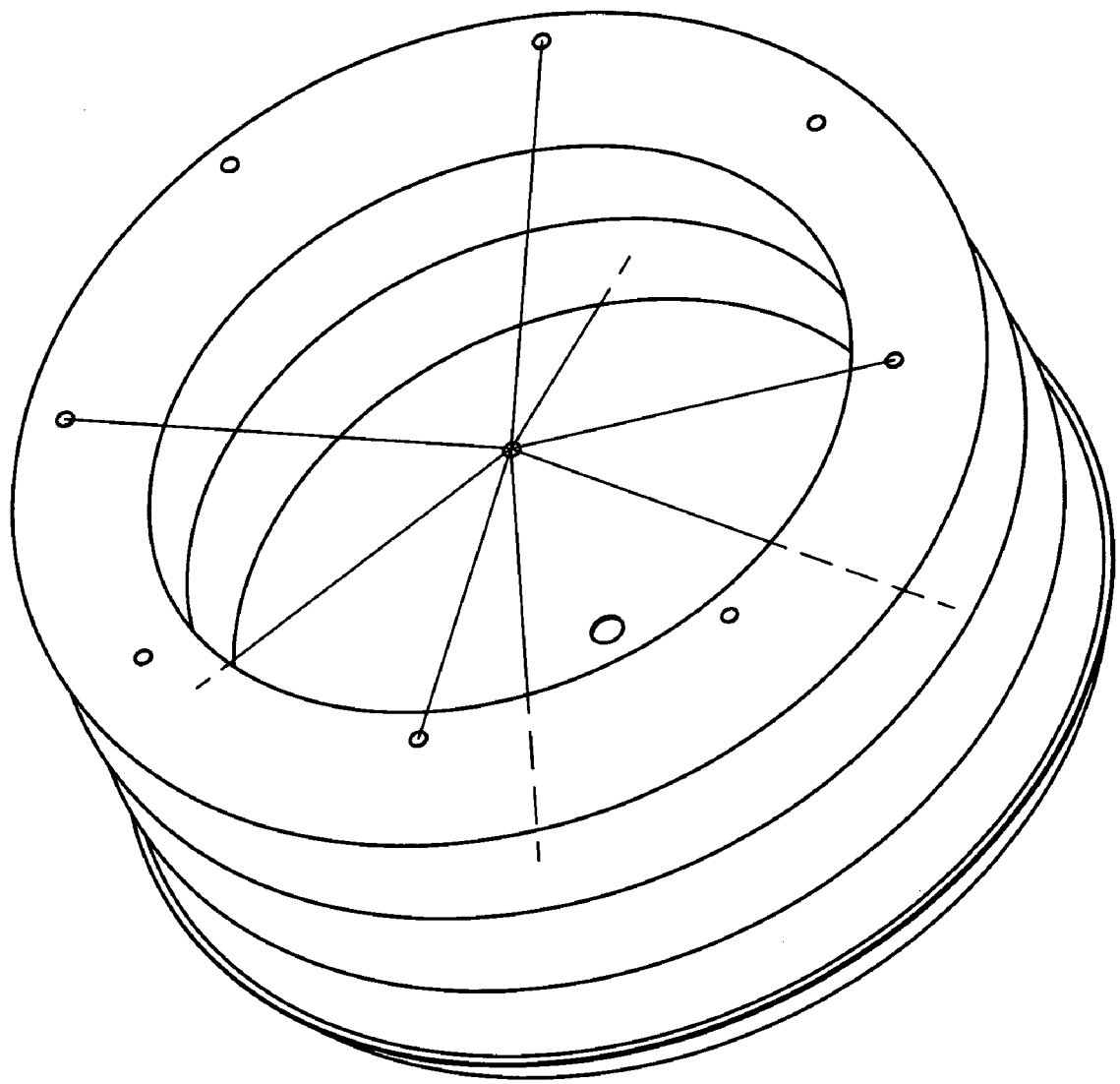

FIG. 22E depicts an alternate collapsible focal point support (sixth species) comprising a small bracket or ring attached via four pairs of cords, wires, or cable stays to the upper and lower surfaces of an inflatable safety cage, whereby various accessory elements (not shown) can be supported in proximity to the focal point.

Figure 22F:
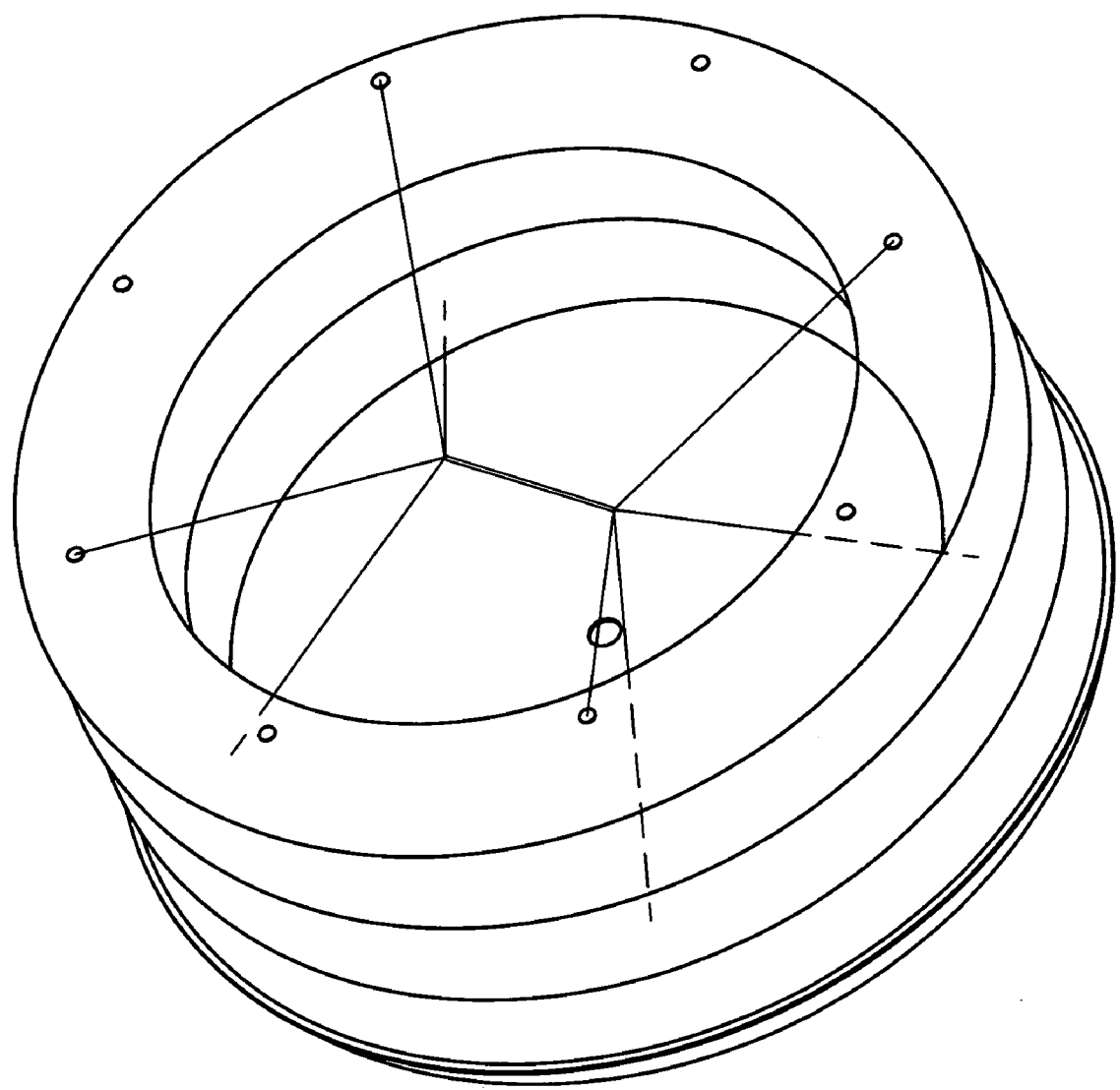

FIG. 22F depicts an alternate collapsible focal point support (seventh species) comprising a short rod, tube, or length of cable attached via four pairs of cords, wires, or cable stays to the upper and lower surfaces of an inflatable safety cage, whereby various accessory elements (not shown), such as a kettle, can be suspended or otherwise supported in proximity to the focal point.

Figure 22G:
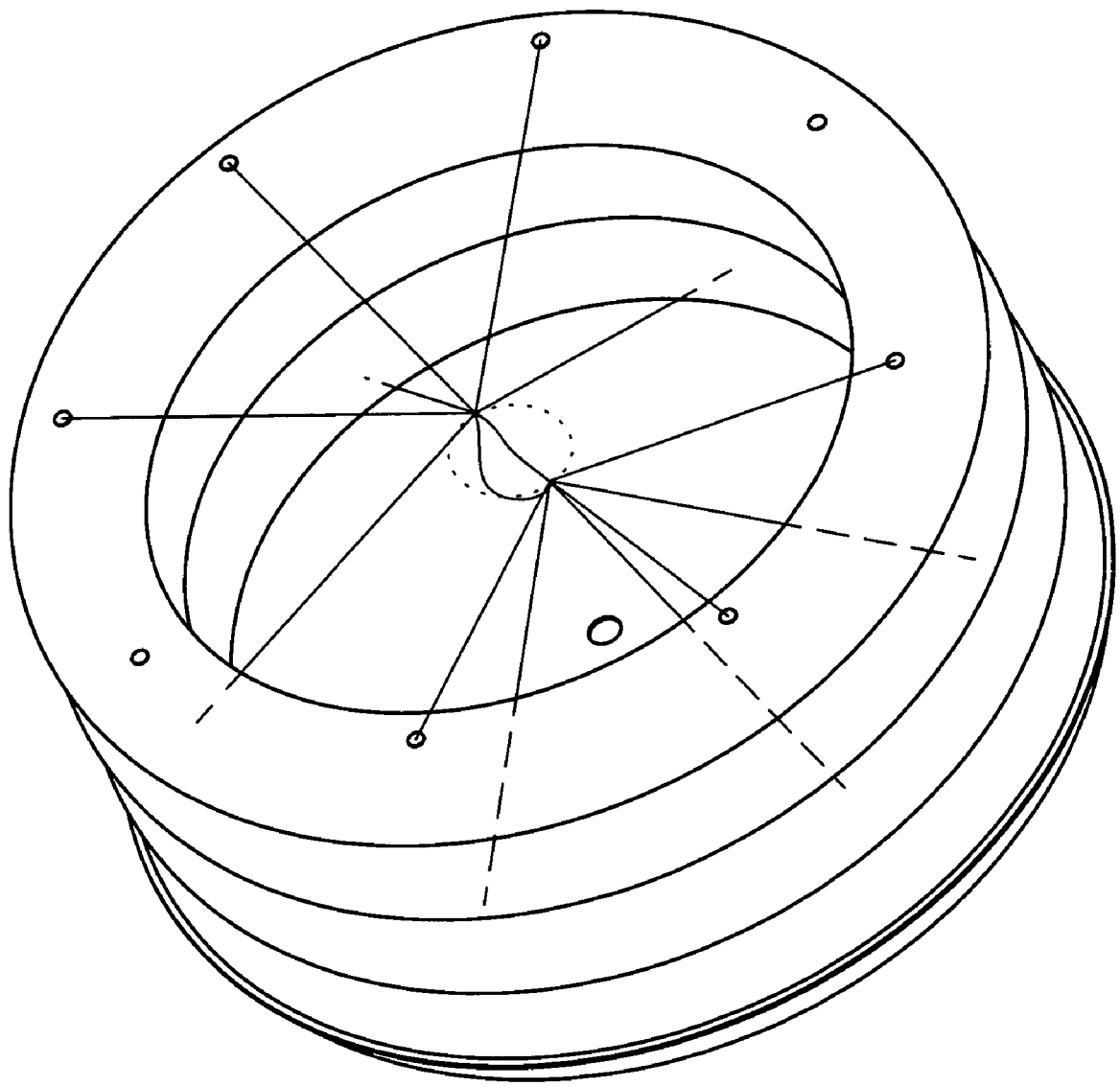

FIG. 22G depicts an alternate collapsible focal point support (eighth species) comprising two substantially fixed small brackets or rings, each of which is attached via three (or other number) pairs of cords, wires, or cable stays to the upper and lower surfaces of an inflatable safety cage, and further comprising an adjustable wire loop attached between the two brackets or rings, whereby various accessory elements, such as a cooking or heating vessel, can be supported in a self-leveling manner in proximity to the focal point. Note that the wire loop can optionally have a cinching means (not shown) for securing the cables around an undersized accessory element.

An alternate collapsible focal point support (ninth species) can be configured comprising a flexible wire or cable basket removably attached via six pairs of cords, wires, or cable stays to the upper and lower surfaces of an inflatable safety cage, whereby various accessory elements and/or materials to be heated, such as a cooking vessel, pre-packaged food items, and/or certain solid foodstuffs, can be securely supported in proximity to the focal point in either a random or predetermined orientation.

Figure 23A:
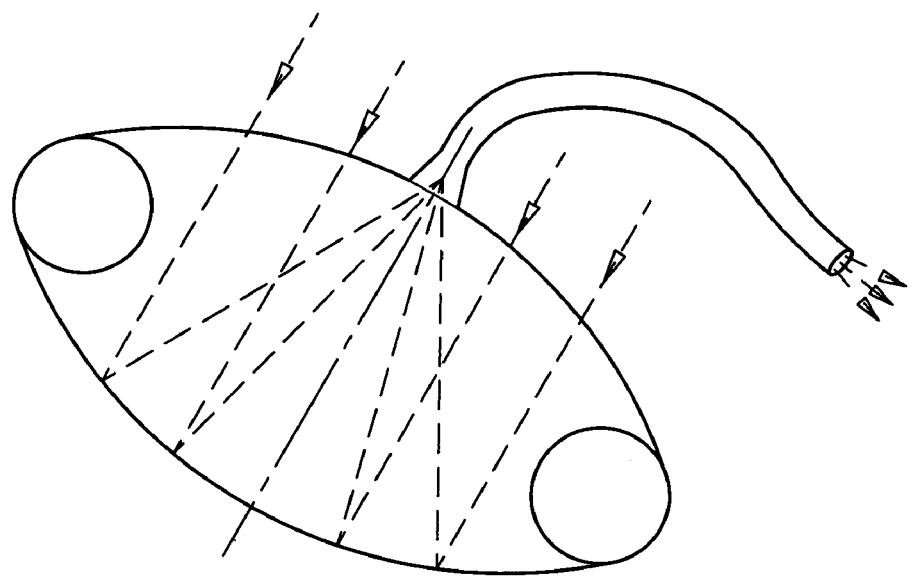
FIGS. 23A–B are schematic cross-sectional views illustrating the use of a waveguide with a super-ambient-pressurized first embodiment basic reflector apparatus.
Figure 23B:
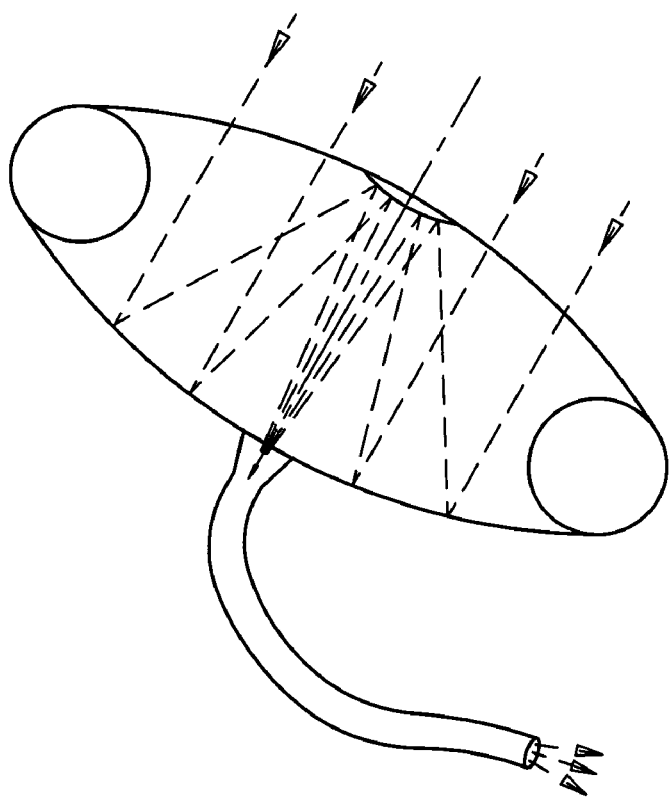

FIGS. 23A–B Waveguide and Secondary Reflectors:

FIG. 23A depicts a basic first embodiment reflector apparatus operating in super-ambient pressure mode to focus light rays into an accessory waveguide device connected to the upper transparent membrane in proximity to the focal point of the apparatus.

FIG. 23B depicts an alternate basic first embodiment reflector apparatus having a pressure-deployable convex secondary reflective membrane centered within the transparent membrane of a super-ambient pressurized reflector chamber, wherein light rays entering the apparatus are progressively concentrated by the primary and secondary reflectors into an accessory waveguide device connected to the center of the primary reflector in proximity to the focal point of the modified (compound) reflector apparatus. Note that the waveguide depicted herein can optionally be a lightweight fluid-filled tube, instead of the conventional coated glass or polymer fiber(s).

Figure 24A:
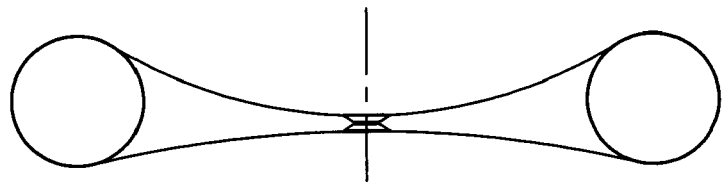
FIGS. 24A–D are schematic cross-sectional views illustrating the use of a basic first embodiment reflector apparatus as a fluid pump.

FIGS. 24A–D Operation as a Fluid Pump:

FIG. 24A depicts a basic first embodiment reflector apparatus modified with one-way fluid valves (i.e., check valves) to facilitate inflation, to prevent accidental deflation, and to facilitate use of the apparatus as a manual fluid pump.

Figure 24B:
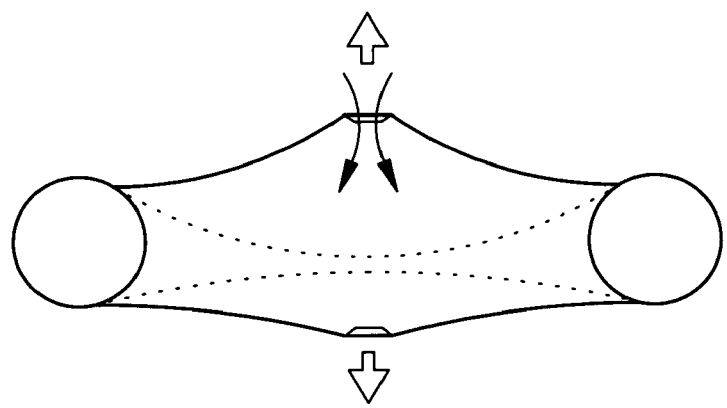

FIG. 24B depicts a modified basic first embodiment reflector apparatus configured as a manual fluid pump illustrating the fluid intake stroke, wherein the central membranes are manually separated (i.e., extended outward) to draw fluid (typically air) into the central reflector chamber through the upper valve.

Figure 24C:
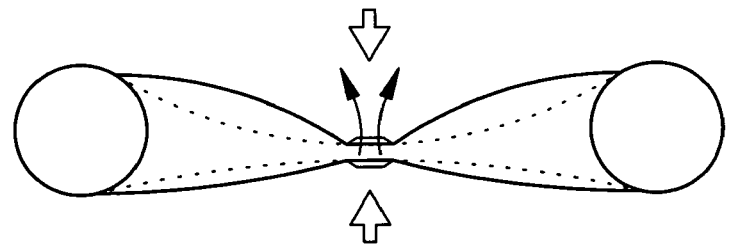

FIG. 24C depicts a modified basic first embodiment reflector apparatus configured as a manual fluid pump illustrating the fluid exhaust stroke, wherein the central membranes are manually forced together (i.e., forced inward) to expel or exhaust fluid (typically air) from the central reflector chamber through the upper valve.

Figure 24D:
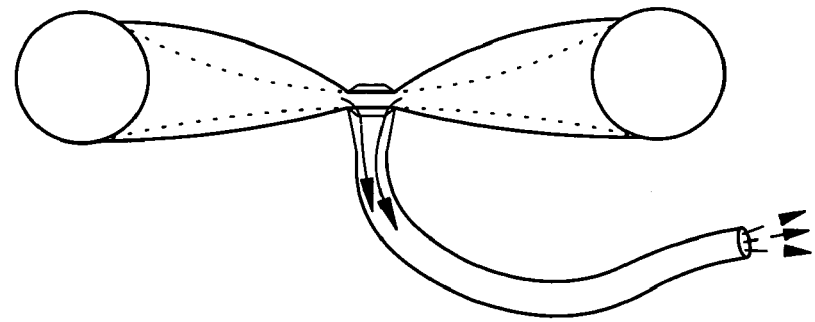

FIG. 24D depicts a modified basic first embodiment reflector apparatus configured as a manual fluid pump illustrating the fluid exhaust stroke, wherein the central membranes are manually forced together (i.e., forced inward) to expel or exhaust fluid (typically air) from the central reflector chamber through the lower valve into an attached accessory tube, which may be connected to any suitable accessory device (not shown) requiring inflation.

Figure 25A:
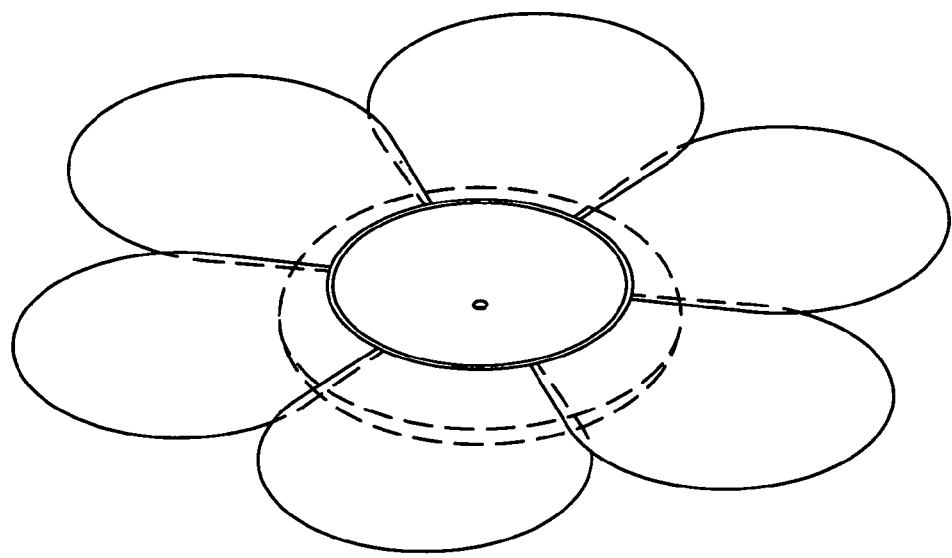
FIGS. 25A–B are schematic perspective views illustrating the use of additional accessory membranes for both enhanced water collection and use as a shelter.
Figure 25B:
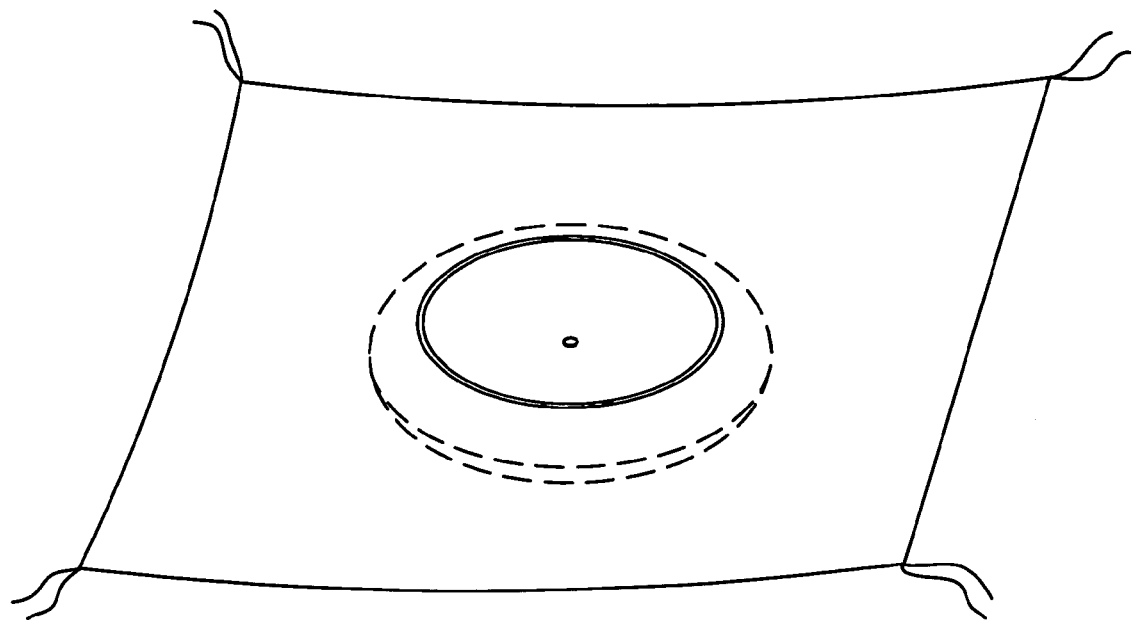

FIGS. 25A–B Accessory Membranes for Enhanced Water Collection and/or Shelter:

FIG. 25A depicts a basic first embodiment reflector apparatus further including a plurality (e.g., six) of attached membranes or covers, which are shown extended in a petal-like arrangement to enhance liquid collection by augmenting the capture area of the apparatus, but which can also have various optical properties (such as color, transparency, opacity, emissivity, reflectivity, selective reflectivity, and the like) and, thus, can be used to enhance or enable numerous optical functions of the apparatus.

FIG. 25B depicts a basic first embodiment reflector apparatus further including a large extended rectangular (or other shaped) multi-layer insulated membrane or sheet attached to the upper surface of the multi-function reflector apparatus to greatly enhance liquid collection in the form of precipitation, dew, or frost. Ties are shown for supporting or elevating the periphery of the membrane; however, one or more inflatable tubes may be used to support the membrane in a cupped configuration. Note that the upper surface of the membrane (and/or many other surfaces of the modules of the present invention) can have a high emissivity surface to enhance the collection of dew or frost at night by radiative condensation processes. Further, note that the multi-layer insulated membrane can also serve as an emergency thermal blanket, insulating ground cloth, protective tarp or cover, and the like. Additional membranes and/or membranes of any other practical shape may also be used.

Note that a basic first embodiment reflector apparatus can be configured further including a large extended, optionally multi-layer insulated, membrane or sheet supported at its edge by a plurality of inflatable tubes, such as those described above, to provide a modified apparatus having a cupped configuration to facilitate water collection. Similarly configured apparatus can also be used as a self-supporting shelter or suspended to form an umbrella.

Figure 26:
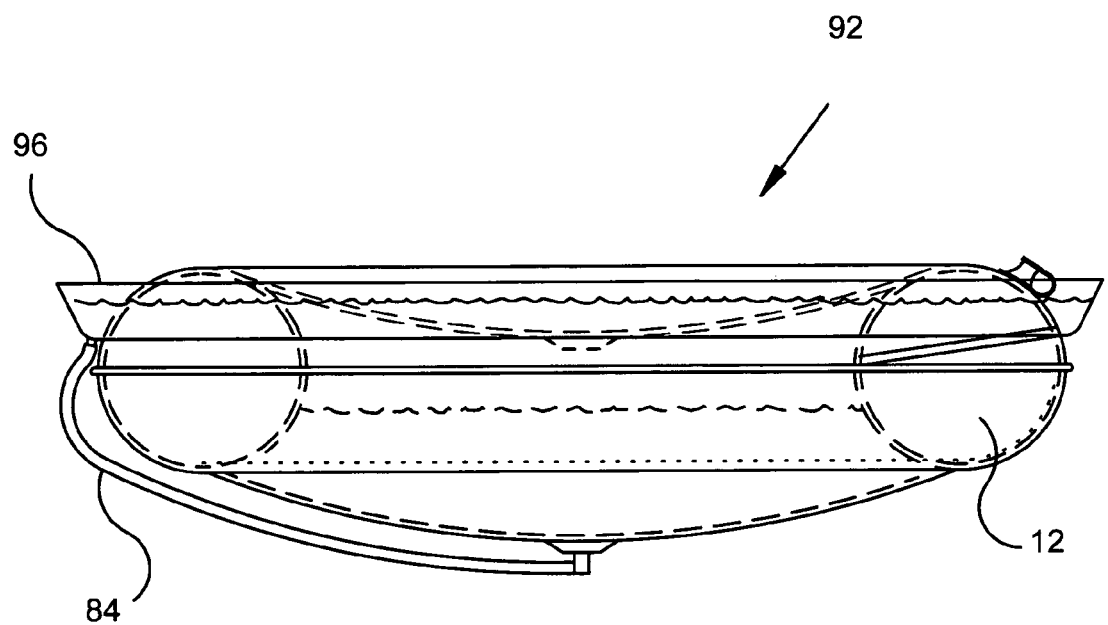
FIG. 26 is a schematic side elevational view of a modified first embodiment reflector apparatus further including optional accessory elements, such as a peripheral gutter, for facilitating the collection and storage of water.
Figure 27:
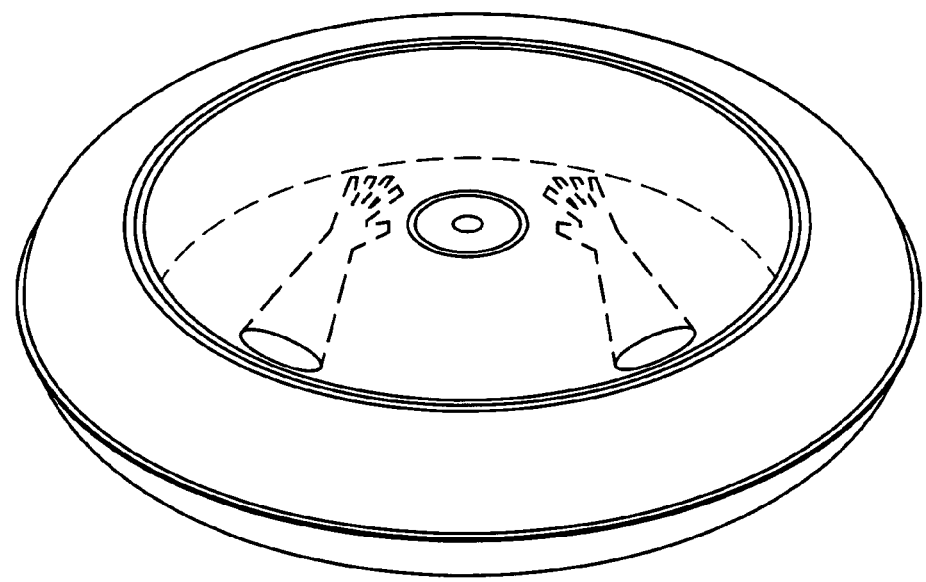
FIG. 27 is a schematic perspective view of a modified first embodiment reflector apparatus configured as a portable sealed work chamber.

FIGS. 26–27 Miscellaneous Apparatus

FIG. 26 depicts a modified first embodiment reflector apparatus 92 further including optional accessory elements for facilitating the collection and storage of water, including a peripheral gutter 96 having a drain port for connection to a conduit 84, which is shown further connected to the lower valve to permit water collected in the gutter to be transferred to the reflector chamber for storage. An optionally valved conduit extending through the toroid can also be used to transfer water effluent to the reflector chamber for storage.

FIG. 27 depicts a modified first embodiment reflector apparatus configured as a portable sealed work chamber having a pair of attached gloves and a covered access port incorporated into an optionally removably attached upper transparent membrane.

Figure 28A:
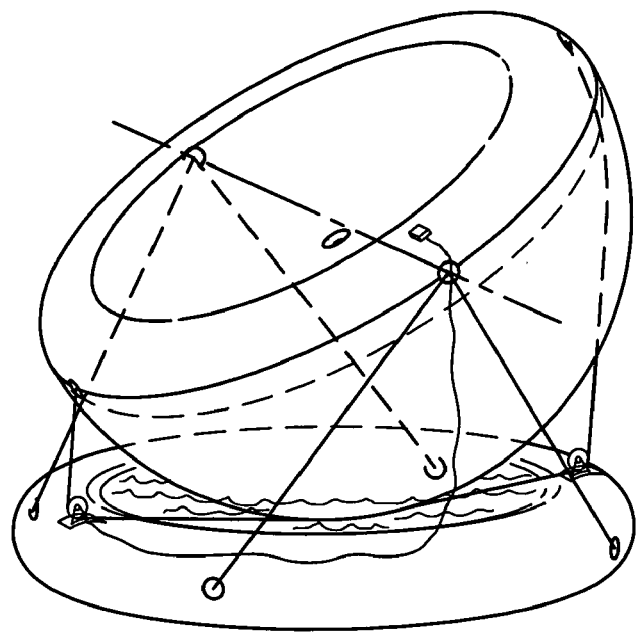
FIGS. 28A–B are schematic perspective views of a modified first embodiment reflector apparatus further including self-supporting single-axis and dual-axis means for tracking the sun.
Figure 28B:
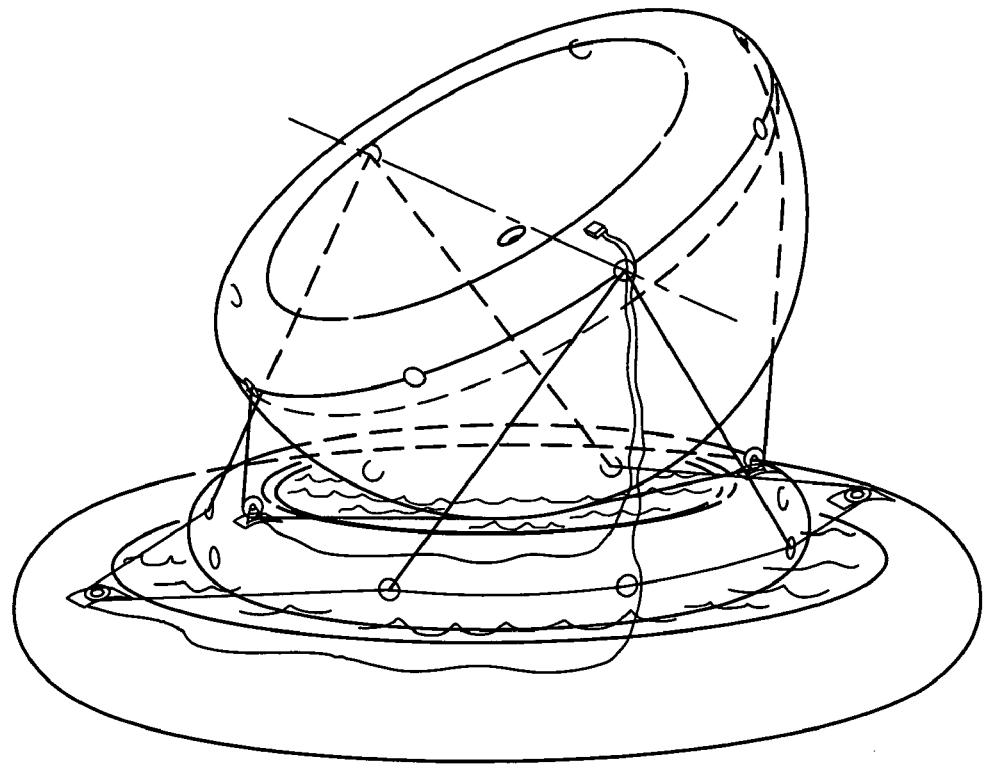

FIGS. 28A–B Self-Supporting Automated Sun-Tracking Devices:

FIG. 28A depicts a modular multi-function apparatus (with the inflatable safety cage and the cable-stayed focal point support omitted from the figure for clarity) having an optional automated means for tracking the vertical motion or elevation of the sun (i.e., a single-axis sun-tracking apparatus), wherein the modular multi-function apparatus further includes a motor-driven cable connected between the upper portion of the apparatus and its supporting toroidal base ring, at least one motorized drive pulley typically attached to the toroidal base ring, and a sun-sensing controller electrically connected via electrical conduits both to the motorized drive pulley and to an electrical power supply, such as a rechargeable battery and/or photovoltaic panel. Note that the toroidal base ring is configured to hold water such that, when filled, it provides a substantially frictionless support for the inflatable spherical support module, which floats on the water-filled base ring. Note that opposite sides of the toroidal support ring of the basic reflector apparatus are connected to the toroidal base ring via flexible cords or cables to stabilize the upper portion of the apparatus relative to the lower toroidal support ring, which can be secured to the ground, for example, by cables and stakes (not shown), or by other means.

FIG. 28B depicts a modular multi-function apparatus (with the inflatable safety cage and the cable-stayed focal point support omitted from the figure for clarity) having an optional automated means for tracking both the vertical and horizontal motion of the sun (i.e., a dual-axis sun-tracking apparatus), wherein the modular multi-function apparatus of FIG. 28A having a single-axis tracking apparatus further includes an additional larger water-filled base ring on which the first base ring floats, an additional motor-driven cable connected between the primary base ring and the larger secondary base ring, and one non-driven and one driven pulley, the latter of which is electrically connected via electrical conduit to the sun-sensing controller and electrical power supply.

Figure 29A:
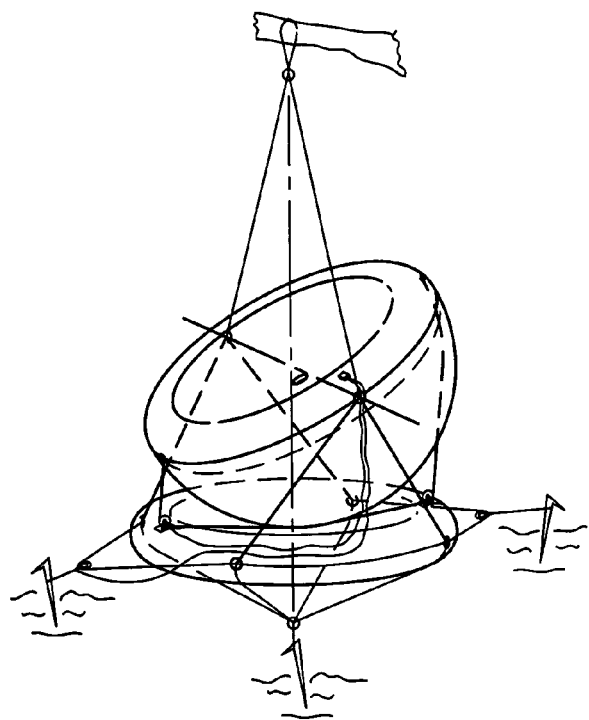
FIGS. 29A–C are schematic perspective views of a modified first embodiment reflector apparatus further including suspended single-axis and dual-axis means for tracking the sun.
Figure 29B:
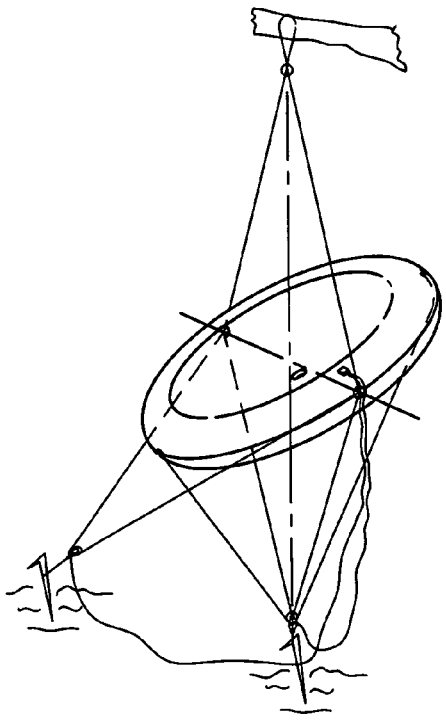
Figure 29C:
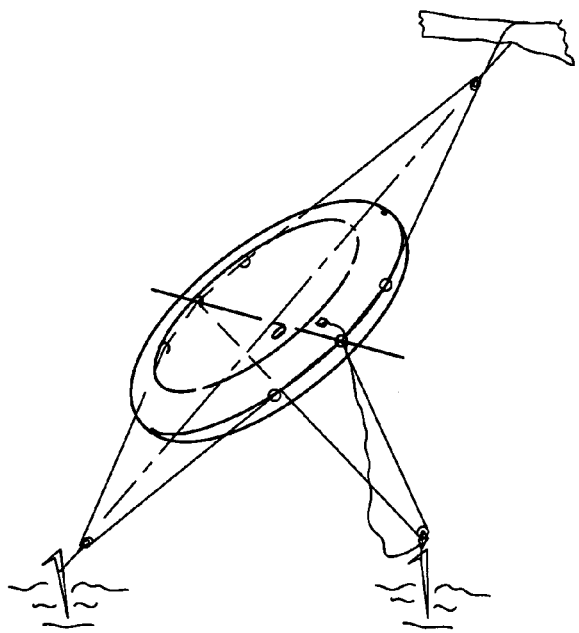

FIGS. 29A–C Suspended Automated Sun-Tracking Apparatus:

FIG. 29A depicts a modular multi-function apparatus (with the inflatable safety cage and the cable-stayed focal point support omitted from the figure for clarity) having an alternate automated means for tracking both the vertical and horizontal motion of the sun (i.e., a dual-axis sun-tracking apparatus), wherein the modular multi-function apparatus of FIG. 28A having a single-axis tracking mechanism is rotatably suspended via a cable system between an overhead support, such as a tree branch, and a staked ground support to enable substantially frictionless motion about the vertical axis, and further includes an additional motor-driven cable connected between the toroidal base ring and one non-driven and one motor-driven pulley, both of which are supported by ground stakes, and the latter of which is electrically connected via electrical conduit to a sun-sensing controller and an electrical power supply.

FIG. 29B depicts a basic first embodiment reflector apparatus having a dual-axis (i.e., vertical and horizontal) sun-tracking mechanism, wherein the basic reflector apparatus is suspended via a cable system between an overhead support, such as a tree branch, and a staked ground support to enable substantially frictionless motion about the vertical and horizontal axes, and further comprises two motor-driven cables (one for each axis of rotation), and two motorized drive pulleys (one for each axis of rotation), both of which are supported by ground stakes and are electrically connected via electrical conduit to a sun-sensing controller and an electrical power supply.

FIG. 29C depicts a basic first embodiment reflector apparatus having a polar-aligned, single-axis, sun-tracking mechanism (i.e., the axis of the tracking mechanism is optionally aligned with the poles or rotational axis of the earth), wherein the basic reflector apparatus is suspended via a cable system between an overhead support, such as a tree branch, and a staked ground support to enable substantially frictionless motion about an axis parallel to the Earth's axis of rotation, and further comprises one motor-driven cable and one motorized drive pulley, the latter of which is supported by a ground stake and is electrically connected via electrical conduit to a sun-sensing controller and an electrical power supply.

FIGS. 30A–D Materials of Construction

Figure 30A:
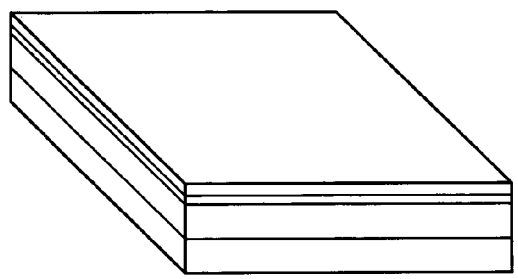
FIGS. 30A–D are schematic perspective views of typical, substantially polymeric, multi-layer, composite materials from which the apparatus can be constructed.

FIG. 30A depicts a typical, substantially polymeric, multi-layer composite material from which the apparatus can be constructed, comprising from bottom to top: a heat-sealable layer of material (such as polyethylene, and the like), a load-bearing structural membrane (such as Nylon, Mylar®, and the like), a smooth reflective layer (such as provided by vapor-deposited aluminum, and the like), and a protective upper coating (such as lacquer, polyethylene, and the like), which optionally may also be heat-sealable.

Figure 30B:
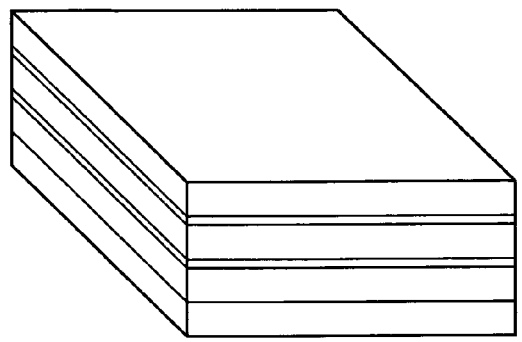

FIG. 30B depicts an alternate, substantially polymeric, multi-layer composite material from which the apparatus can be constructed, comprising from bottom to top: a heat-sealable polymer material, a longitudinally oriented load-bearing structural polymer membrane, an intermediate polymeric bonding or interface material, a transverse-oriented load-bearing structural polymer membrane, a reflective metallic layer, and a protective polymer coating which also serves as a heat-sealable layer, whereby the two cross-stacked, directionally-oriented membranes increase strength and tear resistance of the composite membrane.

Figure 30C:
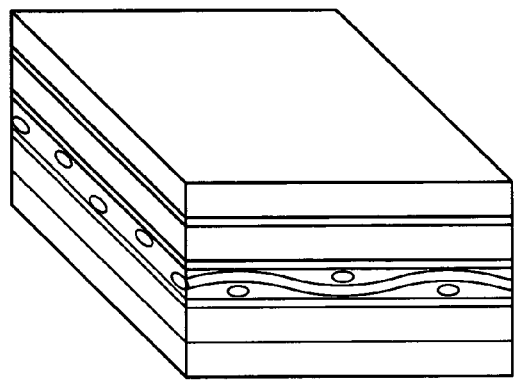

FIG. 30C depicts a fiber-reinforced multi-layer composite material from which the apparatus can be constructed, comprising from bottom to top: a heat-sealable polymer material, a bi-axially oriented load-bearing structural polymer membrane, an intermediate polymeric bonding or interface material, a layer of reinforcing fibers shown, for example, in a bi-axial weave, a second intermediate polymeric bonding or interface material, a second bi-axially oriented load-bearing structural polymer membrane, a reflective metallic layer, and a protective polymer coating which also serves as a heat-sealable layer, whereby the fiber reinforcement greatly improves the strength and tear resistance of the multi-layer composite membrane.

Figure 30D:
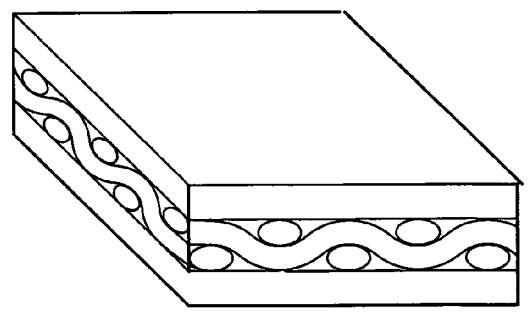

FIG. 30D depicts a fiber-reinforced composite material from which the non-reflective portions of the apparatus can be constructed, comprising a layer of reinforcing fibers in, for example, a bi-axial weave integrally imbedded in a heat-sealable polymer matrix material, whereby an economical, high-strength, tear-resistant composite membrane is provided for the non-reflective portions of the apparatus. Note that this material can also optionally incorporate a reflective surface.

Finally, to facilitate many of the applications of the modular inflatable field-deployable apparatus of the present invention as described herein, it should be noted that various common electronic and/or mechanical accessory devices or apparatus can be integrally or removably incorporated into any apparatus of the instant invention in any useful quantity, location, and combination thereof. Such optional electrical and/or mechanical accessory devices include, but are not limited to, pumps, fans, drive motors, timers, thermostats, flow controllers, photovoltaic cells, movable louvers or iris apparatus (for controlling flow or radiation), and other useful elements. To further enhance the collection, storage, processing, and distribution of water or other liquids, it should be noted that various common liquid handling and processing devices can also be integrally or removably incorporated into any apparatus of the instant invention in any useful quantity, location, and combination including, but not limited to, liquid pumps, pipes, tubes, funnels, valves, pressure gauges, flow meters, flow controllers, filters, and other useful elements.

Thus, the extensive applicability of the fundamental modular inflatable multifunction field-deployable apparatus has been disclosed.

We claim:

1. A field-deployable apparatus comprising:
    a collapsible ring support element, said collapsible ring support element comprising (1) at least one substantially tubular and inflatable ring or (2) a supporting framework comprising a plurality of substantially rigid support members, said collapsible ring support element having a vacant center;
    a plurality of deformable membranes extending at least partially across the vacant center of said collapsible ring support element, said membranes defining at least a portion of at least one reflector chamber,
    wherein at least one of said membranes is pressure deformable, mechanically deformable, or both,
    wherein at least one of said membranes is reflective to electromagnetic radiation, and
    wherein the apparatus comprises (i) a safety structure, (ii) a support and orienting structure, (iii) a material collecting, concentrating, or processing structure, or (iv) a combination of two or more thereof.

2. The apparatus according to claim 1, wherein one or more of: said collapsible ring support element; said safety structure; said support and orienting structure; said material collecting, concentrating, or processing structure; and said membranes comprise substantially thin, and flexible sheets comprising at least one type or class of substantially polymeric material.

3. The apparatus according to claim 1, further comprising at least one accessory device attached to said apparatus, the accessory device being selected from the group consisting of:
    a handle;
    an apertured tab;
    a tying or hanging strap;
    a storage pouch for storing the deflated and folded apparatus;
    a pouch for filling with material to stabilize the apparatus;
    a stabilizing cable or line; and
    a cable attached to a ground stake.

4. The apparatus according to claim 1, further comprising at least one fastener device attached to said apparatus, the fastener device being selected from the group consisting of:
    a clevis;
    a clip;
    a bracket;
    a mounting stud;
    a socket;
    a line;
    a hook-and-loop fastening patch;
    a hook; and
    a tongue-and-groove fastening mechanism.

5. The apparatus according to claim 1, wherein the plurality of deformable membranes comprise a primary reflective membrane.

6. The apparatus according to claim 5, wherein the plurality of deformable membranes additionally comprises at least one redundant or auxiliary reflective membrane.

7. The apparatus according to claim 1, further comprising at least one access port having a fluid-tight cover.

8. The apparatus according to claim 1, wherein at least one of said deformable membranes has at least one duct or port disposed to transfer substantially fluidic material to, from, or through at least one said reflector chamber.

9. The apparatus according to claim 8, wherein said port has a conduit, extending through said reflector chamber, disposed to drain substantially fluidic materials collecting on the top of the apparatus through said conduit to an external location substantially below said reflector chamber.

10. The apparatus according to claim 1, wherein said collapsible ring support element comprises at least two substantially inflatable and tubular rings, at least one of said rings is attached to extend above at least one other of said rings and said deformable membranes.

11. The apparatus according to claim 1, wherein said collapsible ring support element comprises at least two of said substantially inflatable and tubular rings, at least two of said rings being located between at least two of said deformable membranes, whereby the internal volume capacity of the apparatus is increased.

12. The apparatus according to claim 1, further including at least one gutter attached to said apparatus for capturing materials, whereby the effective capture area is increased.

13. The apparatus according to claim 1, further comprising at least one elastic band attached to at least one surface of at least one of said deformable membranes to cause wrinkling of said membrane surface as a safety means.

14. The apparatus according to claim 1, further including at least one cover attached to at least one point of said apparatus as a safety means, said cover being retractable.

15. The apparatus as recited in claim 1, wherein said safety structure comprises at least one safety shield or safety cage operable to reduce the risk of accidental or unintentional exposure to concentrated electromagnetic radiation.

16. The apparatus according to claim 15, wherein said safety structure comprises at least one safety shield disposed to provide a physical barrier at least partially surrounding a focal point defined by said apparatus; said safety shield being selected from the group consisting of:
   an inflatable safety shield comprising a plurality of stacked inflatable rings;
   an inflatable safety shield comprising a plurality of stacked inflatable rings providing an outer contour effectively defining a predetermined portion of an effectively spherical surface; and
   an inflatable safety shield comprising a plurality of basic reflector apparatuses each having a removable reflector chamber in a removed condition.

17. The apparatus according to claim 15, wherein said safety structure comprises at least one safety cage disposed to provide a physical barrier at least partially surrounding a focal point defined by said apparatus; said safety cage being selected from the group consisting of:
   an inflatable safety cage comprising a plurality of stacked inflatable rings;
   an inflatable safety cage comprising a plurality of stacked inflatable rings providing an outer contour effectively defining a predetermined portion of an effectively spherical surface;
   an inflatable safety cage comprising an inner membrane, an outer membrane, and a plurality of membranous ribs joined to said inner and outer membranes;
   an inflatable safety cage comprising a plurality of connected inflatable tubes;
   an inflatable safety cage comprising a plurality of connected inflatable arcuate tubes effectively defining a predetermined portion of an effectively spherical surface;
   a collapsible substantially rigid safety cage comprising a plurality of substantially rigid elements rotatably attached to said apparatus and stabilized by one or more attached cords or cable stays;
   a globe-shaped combination safety cage and effectively spherical support comprising a plurality of substantially rigid elements rotatably attached to form a collapsible structure and further attached to said collapsible ring support element to stabilize the collapsible structure; and
   a safety cage comprising a collapsible framework.

18. The apparatus according to claim 15, wherein said safety structure comprises at least one safety shield comprising a safety net or mesh for providing a physical barrier at least partially surrounding a focal point defined by said apparatus.

19. The apparatus according to claim 15, wherein said safety structure comprises at least one safety cage comprising a safety net or mesh for providing a physical barrier at least partially surrounding a focal point defined by said apparatus.

20. The apparatus as recited in claim 15, wherein said at least one said safety shield or safety cage is removably attached to said apparatus.

21. The apparatus as recited in claim 15, wherein said safety structure comprises at least one inflatable safety shield removably attached to the apparatus.

22. The apparatus as recited in claim 15, wherein said safety structure comprises at least one inflatable safety cage removably attached to the apparatus.

23. The apparatus as recited in claim 15, wherein said safety structure comprises a safety shield or safety cage is substantially integral with said apparatus.

24. The apparatus as recited in claim 15, wherein said safety structure comprises a safety shield or safety cage which is inflatable and has one or more interconnecting gas ports to an inflatable ring support element of the field-deployable apparatus, said interconnecting gas ports being operable to inflate said safety shield or safety cage simultaneously with said inflatable ring support element of said apparatus.

25. The apparatus as recited in claim 24, wherein at least one said safety shield or safety cage is substantially integral with said apparatus.

26. The apparatus as recited in claim 1, wherein said safety structure comprises at least one safety shield or safety cage disposed to provide a physical barrier at least partially surrounding a focal point defined by said apparatus.

27. The apparatus of claim 26, wherein said focal point is external to the reflector chamber.

28. The apparatus as recited in claim 1, wherein said safety structure comprises at least one inflatable safety shield or inflatable safety cage disposed to provide a physical barrier at least partially surrounding a focal point defined by said apparatus.

29. The apparatus of claim 28, wherein said focal point is external to the reflector chamber.

30. The apparatus as recited in claim 1, wherein the support and orienting structure comprises one or more rigid rods attached to and operable to incline said apparatus.

31. The apparatus as recited in claim 30, wherein said one or more rigid rods are removably attached to said apparatus.

32. The apparatus as recited in claim 1, further comprising a focal point support operable to support one or more items in proximity to a focal point defined by said apparatus.

33. The apparatus as recited in claim 30, wherein said focal point support is selected from the group consisting of:
   two inflatable pressure vessels disposed to support an element spanning said apparatus;
   an inflatable safety cage disposed to support an element spanning said apparatus;
   an inflatable safety shield or safety cage disposed to support a cable-stayed support;
   an inflatable tube stabilized by a plurality of tensioned cable stays; and
   an adjustable inflatable truss.

34. The apparatus as recited in claim 32, wherein said focal point support comprises a frame supported by a plurality of cable-stays.

35. The apparatus as recited in claim 34, wherein said frame is selected from the group consisting of:
   a rigid frame;
   a self-leveling pivoting frame;
   a frame comprising a rotatably attached self-leveling pivoting frame;

a frame comprising a rotatoably attached self-leveling pivoting frame and a device operable to fix or hold the relative positions of said frame;
a frame with an internally reflective, articulated structure attached to the frame;
a basket;
a flexible wire or cable basket;
a bracket or ring;
two brackets or rings attached by an adjustable wire loop;
a wire loop;
an adjustable wire loop;
a wire loop having a cinching device;
a flexible wire or cable
a tube;
a rod; and
a cable.

36. The apparatus as recited in claim 34, further comprising a safety shield or safety cage, wherein said cable-stayed focal point support is attached to, and supported by, said safety shield or safety cage.

37. The apparatus as recited in claim 1, wherein one or more of said deformable membranes are removably attached to said collapsible ring support element of said apparatus.

38. The apparatus as recited in claim 37, wherein one or more of the removably attachable membranes are removably attached to said collapsible ring support element of said apparatus using at least one tongue-and-groove fastening mechanism.

39. The apparatus as recited in claim 1, wherein said at least one reflector chamber is removably attached to said collapsible ring support element of said apparatus.

40. The apparatus as recited in claim 1, further comprising one or more elements selected from the group consisting of:
a substantially rigid support element disposed to support and orient said apparatus;
an inflatable support element disposed to support and orient said apparatus;
a safety shield or cage disposed to reduce the risk of accidental or unintentional exposure to electromagnetic radiation;
an inflatable safety shield or cage disposed to reduce the risk of accidental or unintentional exposure to electromagnetic radiation;
a focal point support disposed to support an item in proximity to a focal point defined by said apparatus;
an inflatable focal point support disposed to support an item in proximity to a focal point defined by said apparatus;
a cover;
an inflatable cover;
a safety cage including a net or mesh; and
combinations thereof.

41. The apparatus as recited in claim 1, wherein said apparatus further comprises a secondary central inflatable pressure envelope disposed within said reflector chamber, wherein the degree of energy concentration provided by the reflective membrane of said apparatus is adjustable by adjusting the pressure within said secondary pressure envelope.

42. The apparatus as recited in claim 1, wherein one or more of said deformable membranes comprise a pre-formed reflective membrane having a supporting cord or cable spanning said collapsible ring support element to provide a reflective membrane defining a plurality of focal points.

43. The apparatus as recited in claim 1, wherein an external surface of the apparatus has a high-emissivity surface.

44. The apparatus as recited in claim 1, wherein an external surface of the apparatus has a camouflaged surface.

45. The apparatus as recited in claim 1, wherein said reflective membrane comprises a reflective membrane comprising a surface having a non-paraboloid shape.

46. The apparatus as recited in claim 45, wherein said non-paraboloid shape is selected from the group consisting of:
a radially undulating or stepped contour;
a circumferentially undulating or scalloped contour;
a dimpled contour;
a faceted contour;
a contour comprising a series of conic sections; and
a contour having a non-constant radius of curvature.

47. The apparatus as recited in claim 1, wherein said reflective membrane comprises a reflective membrane comprising a substantially faceted surface.

48. The apparatus as recited in claim 1, further comprising one or more light-attenuator devices operable to attenuate light or radiant electromagnetic energy.

49. The apparatus as recited in claim 48, wherein the light-attenuator device is selected from the group consisting of:
an adjustable louver;
an adjustable iris;
an off-axis light-attenuation grating;
a darkened transparent film; and
a selectively transparent membrane.

50. The apparatus as recited in claim 1, wherein said one or more support elements are inflatable.

51. The apparatus as recited in claim 1, further comprising an automated sun-tracking apparatus.

52. The apparatus of claim 1, wherein said apparatus has one or more said material capturing structures selected from the group consisting of:
an inflatable ring extending above the plurality of deformable membranes;
a gutter;
an outwardly extendable cover;
an extendable membrane;
a high-emissivity surface; and
combinations of two or more thereof.

53. The apparatus of claim 1, further comprising one or more material transferring elements operable to transfer a material to, from, or through said at least one reflector chamber, said material transferring elements being selected from the group consisting of:
a valve;
a port;
a funnel;
a conduit;
a pump; and
combinations of two or more thereof.

54. The apparatus of claim 1, wherein said apparatus has one or more said material processing structures selected from the group consisting of:
a filter;
a distillation apparatus;
a anaerobic airlock or pressure relief valve; and
a sterilizing apparatus.

55. The appatatus of claim 1, additionally comprising at least one pressure adjusting device for adjusting the pressure within an inflatable reflector chamber.

56. The apparatus of claim 55, wherein said at least one pressure adjusting device is selected from the group consisting of a valve, a port, a pump, and a gas canister or cylinder.

57. The apparatus according to claim 55, wherein said pressure adjusting device includes at least one valve comprising a flexible conduit closed by a closure means selected from the group consisting of:

an affixed plug;
a flexible tongue-and-groove valve;
a self-sealing membrane valve;
a clamp; and
a tie.

58. The apparatus of claim 1, additionally comprising at least one pressure adjusting device for adjusting the pressure within an inflatable ring support element.

59. The apparatus of claim 58, wherein said at least one pressure adjusting device is selected from the group consisting of a valve, a port, a pump, and a gas canister or cylinder.

60. The apparatus according to claim 58, wherein said pressure adjusting means includes at least one valve comprising a flexible conduit closed by a closure means selected from the group consisting of:
an affixed plug;
a flexible tongue-and-groove valve;
a self-sealing membrane valve;
a clamp; and
a tie.

61. The apparatus of claim 1, additionally comprising one or more flexible elements, disposed between and attached to at least two of the plurality of deformable membranes.

62. The apparatus of claim 1, wherein the plurality of deformable membranes includes a mechanically deformable reflective membrane attached or bonded to a pressure-deformable substrate membrane.

63. The apparatus according to claim 1, wherein said apparatus is compactly foldable.

64. The apparatus according to claim 1, wherein the plurality of deformable membranes comprise at least two reflective membranes including a primary reflective membrane and at least one redundant or auxiliary reflective membrane, wherein the primary membrane and the redundant or auxiliary reflective membrane have dissimilar optical characteristics.

65. The apparatus as recited in claim 1, wherein said support and orienting structure comprises an inflatable structure.

66. The apparatus as recited in claim 65, wherein said support and orienting structure is integral with an inflatable ring support element.

67. The apparatus of claim 1, further comprising an alignment device selected from the group consisting of:
a magnetic compass;
an inclinometer;
a level; and
a visual alignment guide.

68. A field-deployable apparatus operable as a radiant electromagnetic energy concentrating, focusing or beaming apparatus comprising:
a collapsible ring support element, said collapsible ring support element comprising (1) at least one substantially tubular and inflatable ring or (2) a supporting framework comprising a plurality of substantially rigid support members, said collapsible ring support element having a vacant center;
a plurality of deformable membranes extending at least partially across the vacant center of said collapsible ring support element, said membranes defining at least a portion of at least one reflector chamber,
wherein at least one of said membranes is pressure deformable, mechanically deformable, or both,
wherein at least one of said membranes is reflective to electromagnetic radiation, and
wherein at least one structure that does not have the function of concentrating, focusing, or beaming radiant electromagnetic energy, and is selected from the group consisting of:
a fluid collecting structure;
a fluid storing structure;
a fluid distributing structure;
a fluid processing structure;
a materials fermenting structure;
a material storing structure;
a waterborne flotation structure;
a snowborne transportation structure;
a compliant support structure;
a broken limb immobilizing structure ;
a sound concentrating structure;
an electrostatic insulation structure; and
an electromagnetic insulation structure.

69. The apparatus of claim 68, additionally comprising at least one pressure adjusting device for adjusting the pressure within an inflatable reflector chamber.

70. The apparatus of claim 69, wherein said at least one pressure adjusting device is selected from the group consisting of a valve, a port, a pump, and a gas canister or cylinder.

71. The apparatus of claim 68, additionally comprising at least one pressure adjusting device for adjusting the pressure within an inflatable ring support element.

72. The apparatus of claim 71, wherein said at least one pressure adjusting device is selected from the group consisting of a valve, a port, a pump, and a gas canister or cylinder.

73. The apparatus of claim 68, additionally comprising one or more flexible elements, disposed between and attached to at least two of the plurality of deformable membranes.

74. The apparatus of claim 68, wherein the plurality of deformable membranes includes a mechanically deformable reflective membrane attached or bbnded to a pressure-deformable substrate membrane.

75. A method of establishing at least one function or element of life-sustaining infrastructure utilizing a field-deployable apparatus, comprising the steps of:
providing a collapsible ring support element, said collapsible ring support element comprising (1) at least one substantially tubular and inflatable ring or (2) a supporting framework comprising a plurality of substantially rigid support members, said collapsible ring support element having a vacant center;
providing a plurality of deformable membranes extending at least partially across the vacant center of said collapsible ring support element, said membranes defining at least a portion of at least one reflector chamber, at least one of said deformable membranes being reflective to electromagnetic radiation,
wherein at least one of said membranes is pressure deformable, mechanically deformable, or both, and
wherein the apparatus comprises (i) a safety structure, (ii) a support and orienting structure, (iii) a material collecting, concentrating, or processing structure, or (iv) a combination of two or more thereof;
deploying said collapsible ring support element and said deformable membranes in a manner effective for performing a selected function.

76. The method according to claim 75, wherein the deploying step comprises the following steps:
deploying said collapsible ring support element to support and tension a periphery of said deformable membranes;
adjusting pressure within said reflector chamber to deform at least one membrane into a substantially concave surface; and positioning said apparatus in a substantially horizontal orientation with a substantially concave surface facing upward, whereby said apparatus is operable to capture or hold, or to capture and hold, substantially fluidic materials.

77. The method according to claim 75, wherein the deploying step comprises the following step:

positioning said apparatus between an item and the surrounding environment to shield or insulate said item from said environment.

78. The method of claim 75, wherein the apparatus additionally comprises at least one pressure adjusting device for adjusting the pressure within an inflatable reflector chamber.

79. The method according to claim 78, wherein the deploying step comprises the following steps:

deploying said collapsible ring support element to support and tension a periphery of said deformable membranes;

adjusting pressure within said reflector chamber to deform at least one reflective membrane into a functional concave reflector; and positioning the reflective membrane in a manner effective for allowing transmission of radiant electromagnetic energy between a source and target, whereby said apparatus is operable to concentrate radiant electromagnetic energy emitted from an electromagnetic source onto an energy-absorbing object placed in proximity to a focal point defined by said apparatus, said apparatus is operable to project radiant electromagnetic energy emitted from a source of electromagnetic energy placed in proximity to a focal point defined by said apparatus, or both.

80. The method according to claim 79, further comprising providing or deploying, or providing and deploying (1) an energy-absorbing object supported in proximity to the focal point, (2) an energy-emitting object supported in proximity to the focal point, or both.

81. The method according to claim 80, wherein the energy-absorbing object is selected from the group consisting of:

a power generation apparatus operable to provide electrical power, thermal power, mechanical power, or combinations thereof;

a cooking apparatus or accoutrement;

a material purifying or pasteurizing apparatus;

a material sterilization apparatus;

a communications receiver apparatus;

an illumination apparatus; and combinations thereof, and wherein the energy-absorbing object is selected from the group consisting of:

a light source; and a communications transmitter apparatus.

82. The method of claim 75, wherein the inflatable ring support element additionally comprises at least one pressure adjusting device.

83. The method of claim 75, wherein the apparatus additionally comprises one or more flexible elements, disposed between and attached to at least two of the plurality of deformable membranes.

84. The method of claim 75, wherein the plurality of deformable membranes includes a mechanically deformable reflective membrane attached or bonded to a pressure-deformable substrate membrane.

85. The method according to claim 75, wherein the apparatus comprises a supporting framework comprising a plurality of substantially rigid support members, and the deploying step comprises the following steps:

deploying said collapsible ring support element to support and tension a periphery of said deformable membranes; and positioning the reflective membrane in a manner effective for allowing transmission of radiant electromagnetic energy between a source and target, whereby said apparatus is operable to concentrate radiant electromagnetic energy emitted from an electromagnetic source onto an energy-absorbing object placed in proximity to a focal point defined by said apparatus, said apparatus is operable to project radiant electromagnetic energy emitted from a source of electromagnetic energy placed in proximity to a focal point defined by said apparatus, or both.

86. The method of claim 84, wherein the apparatus additionally comprises one or more flexible elements, disposed between and attached to at least two of the plurality of deformable membranes.

87. The method of claim 84, wherein the plurality of deformable membranes includes a mechanically deformable reflective membrane attached or bonded to a pressure-deformable substrate membrane.

88. The method according to claim 84, wherein the method further comprises providing or deploying, or providing and deploying: (1) an energy-absorbing object supported in proximity to the focal point, (2) an energy-emitting object supported in proximity to the focal point, or both.

89. The method according to claim 88, wherein the energy-absorbing object is selected from the group consisting of:

a power generation apparatus operable to provide electrical power, thermal power, mechanical power, or combinations thereof;

a cooking apparatus or accoutrement;

a material purifying or pasteurizing apparatus;

a material sterilization apparatus;

a communications receiver apparatus;

an illumination apparatus; and combinations thereof, and wherein the energy-absorbing object is selected from the group consisting of:

a light source; and a communications transmitter apparatus.

90. The method according to claim 75, wherein the apparatus comprises a supporting framework comprising a plurality of substantially rigid support members, and the deploying step comprises the following steps:

deploying said collapsible ring support element to support and tension a periphery of said deformable membranes to provide a substantially concave surface; and positioning said apparatus in a substantially horizontal orientation with a substantially concave surface facing upward, whereby said apparatus is operable to capture or hold, or to capture and hold, substantially fluidic materials.

91. A multifunction field-deployable apparatus comprising:

a collapsible ring support element, said collapsible ring support element comprising (1) at least one substantially tubular and inflatable ring or (2) a supporting framework comprising a plurality of substantially rigid support members, said collapsible ring support element having a vacant center;

a plurality of deformable membranes extending at least partially across the vacant center of said collapsible ring support element, said membranes defining at least a portion of at least one inflatable or material-fillable central chamber; and wherein the apparatus is operable to collect, concentrate, process, or store material.

92. The apparatus of claim 91, wherein said apparatus has one or more said material capturing structures selected from the group consisting of:
- an inflatable ring extending above the plurality of deformable membranes;
- a gutter;
- an outwardly extendable cover;
- an extendable membrane;
- a high-emissivity surface; and
- combinations of two or more thereof.

93. The apparatus of claim 91, further comprising one or more material transferring elements operable to transfer a material to, from, or through said at least one central chamber, said material transferring elements being selected from the group consisting of:
- a valve;
- a port;
- a funnel;
- a conduit;
- a pump; and
- combinations of two or more thereof.

94. The apparatus of claim 91, wherein said apparatus has one or more said material processing structures selected from the group consisting of:
- a filter;
- a distillation apparatus;
- a anaerobic airlock or pressure relief valve; and
- a sterilizing apparatus.

* * * * *